US010938319B2

(12) United States Patent
Maki et al.

(10) Patent No.: US 10,938,319 B2
(45) Date of Patent: Mar. 2, 2021

(54) POWER CONVERSION APPARATUS

(71) Applicant: Toshiba Infrastructure Systems & Solutions Corporation, Kawasaki (JP)

(72) Inventors: Koji Maki, Kawasaki (JP); Hiroshi Mochikawa, Hachioji (JP); Yushi Koyama, Fuchu (JP); Shunsuke Tamada, Tokyo (JP); Takuro Arai, Kodaira (JP); Ryuichi Morikawa, Higashimurayama (JP); Mami Mizutani, Hachioji (JP)

(73) Assignee: Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/931,707

(22) Filed: Jul. 17, 2020

(65) Prior Publication Data

US 2020/0350832 A1    Nov. 5, 2020

Related U.S. Application Data

(63) Continuation of application No. PCT/JP2019/049009, filed on Dec. 13, 2019.

(30) Foreign Application Priority Data

Dec. 27, 2018 (JP) .............................. JP2018-245602
Jun. 25, 2019 (JP) .............................. JP2019-117546
Jul. 11, 2019 (JP) .............................. JP2019-129547

(51) Int. Cl.
*H02M 7/483* (2007.01)
*H02M 7/5395* (2006.01)
(Continued)

(52) U.S. Cl.
CPC ............. *H02M 7/483* (2013.01); *H02M 1/34* (2013.01); *H02M 7/5395* (2013.01);
(Continued)

(58) Field of Classification Search
CPC ...... H02M 1/34; H02M 7/483; H02M 7/5395; H02M 2007/4835; H02M 2001/0009; H02M 2001/0054; H02M 2001/346
See application file for complete search history.

(56) References Cited

U.S. PATENT DOCUMENTS 6,297,795 B1    10/2001    Kato et al.
10,171,004 B2    1/2019    Itoh et al.
(Continued)

FOREIGN PATENT DOCUMENTS

JP    07-213076 A    8/1995
JP    2957507 B2    10/1999
(Continued)

OTHER PUBLICATIONS

International Search Report dated Mar. 10, 2020 in PCT/JP2019/049009 filed on Dec. 13, 2019, 2 pages.
(Continued)

*Primary Examiner* — Gary L Laxton
(74) *Attorney, Agent, or Firm* — Oblon, McClelland, Maier & Neustadt, L.L.P.

(57) ABSTRACT

According to an embodiment, there is provided an apparatus which can hold down an energy loss and can avoid an increase in size. The apparatus includes a cell including a floating capacitor connected in parallel to an upper-side switching element and a lower-side switching element; an upper arm include including first switch circuits, each including a first switching element, a first diode and a first capacitor, are connected in series; a lower arm including second switch circuits, each including a second switching element, a second diode and a second capacitor, are connected in series; and a circuit which connects a low-side terminal of the cell and a low-side terminal of the first
(Continued)

capacitor and connects a high-side terminal of the cell and a high-side terminal of the second capacitor.

19 Claims, 35 Drawing Sheets

(51) Int. Cl.
*H02M 1/34* (2007.01)
*H02M 1/00* (2006.01)

(52) U.S. Cl.
CPC ............ *H02M 2001/0009* (2013.01); *H02M 2001/0054* (2013.01); *H02M 2001/346* (2013.01); *H02M 2007/4835* (2013.01)

(56) References Cited

U.S. PATENT DOCUMENTS

| | | | |
|---|---|---|---|
| 2007/0025126 A1 | 2/2007 | Barbosa et al. | |
| 2018/0183345 A1 | 6/2018 | Itoh et al. | |
| 2019/0068080 A1* | 2/2019 | Wang | H02M 7/5395 |
| 2019/0207519 A1* | 7/2019 | Chakraborty | H02M 1/088 |
| 2020/0083799 A1* | 3/2020 | Ishida | H02M 5/458 |
| 2020/0161987 A1* | 5/2020 | Gambach | H02M 1/32 |
| 2020/0244183 A1* | 7/2020 | Mihalache | H02M 7/53871 |

FOREIGN PATENT DOCUMENTS

| | | |
|---|---|---|
| JP | 2007-508792 A | 4/2007 |
| JP | 2008-092651 A | 4/2008 |
| JP | WO2014/200044 A1 | 12/2014 |
| JP | WO2017/038294 A1 | 3/2017 |
| JP | 2018-182841 A | 11/2018 |

OTHER PUBLICATIONS

Hagiwara et al., "PWN Control and Experiment of Modular Multilevel Converters", the Institute of Electrical Engineers of Japan, vol. 128, No. 7, 2008, 20 pages (with English Machine Translation).

Arai et al. "Theoretical Analysis of Power Flow and Stored Energy in the Capacitor of Neutral-Point-Clamped Modular Multilevel Converter", EPE 2019, ECCE Europe, 2019, 10 pages.

\* cited by examiner

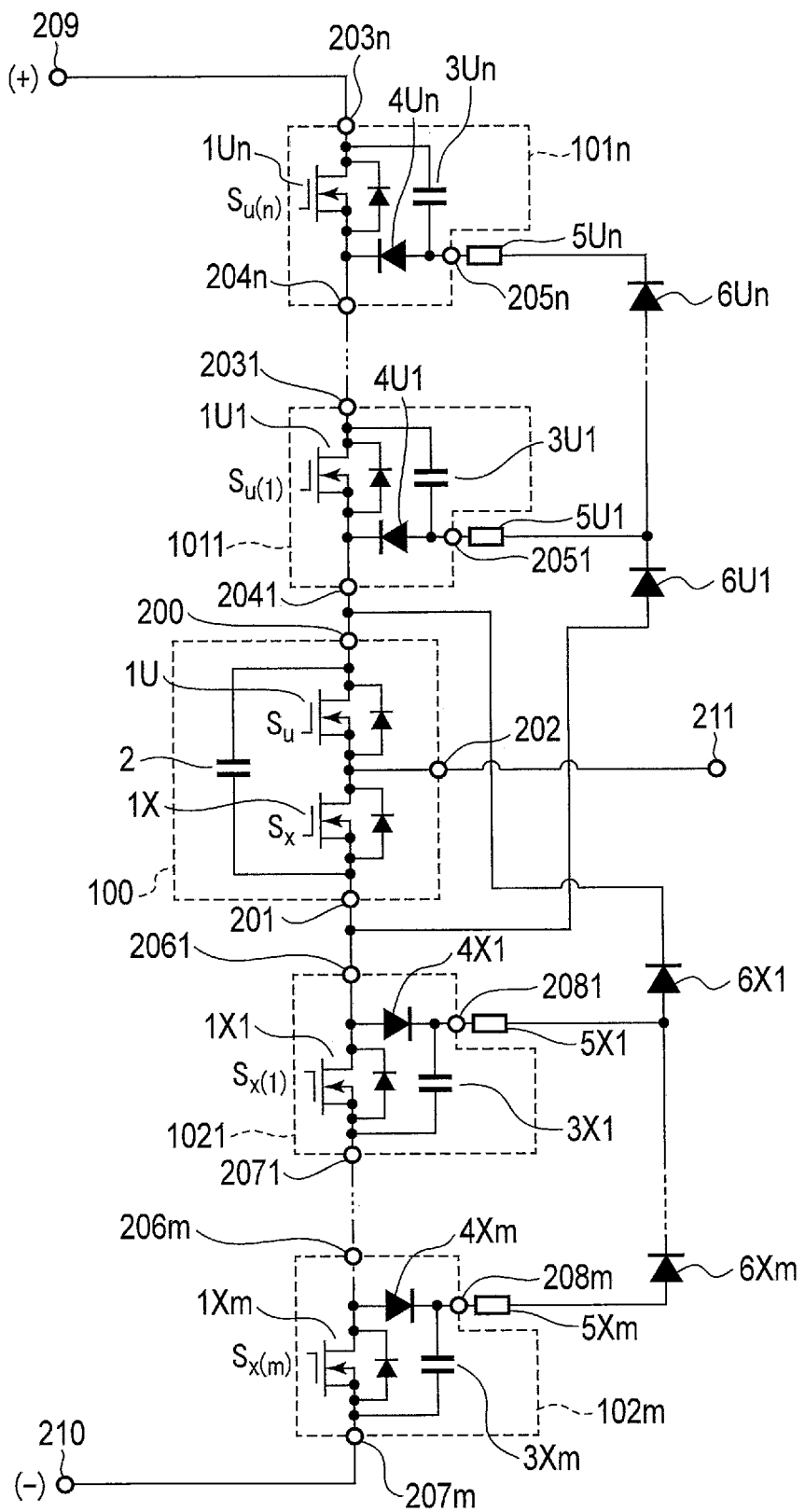
F I G. 1

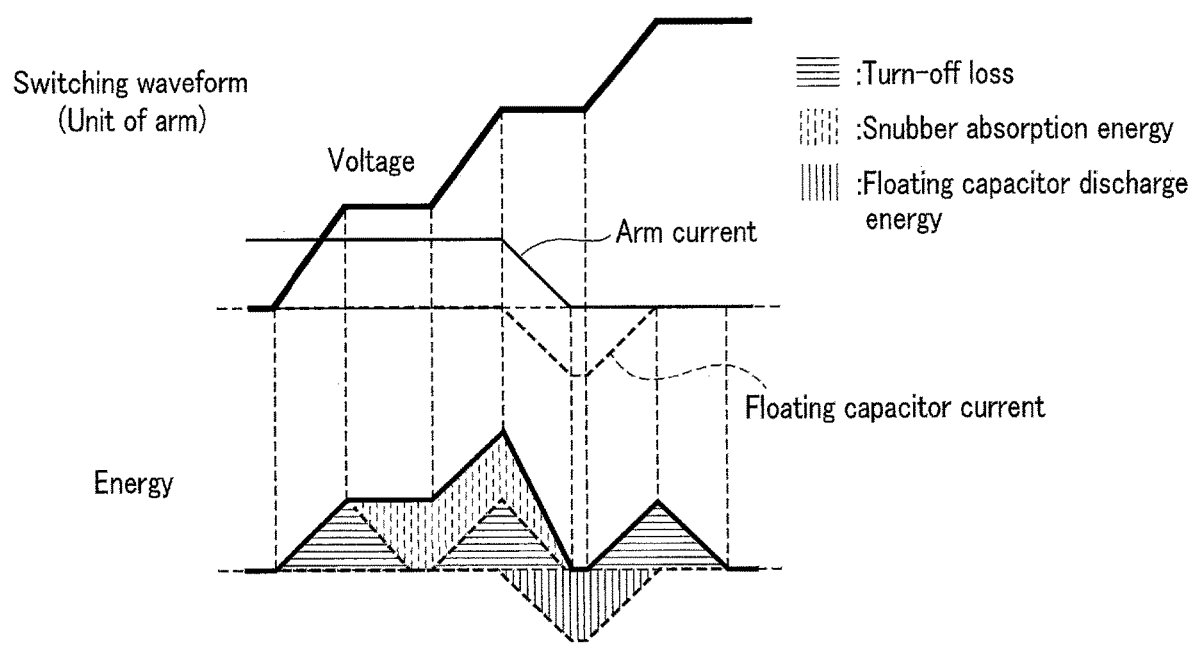
F I G. 4B
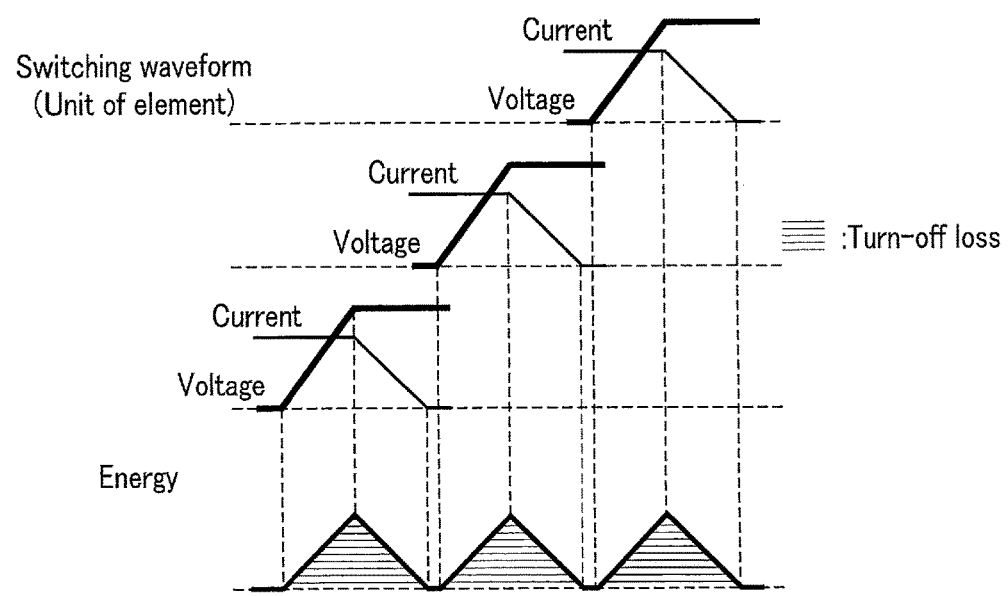
F I G. 4C

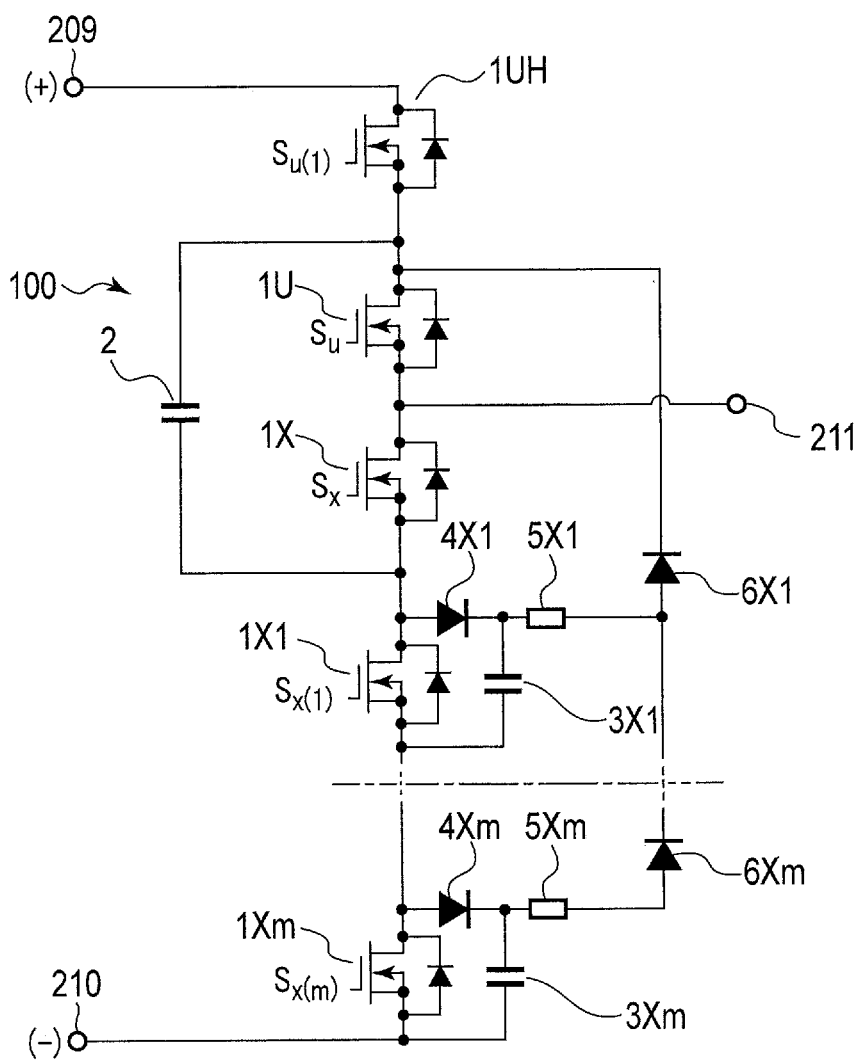
F I G. 14

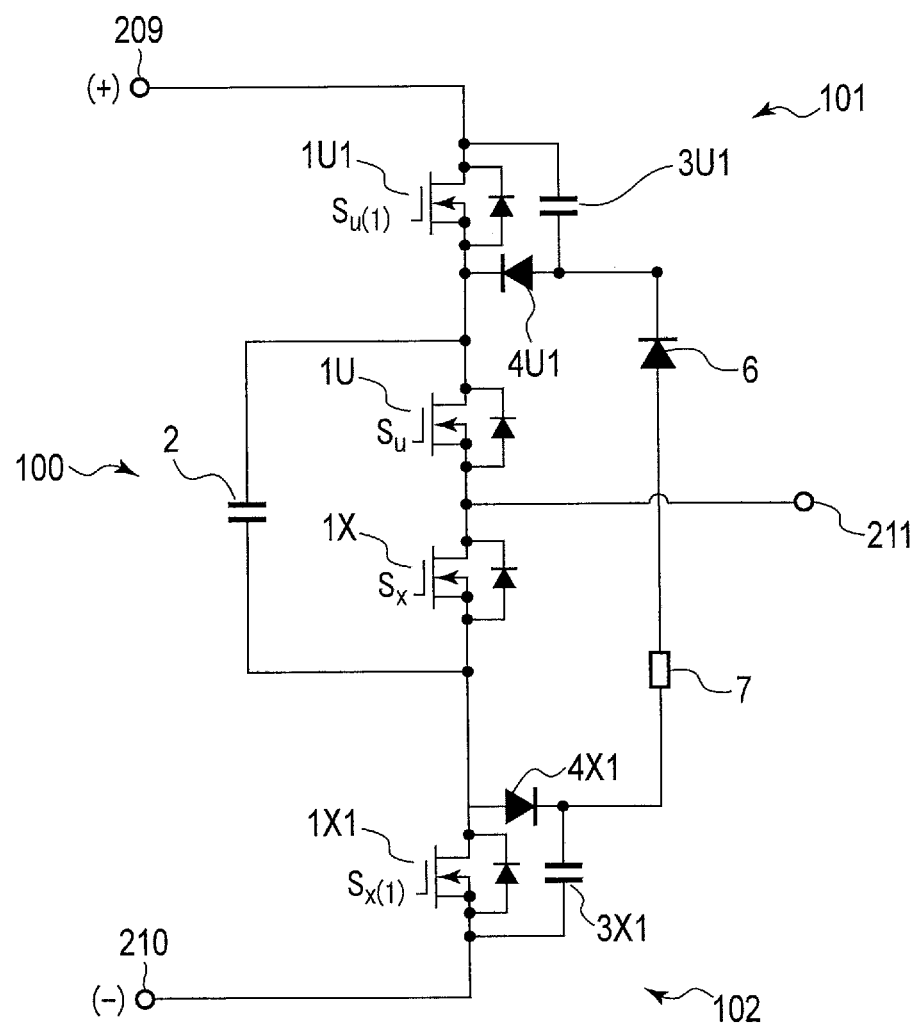
F I G. 18

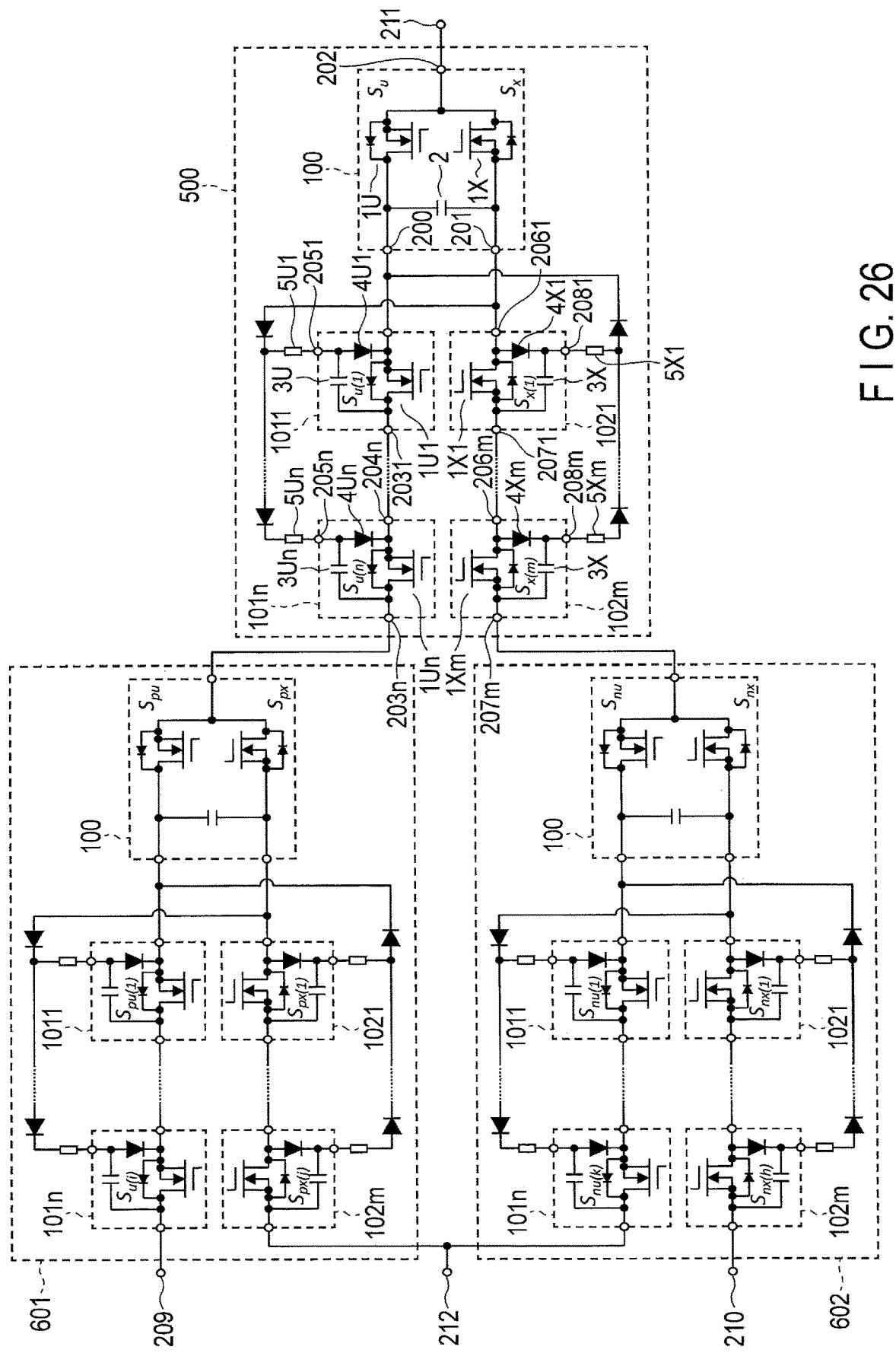
F I G. 26

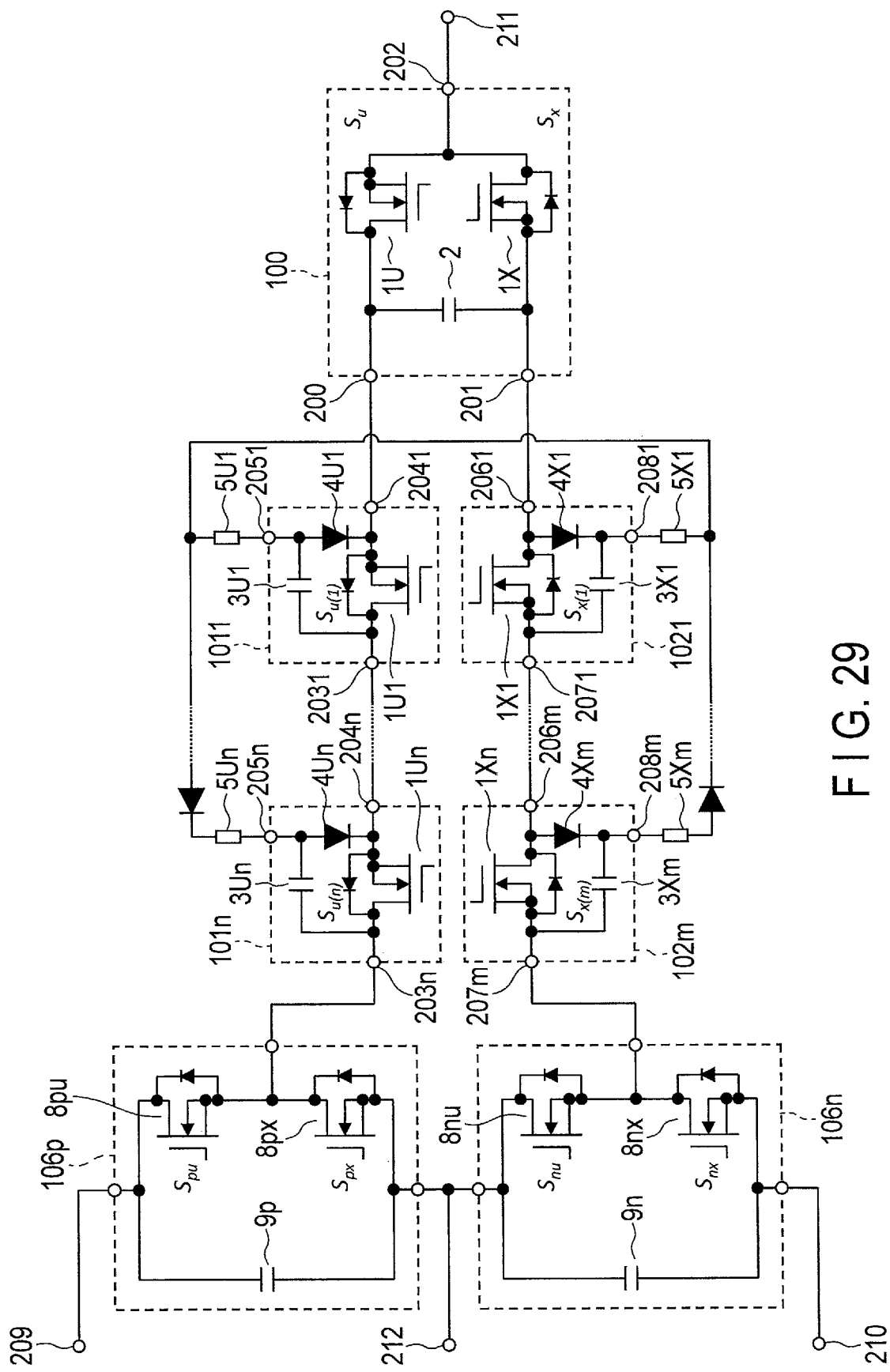
F I G. 29

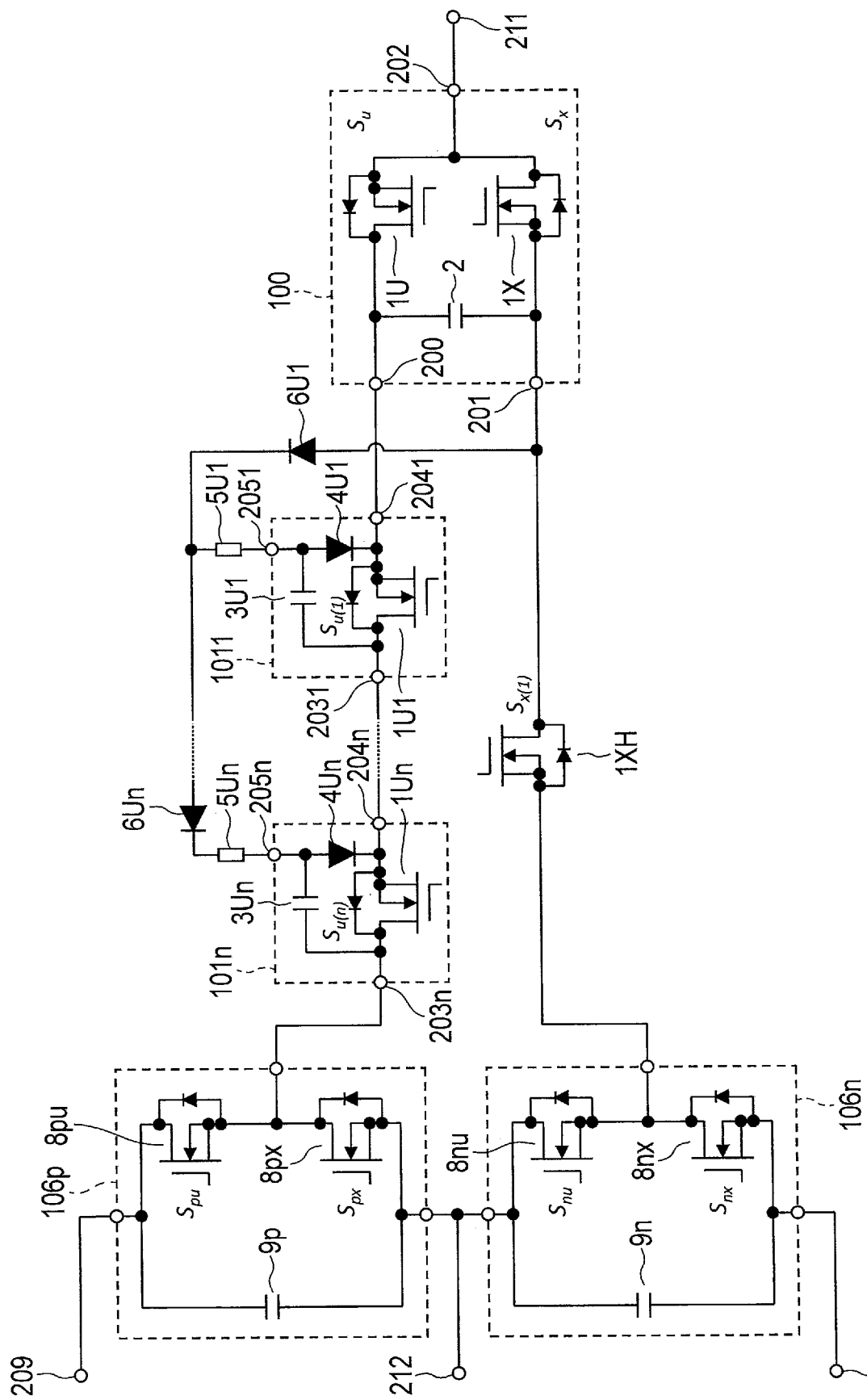
F I G. 32

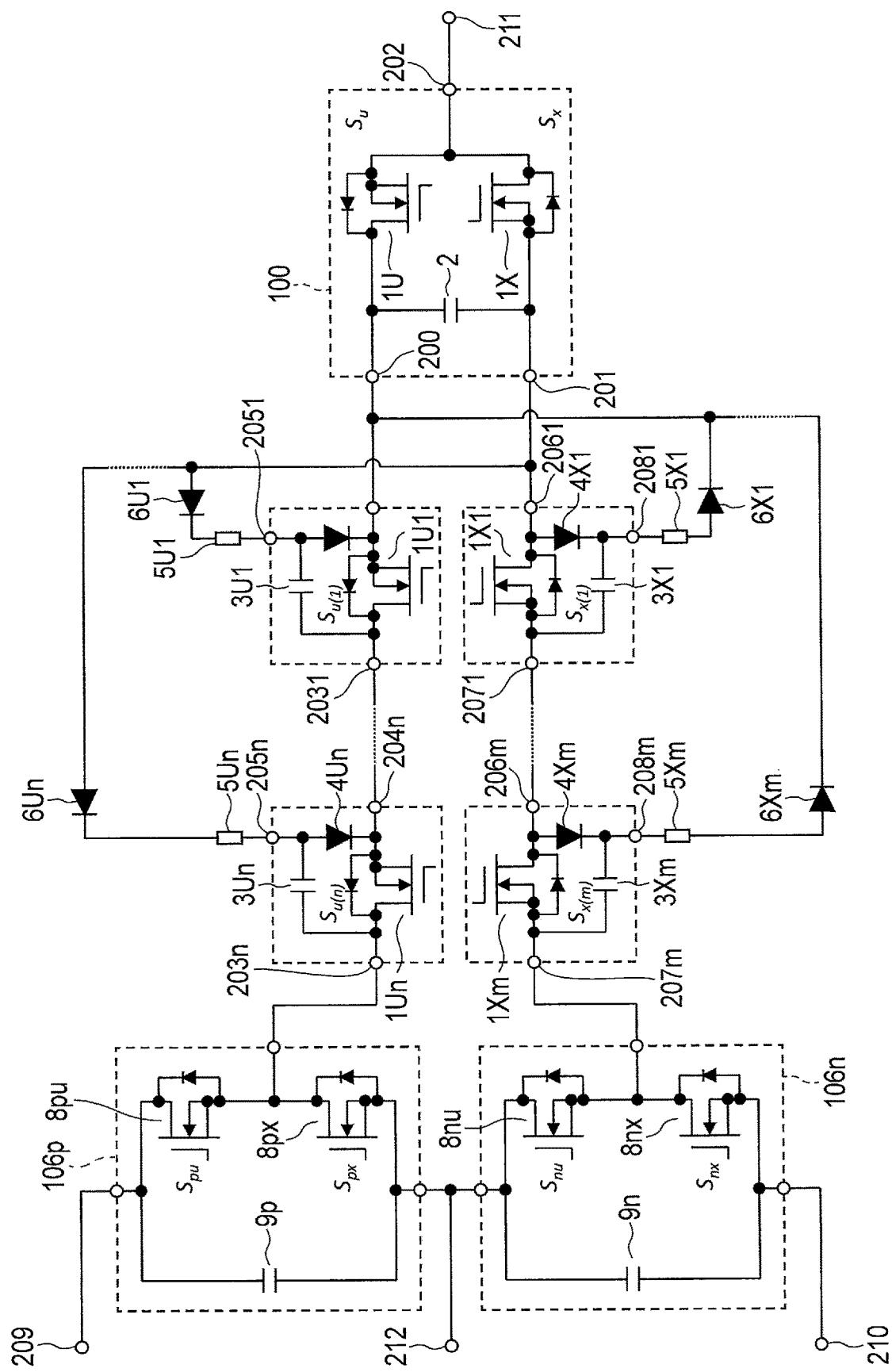
F I G. 34

POWER CONVERSION APPARATUS

CROSS REFERENCE TO RELATED APPLICATIONS

This application is a Continuation Application of PCT Application No. PCT/JP2019/049009, filed Dec. 13, 2019 and based upon and claiming the benefit of priority from Japanese Patent Application No. 2018-245602, filed Dec. 27, 2018, Japanese Patent Application No. 2019-117546, filed Jun. 25, 2019, and Japanese Patent Application No. 2019-129547, filed Jul. 11, 2019, the entire contents of all of which are incorporated herein by reference.

FIELD

Embodiments of the present invention relate to a power conversion apparatus.

BACKGROUND

For example, according to a power conversion apparatus including a snubber circuit which suppresses parasitic inductance existing in a switching loop, and a surge voltage occurring due to switching, energy efficiency can be improved by regenerating the energy of the surge voltage absorbed in the snubber circuit to a DC power supply.

In addition, in recent years, a multilevel power conversion apparatus has been proposed, and such multilevel power conversion apparatus can output voltages of multiple levels. In the multilevel power converter, by generating output voltages in multiple levels, the switching loss can be suppressed without increasing the switching speed.

However, in the power conversion apparatus including the above-described snubber circuit, the energy of the surge voltage caused by increasing the switching speed is absorbed by the snubber circuit, and it is difficult to suppress a loss due to switching when the switching speed is low.

In addition, in a multilevel conversion apparatus of a diode-clamp type or a multilevel conversion apparatus of a flying capacitor type, the switching loss can be reduced without increasing the switching speed, by lowering an application voltage per switching element. However, in the multilevel power conversion apparatus of the diode clamp type and the flying capacitor type, the parasitic inductance in the switching loop becomes greater than in a conventional 2-level power conversion apparatus, and there is a case in which a greater surge current occurs. In this case, the surge voltage has to be suppressed by further lowering the switching speed, and the effect of the reduction of the switching loss cannot fully be exhibited.

Besides, a modular-type multilevel conversion apparatus has such a configuration that a switching loop is closed in one module constituted by a DC capacitor connected in parallel to 2-serial switching devices. By this configuration, the parasitic inductance does not increase, and thus the switching speed does not need to be decreased in order to suppress surge voltage. On the other hand, since a current of a primary component (basic wave component) or a secondary component an AC frequency flows in the DC capacitor, the DC capacitor needs to be enlarged, and it is difficult to reduce the size of the power conversion apparatus.

BRIEF DESCRIPTION OF THE DRAWINGS

FIG. 1 is a view schematically illustrating an example of the configuration of a power conversion apparatus of an embodiment.

FIG. 4B is a view illustrating an example of a loss occurring by turn-off of switching elements in the power conversion apparatus of the embodiment.

FIG. 4C is a view illustrating an example of a loss occurring by turn-off of switching elements in the power conversion apparatus of the embodiment.

FIG. 14 is a view schematically illustrating an example of the configuration of a power conversion apparatus of an embodiment.

FIG. 18 is a view schematically illustrating an example of the configuration of a power conversion apparatus of an embodiment.

FIG. 26 is a view schematically illustrating an example of the configuration of a power conversion apparatus of an embodiment.

FIG. 29 is a view schematically illustrating an example of the configuration of a power conversion apparatus of an embodiment.

FIG. 32 is a view schematically illustrating an example of the configuration of a power conversion apparatus of an embodiment.

FIG. 34 is a view schematically illustrating an example of the configuration of a power conversion apparatus of an embodiment.

EMBODIMENTS

Figure 2:
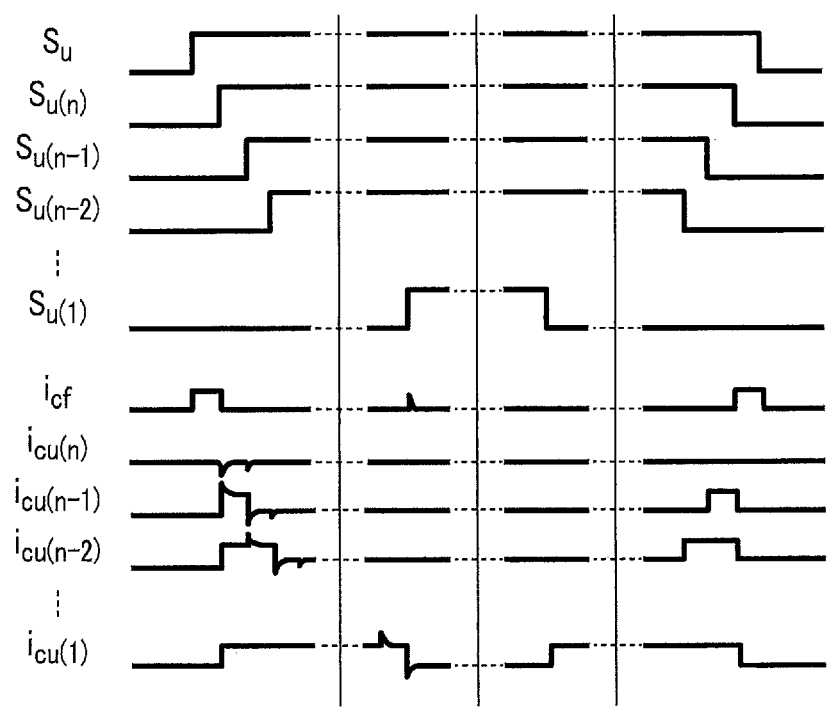
FIG. 2 is a view for describing an example of the operation of the power conversion apparatus of the embodiment.

Embodiments of the present invention have been made in consideration of the above circumstances, and the object is to provide a power conversion apparatus which can reduce an energy loss and can avoid an increase in size.

A power conversion apparatus according to an embodiment includes an inverter cell including an upper-side switching element connected between an AC terminal and a high-potential-side terminal, a lower-side switching element connected between the AC terminal and a low-potential-side terminal, and a floating capacitor connected in parallel to the upper-side switching element and the lower-side switching element between the high-potential-side terminal and the low-potential-side terminal; an upper arm connected to the high-potential-side terminal of the inverter cell and configured such that one or a plurality of first switch circuits each including a first switching element are connected in series; and a lower arm connected to the low-potential-side terminal of the inverter cell and configured such that one or a plurality of second switch circuits each including a second switching element are connected in series. When at least one of the first switch circuits includes a first diode with a cathode connected to a low-potential-side terminal of the first switching element and includes a first capacitor connected between an anode of the first diode and a high-potential-side terminal of the first switching element, the power conversion apparatus includes a first rectification circuit which connects the low-potential-side terminal of the inverter cell and a low-potential-side terminal of the first capacitor, and when at least one of the second switch circuits includes a second diode with an anode connected to a high-potential-side terminal of the second switching element and includes a second capacitor connected between a cathode of the second diode and a low-potential-side terminal of the second switching element, the power conversion apparatus includes a second rectification circuit which connects the high-potential-side terminal of the inverter cell and a high-potential-side terminal of the second capacitor.

(Group 1)

Hereinafter, power conversion apparatuses of embodiments will be described in detail with reference to the accompanying drawings.

FIG. 1 is a view schematically illustrating an example of the configuration of a power conversion apparatus of an embodiment.

The power conversion apparatus of the embodiment is a power conversion apparatus which can execute mutual conversion between DC power and single-phase AC power. The power conversion apparatus includes an inverter cell 100, an upper arm, a lower arm, an n-number (n is an integer of 2 or more) of first regenerative rectification circuits (regenerative rectification diodes 6UN and first resistors 5UN), an m-number (m is an integer of 2 or more) of second regenerative rectification circuits (regenerative rectification diodes 6XM and second resistors 5XM), positive-side DC terminal 209, a negative-side DC terminal 210, and an AC terminal 211.

Here, N and M are N=2~n, and M=2~m, and, hereinafter, this definition will be the same unless otherwise defined.

The upper arm of the power conversion apparatus of the embodiment includes an n-number of switch circuits (voltage-clamp-type switch circuits) 101N. The lower arm of the power conversion apparatus of the embodiment includes an m-number of switch circuits (voltage-clamp-type switch circuits) 102M.

Note that, in the power conversion apparatus of the embodiment, a DC capacitor (not shown) is electrically connected between the positive-side DC terminal 209 and negative-side DC terminal 210. The DC capacitor may be included in the power conversion apparatus, or may be attached to the outside of the power conversion apparatus.

The inverter cell 100 includes a switching element (upper-side switching element) 1U, a switching element (lower-side switching element) 1X, a floating capacitor 2, a positive-side cell terminal (high-potential-side terminal) 200, a negative-side cell terminal (low-potential-side terminal) 201, and a cell AC terminal (AC terminal) 202. Note that it suffices that the positive-side cell terminal 200, negative-side cell terminal 201 and cell AC terminal 202 are configured such that circuits can be electrically connected at the positions of these terminals, and the terminals may be omitted.

The switching element 1U and switching element 1X are, for example, MOSFETs (Metal-Oxide Semiconductor Field-Effect Transistors). The drain (high-potential-side terminal) of the switching element 1U is electrically connected to the positive-side cell terminal 200, and the source (low-potential-side terminal) thereof is electrically connected to the drain (high-potential-side terminal) of the switching element 1X. The source (low-potential-side terminal) of the switching element 1X is electrically connected to the negative-side cell terminal 201. A node between the switching element 1U and switching element 1X is electrically connected to the cell AC terminal 202.

The floating capacitor 2 is connected in parallel to the switching element 1U and switching element 1X. One end of the floating capacitor 2 is electrically connected to the drain of the switching element 1U and the positive-side cell terminal 200, and the other end of the floating capacitor 2 is electrically connected to the source of the switching element 1X and the negative-side cell terminal 201.

Each of the n-number of switch circuits (first switch circuits) 101N includes a switching element (first switching element) 1UN, a diode (first diode) 4UN, a capacitor (first capacitor) 3UN, a snubber terminal 205N, a positive-side terminal 203N, and a negative-side terminal 204N.

Note that it suffices that the snubber terminal 205N, positive-side terminal 203N and negative-side terminal 204N are configured such that circuits can be electrically connected at the positions of these terminals, and the terminals may be omitted. In addition, the switch circuit 101N may include a plurality of switching elements 1UN. In this case, the switching elements 1UN are connected in parallel to the capacitor 3UN and diode 4UN between the positive-side terminal 203N and negative-side terminal 204N. The switching elements 1UN may be connected in series to each other, or may be connected in parallel to each other.

The switching element 1UN is, for example, a MOSFET. The drain (high-potential-side terminal) of the switching element 1UN is electrically connected to the positive-side terminal 203N, and the source (low-potential-side terminal) of the switching element 1UN is electrically connected to the negative-side terminal 204N.

The cathode of the diode 4UN is electrically connected to the source of the switching element 1UN and the negative-side terminal 204N, and the anode thereof is electrically connected to the snubber terminal 205N. Note that it is preferable that the diode 4UN has fast recovery characteristics with a low recovery loss, and it is preferable that, for example, a Schottky barrier diode (SBD) with good recovery characteristics or an element utilizing a wide bandgap semiconductor (e.g. SiC, GaN) is used as the diode 4UN.

One end (high-potential-side terminal) of the capacitor 3UN is electrically connected to the drain of the switching element 1UN and the positive-side terminal 203N, and the other end (low-potential-side terminal) thereof is electrically connected to the anode of the diode 4UN and electrically connected to the snubber terminal 205N.

The n-number of switch circuits 101N are connected in series. Specifically, the positive-side terminal (high-potential-side terminal) 203N of a switch circuit 101N is electrically connected to the negative-side terminal (low-potential-side terminal) 204N of a switch circuit 101N which neighbors on the high-potential side. In addition, the positive-side terminal 203N (N=n) of a switch circuit 101N, which is located on the most high-potential side among the switch circuits 101N, is electrically connected to the positive-side DC terminal 209. On the other hand, the negative-side terminal 204N of a switch circuit 101N is electrically connected to the positive-side terminal 203N of a switch circuit 101N which neighbors on the low-potential side. In addition, the negative-side terminal 204N (N=1) of a switch circuit 101N, which is located on the most low-potential side, is electrically connected to the positive-side cell terminal 200 of the inverter cell 100.

The n-number of regenerative rectification diodes 6UN (N=1~n) are connected in series to each other, with a direction from the low-potential side toward the high-potential side being set as a forward direction. Each of the n-number of regenerative rectification diodes 6UN (N=1~n) is connected between the low-potential-side terminal of the switching element 1X (the low-potential-side terminal of the inverter cell 100) and the low-potential-side terminal of the capacitor 3U1 of the first switch circuit 101 which is located on the most low-potential side, or the low-potential-side terminal of the capacitor 3UN of a neighboring first switch circuit 101N.

The cathode of each of the regenerative rectification diodes (first regenerative rectification diodes) 6UN (N=1~n) is electrically connected to the snubber terminal 205N (N=1~n) of the switch circuit 101N and the anode of the regenerative rectification diode 6UN (N=1~n) which neighbors on the high-potential side. For example, the cathode of a regenerative rectification diode 6Uk (1≤k≤n−1) is electrically connected to a snubber terminal 205k of a switch circuit 101k and the anode of a regenerative rectification diode 6U(k+1).

One end of the resistor 5UN is connected in series to a connection node between the diode 4UN and capacitor 3UN (a part of a structure which electrically connects the other end (low-potential-side terminal) of the capacitor 3UN and the anode of the diode 4UN). The other end of the resistor 5UN is electrically connected via the regenerative rectification diode 6UN to a circuit in which the capacitor 3UN and resistor 5UN of the switch circuit 101N connected on the low-potential side are connected in series. The other end of the resistor 5UN of the switch circuit 101N (N=1), which is located on the most low-potential side, is electrically connected to the negative-side cell terminal 201 of the inverter cell 100 via regenerative rectification diode 6UN.

Each of the m-number of switch circuits (second switch circuits) 102M includes a switching element (second switching element) 1XM, a diode (second diode) 4XM, a capacitor (second capacitor) 3XM, a snubber terminal 208M, a positive-side terminal 206M, and a negative-side terminal 207M.

Note that it suffices that the positive-side terminal 206M, negative-side terminal 207M and snubber terminal 208M are configured such that circuits can be electrically connected at the positions of these terminals, and the terminals may be omitted. In addition, the switch circuit 102M may include a plurality of switching elements 1XM. In this case, the switching elements 1XM are connected in parallel to the capacitor 3XM and diode 4XM between the positive-side terminal 206M and negative-side terminal 207M. The switching elements 1XM may be connected in series to each other, or may be connected in parallel to each other.

The switching element 1XM is, for example, a MOSFET. The drain (high-potential-side terminal) of the switching element 1XM is electrically connected to the positive-side terminal 206M, and the source (low-potential-side terminal) of the switching element 1XM is electrically connected to the negative-side terminal 207M.

The anode of the diode 4XM is electrically connected to the drain of the switching element 1XM and the positive-side terminal 206M, and the cathode thereof is electrically connected to the snubber terminal 208M. Note that it is preferable that the diode 4XM has fast recovery characteristics with a low recovery loss, and it is preferable that, for example, a Schottky barrier diode (SBD) with good recovery characteristics or an element utilizing a wide bandgap semiconductor (e.g. SiC, GaN) is used as the diode 4XM.

One end (low-potential-side terminal) of the capacitor 3XM is electrically connected to the source of the switching element 1XM and the negative-side terminal 207M, and the other end (high-potential-side terminal) thereof is electrically connected to the cathode of the diode 4XM and electrically connected to the snubber terminal 208M.

The m-number of switch circuits 102M are connected in series. Specifically, the positive-side terminal 206M of a switch circuit 102M is electrically connected to the negative-side terminal 207M of a switch circuit 102M which neighbors on the high-potential side. In addition, the positive-side terminal 206M (M=n) of a switch circuit 102M, which is located on the most high-potential side, is electrically connected to the negative-side cell terminal 201 of the inverter cell 100. On the other hand, the negative-side terminal 207M of a switch circuit 102M is electrically connected to the positive-side terminal 20GM of a switch circuit 102M which neighbors on the low-potential side. In addition, the negative-side terminal 207M (M=1) of a switch circuit 102M, which is located on the most low-potential side, is electrically connected to the negative-side DC terminal 210.

The m-number of regenerative rectification diodes (second regenerative rectification diodes) 6XM (M=1~m) are connected in series to each other, with a direction from the low-potential side toward the high-potential side being set as a forward direction. Each of the m-number of regenerative rectification diodes (second regenerative rectification diodes) 6XM (M=1~m) is connected between the high-potential-side terminal of the switching element 1U (the high-potential-side terminal of the inverter cell 100) and the high-potential-side terminal of the capacitor 3X1 of the second switch circuit 1021 which is located on the most high-potential side, or the high-potential-side terminal of the capacitor 3XM of a neighboring second switch circuit 102M.

The anode of each of the regenerative rectification diodes 6XM (M=1~m) is electrically connected to the snubber terminal 208M (M=1~m) of the switch circuit 102M and the cathode of the regenerative rectification diode 6XM (M=1~m) which neighbors on the low-potential side. For example, the anode of a regenerative rectification diode 6Xj (1 □j≤m−1) is electrically connected to a snubber terminal 208j of a switch circuit 102j and the cathode of a regenerative rectification diode 6X(j+1).

One end of the resistor 5XM is connected in series to a connection node between the diode 4XM and capacitor 3XM (a part of a structure which electrically connects the other end (high-potential-side terminal) of the capacitor 3XM and the cathode of the diode 4XM). The other end of the resistor 5XM is electrically connected via the regenerative rectification diode 6XM to a circuit in which the capacitor 3XM and resistor 5XM of the switch circuit 102M connected on the high-potential side are connected in series. The other end of the resistor 5XM of the switch circuit 102M (M=1), which is located on the most high-potential side, is electrically connected to the positive-side cell terminal 200 of the inverter cell 100 via regenerative rectification diode 6XM.

Specifically, the power conversion apparatus of the present embodiment includes, when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element 1UN, the regenerative rectification circuit which connects the low-potential-side terminal of the inverter cell 100 and the low-potential-side terminal of the first capacitor 3UN of the upper arm, with a direction from the low-potential side toward the high-potential side being set as a forward direction.

In addition, the power conversion apparatus of the present embodiment includes, when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects the high-potential-side terminal of the inverter cell 100 and the high-potential-side terminal of the second capacitor 3XM of the lower arm, with a direction from the low-potential side toward the high-potential side being set as a forward direction.

In the power conversion apparatus of the present embodiment, although it is preferable that the number n of switch circuits 101N and the number m of switch circuits 102M are equal, the numbers n and m may be different.

In addition, in the power conversion apparatus of the present embodiment, the switching elements 1U, 1X, 1UN and 1XM are not limited to MOSFETs, and may be IGBTs (Insulated Gate Bipolar Transistors) or mechanical switches.

Besides, although advantageous effects of the present embodiment can be obtained even when the elements with different voltage ratings or current ratings are used as the switching elements 1U, 1X, 1UN and 1XM, it is preferable to use elements with the same voltage rating and current rating as the switching elements 1U, 1X, 1UN and 1XM.

In the power conversion apparatus of the present embodiment, a closed circuit is constituted via the positive-side DC terminal 209, negative-side DC terminal 210 and DC capacitor. There is a case where a surge voltage occurs due to a parasitic inductance (not shown) which parasitizes this closed circuit. At this time, in the power conversion apparatus of the present embodiment, the surge voltage that occurs can be suppressed by the capacitors 3UN and 3XM.

Next, an example of the operation of the power conversion apparatus of the present embodiment will be described.

In the power conversion apparatus of the embodiment, as will be described later, the switching elements 1UN of the upper arm and the switching elements 1XM of the lower arm are sequentially switched at predetermined time intervals, and thereby losses, such as a turn-on loss, a turn-off loss and a recovery loss, can be reduced.

In the state in which all of the switching elements 1U and 1X of the inverter cell 100, the switching elements 1UN of the upper arm and the switching elements 1XM of the lower arm are rendered off, when current is output from the AC terminal 211, current flows in a parasitic diode of the switching element 1X of the inverter cell 100 and a parasitic diode of the switching element 1XM of the switch circuit 102M.

In this state, if the switching element 1U of the inverter cell 100 is rendered on, current flows in parasitic diodes of the switching elements 1XM of the switch circuits 102M of the lower arm, flows in such a direction as to discharge the floating capacitor 2 in the inverter cell 100, and flows through the switching element 1U, thus flowing to the AC terminal 211.

Subsequently, any one of the switching elements 1UN of the switch circuits 101N of the upper arm is rendered on. Here, a description is given of the case in which the switching element 1Un of the switch circuit 101n is rendered on.

If the switching element 1Un is rendered on, the voltage that is applied to one of the switch circuits 101N is divided into a series number (=m) of the switch circuits 102M, and the divided voltages are applied to the switch circuits 102M, respectively. Thus, the voltage, which is applied at the time of recovery of the parasitic diodes of the switching elements 1XM of the switch circuits 102M, decreases, and the loss (recovery loss) occurring at the time of recovery is reduced. Further, a variation amount of recovery current is decreased by the parasitic inductance of the switching group, which increases in accordance with the series number of switch circuits 102M, and, as a result, the recovery charge decreases and the recovery loss is reduced.

If voltage is applied to the switch circuit 102M, current is unable to flow in the parasitic diode of the switching element 1XM, and is commutated to the switch circuit 101N. Accordingly, in the switch circuit 101n, current flows through the switching element 1Un that is rendered on, and, in the switch circuits 1011 to 101(n−1), current flows in the capacitors 3U1 to 3U(n−1) and diodes 4U1 to 4U(n−1).

By the transition of the state of flowing of the current, for example, the energy, which is converted to heat as a switching loss in the conventional 2-level inverter, is stored in the capacitors 3U1 to 3U(n−1) in the power conversion apparatus of the present embodiment. Specifically, the switching loss in the power conversion apparatus of the present embodiment is only the loss due to the switching of the switching elements 1UN of the switch circuits 101N, and is much smaller than in the conventional 2-level inverter.

In addition, for example, by rendering on the switching element 1Un, the diode 4Un and capacitor 3Un of the switch circuit 101n are connected in parallel.

One end of the resistor 5Un is connected in series to the connection node between the diode 4Un and capacitor 3Un. The other end of the resistor 5Un is electrically connected via the regenerative rectification diode 6Un to the circuit in which the capacitor 3U(n−1) of the switch circuit 101(n−1) and the resistor 5U(n−1) are connected in series. As a result, the energy stored in the capacitor 3Un is discharged to the capacitor 3U(n−1). The discharge ends when the voltage of the capacitor 3Un becomes equal to the voltage of the capacitor 3U(n−1).

In the above-described example, when the voltage of the capacitor 3Un is higher than the voltage of the capacitor 3U(n−1), the capacitor 3Un is discharged. In addition, since the difference between the voltage of the capacitor 3Un and the voltage of the capacitor 3U(n−1) is much smaller than the voltage of each of the capacitors 3Un and 3U(n−1), discharge can be executed with high efficiency even if the resistors 5Un and 5U(n−1) intervene in the path of discharged energy.

When the switching elements 1UN of the switch circuits 101N are sequentially rendered on and all switching elements 1UN are rendered on, the energy stored in the capacitors 3UN is successively discharged, and the discharged energy is stored in the floating capacitor 2. This state is a state in which the switching elements of the upper arm of the power conversion apparatus are rendered on.

Thereafter, if the switching elements 1UN are sequentially rendered off and there comes a state in which all switching elements 1UN are rendered off, the floating capacitor 2 is discharged, and the energy generated by the switching can efficiently be regenerated. Further, when the switching element 1U is rendered off, there comes a state in which the upper arm of the power conversion apparatus is turned off.

In addition, by similarly operating the switching element 1X and the switch circuits 102M, the energy generated by the switching can be stored in the floating capacitor 2 via the capacitors 3XM. Further, by discharging the energy stored in the floating capacitor 2, the energy generated by the switching can efficiently be regenerated.

As described above, in the power conversion apparatus of the present embodiment, for example, most of the energy at the time of switching, which is the loss in the conventional 2-level inverter, can be stored in the floating capacitor 2 via the capacitors 3UN and 3XM, and, by discharging the floating capacitor 2, the switching loss can be reduced without increasing the switching speed. Furthermore, by applying a low voltage to the switching elements 1UN and 1XM at the time of recovery of the parasitic diodes of the switching elements 1UN and 1XM, the recovery loss can be reduced.

FIG. 2 is a view for describing an example of the operation of the power conversion apparatus of the embodiment.

Here, FIG. 2 illustrates a timing chart showing an example of turn-on timing and turn-off timing of a gate signal Su of the switching element 1U and gate signals Su(N) of the switching elements 1UN of the upper arm, and illustrates an example of a relationship between currents icu(N) flowing in the capacitors 3UN and a current icf flowing in the floating capacitor 2. Note that, in FIG. 2, as regards the direction of the current icu(N) and current icf, the direction of output from the AC terminal 211 is a positive direction. In addition, in the period shown in FIG. 2, the switching element 1X and the switching elements 1XM of the lower arm are in the OFF state.

To begin with, from the state in which the switching element 1U and the switching elements 1UN of the upper arm are in the OFF state, the switching element 1U of the inverter cell 100 is turned on. Thereby, current icf flows in the floating capacitor 2, and the stored energy is discharged.

Subsequently, the switching elements 1UN of the switch circuits 101N of the upper arm are sequentially turned on. The order in which the switching elements 1UN of the switch circuits 101N are turned on is not limited. Here, a description is given of an example in which the switching elements 1UN are sequentially turned on in the order from the switching element 1Un of the switch circuit 101n, which is located on the side close to the positive-side DC terminal 209 (the high-potential side), to the switching element 1U1 of the switch circuit 1011, which is located on the side close to the inverter cell 100 (the low-potential side).

If the switching element 1Un is turned on, the current, which flows from the negative-side DC terminal 210 through the parasitic diodes of the switching elements 1XM of the switch circuits 102M of the lower arm, is commutated so as to flow to the positive-side DC terminal 209. Thereby, the discharge of the floating capacitor 2 is finished.

If the current is commutated to the positive-side DC terminal 209, current flows through the turned-on switching element 1Un, and the capacitors 3U1~3U(n−1) and diodes 4U1~4U(n−1) which are connected in parallel to the switching elements 1U1~1U(n−1) that are turned off.

In addition, the capacitor 3Un, which is connected in parallel to the turned-on switching element 1Un, and the capacitor 3U(n−1) of the switch circuit 101(n−1) that is connected to the low-potential side, are connected via the regenerative rectification diode 6Un, and the energy stored in the capacitor 3Un is discharged to the capacitor 3U(n−1).

Next, if the switching element 1U(n−1) of the switch circuit 101(n−1), which is connected to the low-potential side of the switch circuit 101n, is turned on, the current flowing in the capacitor 3U(n−1) is commutated to the switching element 1U(n−1), and the charge to the capacitor 3U(n−1) is finished.

Subsequently, if the switching element 1U(n−1) of the switch circuit 101(n−1) is turned on, the capacitor 3U(n−1) and the capacitor 3U(n−2) of the switch circuit 101(n−2), which is connected to the low-potential side, are connected via the regenerative rectification diode 6U(n−1), and the energy stored in the capacitor 3U(n−1) is discharged to the capacitor 3U(n−2).

In the example illustrated in FIG. 2, FIG. 2 illustrates the timings of two discharge operations, i.e. the discharge from the capacitor 3Un to capacitor 3U(n−1), and the discharge from the capacitor 3U(n−1) to capacitor 3U(n−2). Since the discharge between the capacitors 3UN varies depending on the relation in voltage between the capacitors 3UN, the discharge is not limited to this example. For example, when the voltage of the capacitor 3Un is higher than the voltages of the capacitor 3U(n−1) and capacitor 3U(n−2), the energy stored in the capacitor 3Un is discharged to the capacitor 3U(n−1) and capacitor 3U(n−2). Specifically, the energy stored in the capacitor 3Un can be discharged to one or a plurality of other capacitors 3UN having lower voltages.

For example, as illustrated in FIG. 2, if the switching element 1U is turned on, and the switching element 1Un to switching element 1U1 are sequentially turned on, all switching elements of the upper arm of the power conversion apparatus are turned on, and the energy successively discharged from the capacitor 3Un to capacitor 3U1 is ultimately charged in the floating capacitor 2.

Subsequently, the switching element 1U of the inverter cell 100 and the switching elements 1UN of the switch circuits 101N are sequentially turned off. The order in which the switching elements 1UN are turned off is not limited. Here, a description is given of an example in which the switching elements 1UN are sequentially turned off in the order from the switching element 1U1 of the switch circuit 1011, which is located on the side close to the inverter cell 100 (the low-potential side), to the switching element 1Un of the switch circuit 101n, which is located on the side close to the positive-side DC terminal 209 (the high-potential side). The switching element 1U is turned off after all of the switching elements 1UN are turned off.

In the state in which the switching element 1U and the switching elements 1UN are all turned on, for example, if the switching element 1U1 is turned off, the current flowing through the switching element 1U1 flows to the capacitor 3U1, and the capacitor 3U1 is charged. At this time, since the energy, which is converted to heat as a switching loss, for example, in the conventional 2-level inverter, is charged in the capacitor 3U1, a switching operation with high efficiency can be performed.

The above-described turn-off operation is sequentially performed from the switching element 1U1 to the switching element 1Un. Thereby, the energy charged in the capacitors 3U1 to 3U(n−1) is sequentially discharged to the capacitor 3Un. Subsequently, if the switching element 1Un is turned off, the energy stored in the capacitor 3Un is ultimately charged in the floating capacitor 2.

If the above-described turn-off operation is finished, there comes the state in which the switching element 1U is turned on and all the switching elements 1UN are turned off, and the energy charged in the floating capacitor 2 is discharged. Thereby, the energy stored in the floating capacitor 2 can efficiently be regenerated.

Thereafter, if the switching element 1U is turned off, the discharge of the floating capacitor 2 is finished.

According to the switching operation of the switching elements 1U and 1UN, the charge current flowing in the capacitor 3Un, which is connected in parallel to the first turned-on switching element 1Un, is small, and the charge current flowing in the capacitor 3U1, which is connected in parallel to the last turned-on switching element 1U1, is large.

In addition, the charge current flowing in the capacitor 3U1, which is connected in parallel to the first turned-off switching element 1U1, is large, and the charge current flowing in the capacitor 3Un, which is connected in parallel to the last turned-off switching element 1Un, is small.

Accordingly, there is a tendency that the charge current flowing in the capacitor 3UN connected in parallel to the switching element 1UN, the turn-on timing of which is later and the turn-off timing of which is earlier, increases, and the duty thereof is large. By adjusting the electrostatic capacitance of the capacitor 3UN in accordance with the duty thereof, the heat generation or voltage increase of the capacitor 3UN itself can be suppressed.

Hereinafter, examples of the advantageous effects of the power conversion apparatus of the present embodiment will be described.

FIG. 3A to FIG. 5B are views for describing examples of the advantageous effects of the power conversion apparatus of the embodiment.

Figures 3A, 3B:
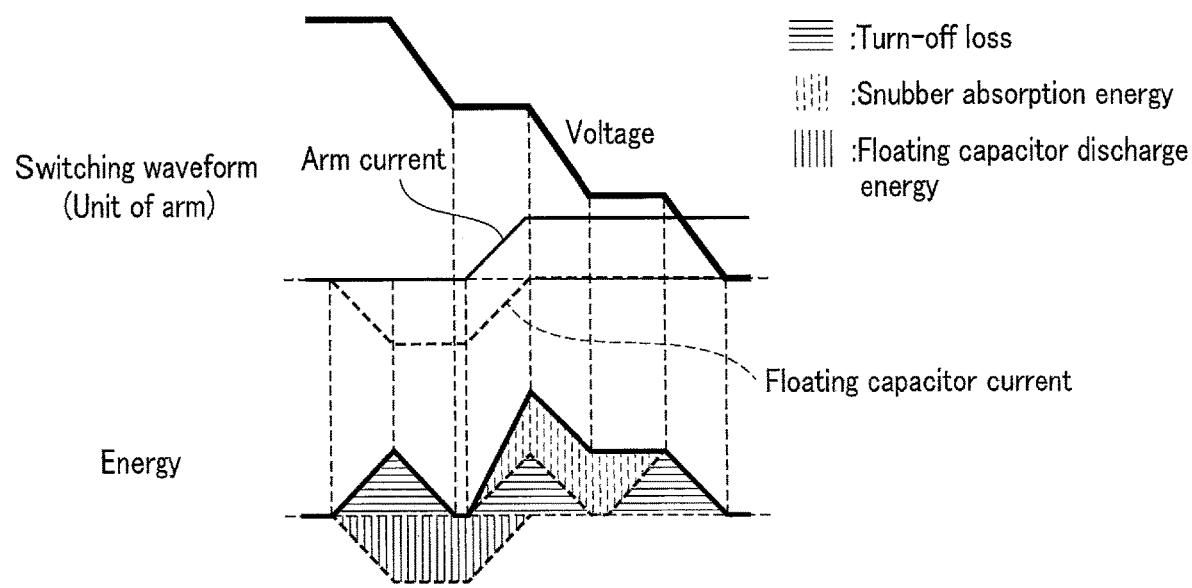
FIG. 3A is a view illustrating, as a comparative example, an example of a loss occurring by turn-on of a switching element in a conventional 2-level inverter.
FIG. 3B is a view illustrating an example of a loss occurring by turn-on of switching elements in the power conversion apparatus of the embodiment.

FIG. 3A is a view illustrating, as a comparative example, an example of a loss occurring by turn-on of a switching element in a conventional 2-level inverter.

FIG. 3B is a view illustrating an example of a loss occurring in an arm by turn-on of switching elements in the power conversion apparatus of the embodiment.

Figure 3C:
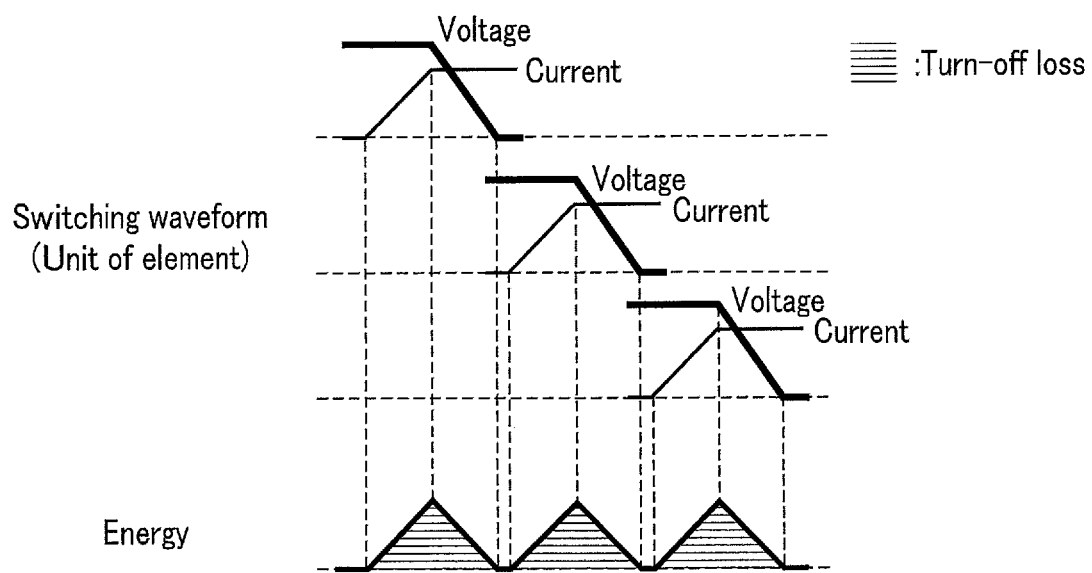
FIG. 3C is a view illustrating an example of a loss occurring by turn-on of switching elements in the power conversion apparatus of the embodiment.

FIG. 3C is a view illustrating an example of a loss occurring in each element by turn-on of switching elements in the power conversion apparatus of the embodiment.

For example, as illustrated in FIG. 3A, in the conventional 2-level inverter, at a timing when the switching element is turned on, the current flowing through the switching element increases and the voltage applied to the switching element decreases. The energy, which occurs in the switching element by the current flowing through the switching element and the voltage applied to the switching element, changes to heat without being absorbed by other elements, and becomes a switching loss.

On the other hand, in the power conversion apparatus of the present embodiment, as illustrated in FIG. 3C, when consideration is given to each switching element, energy occurs at a turn-on time, like the conventional art. However, as illustrated in FIG. 3B, when consideration is given to the entire arm, the energy occurring at a switching time is absorbed by the capacitors 3UN. The energy stored in the capacitors 3UN is discharged to the floating capacitor 2, and is regenerated as discharge energy of the floating capacitor 2. Thus, the loss in the entire arm is part of the energy occurring when the switching elements 1U and 1UN are turned on, and the energy efficiency is improved.

Figure 4A:
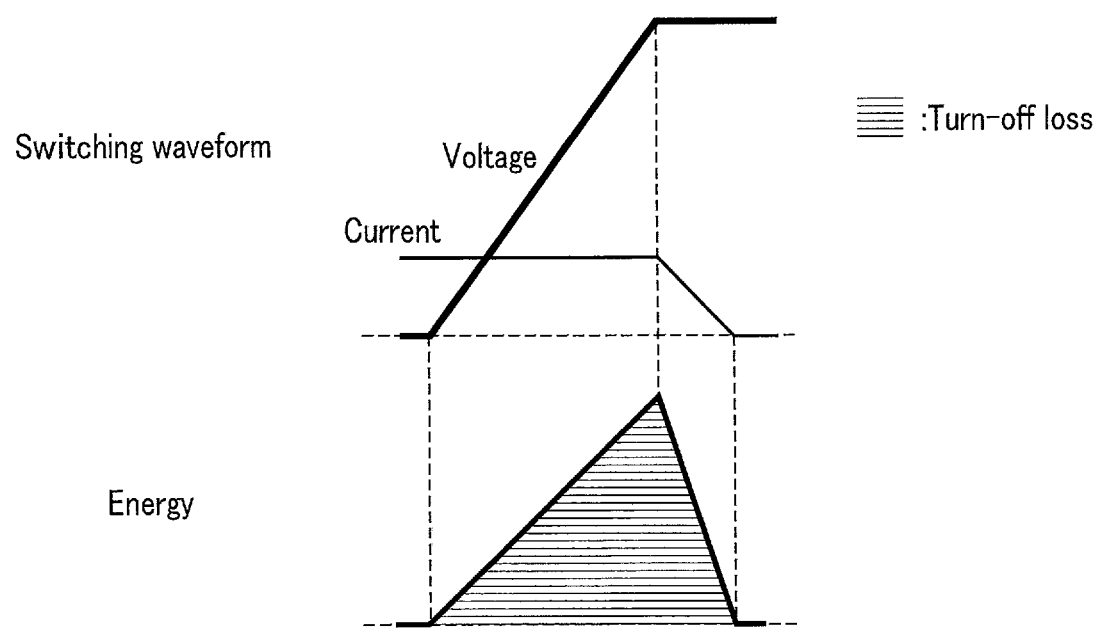
FIG. 4A is a view illustrating, as a comparative example, an example of a loss occurring by turn-off of a switching element in a conventional 2-level inverter.

FIG. 4A is a view illustrating, as a comparative example, an example of a loss occurring by turn-off of a switching element in a conventional 2-level inverter.

FIG. 4B is a view illustrating an example of a loss occurring in an arm by turn-off of switching elements in the power conversion apparatus of the embodiment.

FIG. 4C is a view illustrating an example of a loss occurring in each element by turn-off of switching elements in the power conversion apparatus of the embodiment.

For example, as illustrated in FIG. 4A, in the conventional 2-level inverter, at a timing when the switching element is turned off, the voltage applied to the switching element increases and the current flowing through the switching element decreases. In this manner, the energy, which occurs in the switching element by the current flowing through the switching element and the voltage applied to the switching element, changes to heat without being absorbed by other elements, and becomes a switching loss.

On the other hand, in the power conversion apparatus of the present embodiment, as illustrated in FIG. 4C, when consideration is given to each switching element, energy occurs at a turn-off time, like the conventional art. However, as illustrated in FIG. 4B, when consideration is given to the entire arm, the energy occurring at a switching time is absorbed by the capacitors 3UN and is regenerated as discharge energy of the floating capacitor 2. Thus, the loss in the entire arm is part of the energy occurring when the switching elements 1U and 1UN are turned off, and the energy efficiency is improved.

Figure 5A:
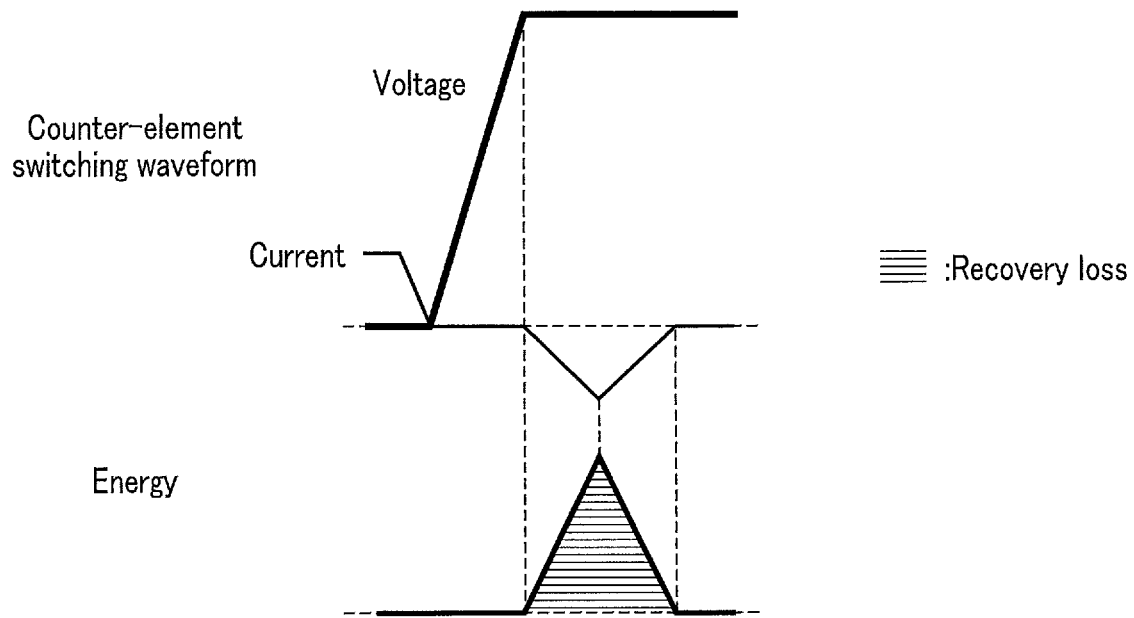
FIG. 5A is a view illustrating, as a comparative example, an example of a recovery loss occurring in a conventional 2-level inverter.

FIG. 5A is a view illustrating, as a comparative example, an example of a recovery loss occurring in a conventional 2-level inverter.

Figure 5B:
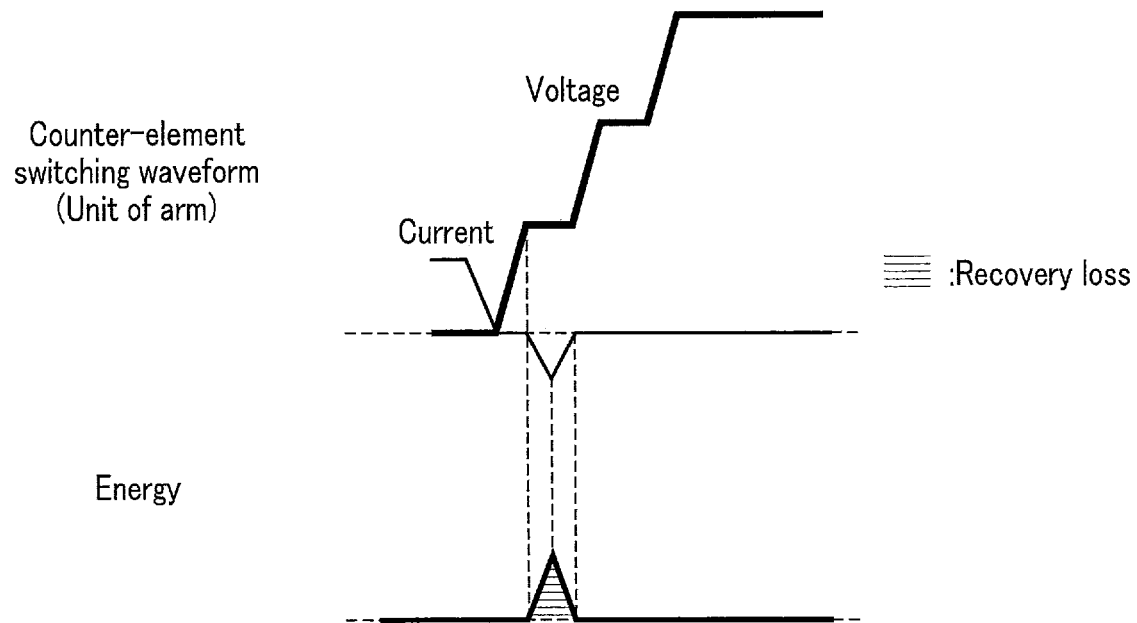
FIG. 5B is a view illustrating an example of a recovery loss occurring in the power conversion apparatus of the embodiment.

FIG. 5B is a view illustrating an example of a recovery loss occurring in the power conversion apparatus of the embodiment.

For example, as illustrated in FIG. 5A, in the conventional 2-level inverter, when the switching element of the lower arm is turned on, a recovery loss occurs by the current flowing in the parasitic diode at the time of recovery of the parasitic diode of the switching element of the upper arm and the applied voltage.

On the other hand, in the power conversion apparatus of the present embodiment, for example, when any one of the switching elements 1XM is turned on, as illustrated in FIG. 5B, the voltage applied to one of the switch circuits 102M is divided into a series number (=n) of the switch circuits 101N, and the divided voltages are applied to the switch circuits 101N, respectively. Thus, the voltage applied at the time of recovery of the parasitic diodes of the switching elements 1UN of the switch circuits 101N decreases, and the loss (recovery loss) occurring at the recovery time is decreased.

Note that in the present embodiment, although the operation of the upper arm (switch circuits 101N) of the power conversion apparatus was described, the same applies to the lower arm (switch circuits 101M). Specifically, when the lower arm is turned on, the switching element 1X of the inverter cell 100 is first turned on and then the switching elements 1XM are sequentially turned on at predetermined time intervals. When the lower arm is turned off, the switching elements 1XM are sequentially turned off and then the switching element 1X of the inverter cell 100 is turned off. Thereby, the switching loss and recovery loss of the switching elements 1X and 1XM can be reduced without performing high-speed switching.

As described above, according to the power conversion apparatus of the present embodiment, the suppression of a switching loss can be realized without performing high-speed switching. In addition, in the power conversion apparatus of the present embodiment, capacitors with small capacitances, which substantially correspond to snubber capacitors, are used, and capacitors with large capacitances do not need to be provided. It is thus possible to avoid an increase in size of the power conversion apparatus.

Specifically, according to the power conversion apparatus of the present embodiment, the energy loss can be held down, and an increase in size can be avoided.

Note that in the power conversion apparatus of the present embodiment, by simultaneously switching the switching elements 1UN of the upper arm and simultaneously switching the switching elements 1XM of the lower arm, it is also possible to realize a high breakdown voltage and high dv/dt, and to perform an operation of suppressing a surge voltage by high di/dt and parasitic inductance in the capacitors 3UN and capacitors 3XM.

Next, a power conversion apparatus of a second embodiment will be described in detail with reference to the drawings.

In the description below, the same structural parts as in the above-described first embodiment are denoted by like reference signs, and a description thereof is omitted.

In the present embodiment, a description will be given of a different example of the operation of the power conversion apparatus described in the above first embodiment.

Figure 6:
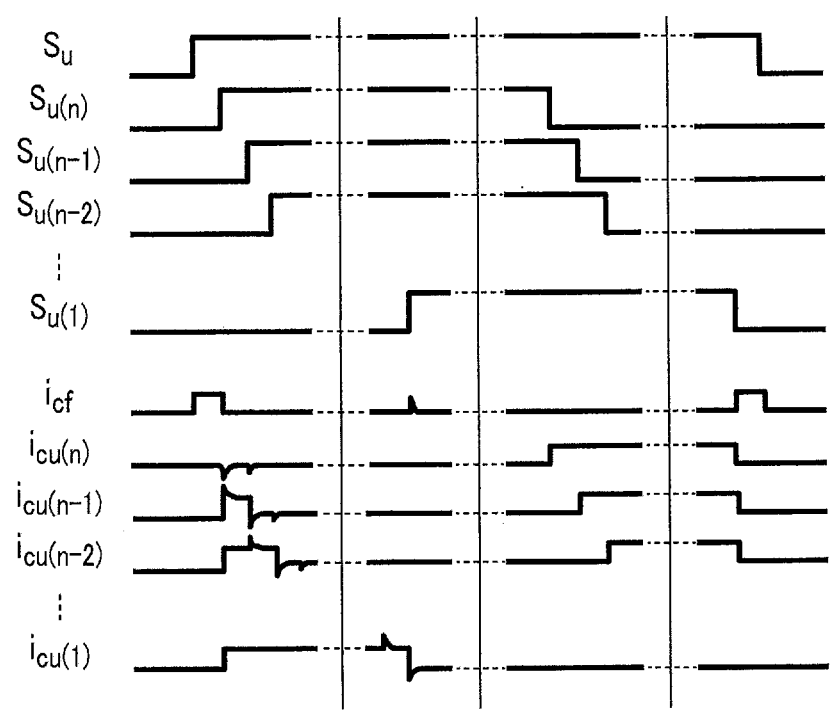
FIG. 6 is a view schematically illustrating an example of the configuration of a power conversion apparatus of an embodiment.

FIG. 6 is a view for describing another example of the operation of the power conversion apparatus of the embodiment.

Here, FIG. 6 illustrates a timing chart showing an example of turn-on timing and turn-off timing of a gate signal Su of the switching element 1U and gate signals Su(N) of the switching elements 1UN of the upper arm, and illustrates an example of a relationship between currents icu(N) flowing in the capacitors 3UN and a current icf flowing in the floating capacitor 2. Note that, in FIG. 6, as regards the direction of the current icu(N) and current icf, the direction of output from the AC terminal 211 is a positive direction. In addition, in the period shown in FIG. 6, the switching element 1X and the switching elements 1XM of the lower arm are in the OFF state.

The operation of the power conversion apparatus of the present embodiment is different from the operation in the above-described first embodiment with respect to the order of turn-off of the switching elements 1UN. In this example, the switching elements 1UN are turned off in the same order as the order in which the switching elements 1UN are turned on. For instance, in the example illustrated in FIG. 6, after the switching element 1U is turned on, the switching elements 1UN are sequentially turned on in the order from the switching element 1Un of the switch circuit 101n, which is located on the side close to the positive-side DC terminal 209 (the high-potential side), to the switching element 1U1 of the switch circuit 1011, which is located on the side close to the inverter cell 100 (the low-potential side), and, in the same order as this, the switching elements 1UN are turned off from the switching element 1Un to the switching element 1U1. The switching element 1U is turned off after all of the switching elements 1UN are turned off.

Here, a description is given of the operation of turning off the switching elements 1UN. In the state in which the switching element 1U and the switching elements 1UN are all turned on, for example, if the switching element 1Un is turned off, the current flowing through the switching element 1Un flows to the capacitor 3Un, and the capacitor 3Un is charged.

The above-described turn-off operation is sequentially performed from the switching element 1Un to the switching element 1U1. Thereby, the energy charged in the capacitor 3Un is sequentially discharged to the capacitor 3U1, and is ultimately charged in the floating capacitor 2.

If the above-described turn-off operation of the switching elements 1UN is finished, there comes the state in which the switching element 1U is turned on and all the switching elements 1UN are turned off, and the energy charged in the floating capacitor 2 is discharged. Thereby, the energy stored in the floating capacitor 2 can efficiently be regenerated.

Thereafter, if the switching element 1U is turned off, the discharge of the floating capacitor 2 is finished.

According to the switching operation of the switching elements 1U and 1UN, the charge current flowing in the capacitor 3Un, which is connected in parallel to the first turned-on switching element 1Un, is small, and the charge current flowing in the capacitor 3U1, which is connected in parallel to the last turned-on switching element 1U1, is large.

In addition, the charge current flowing in the capacitor 3Un, which is connected in parallel to the first turned-off switching element 1Un, is large, and the charge current flowing in the capacitor 3U1, which is connected in parallel to the last turned-off switching element 1U1, is small.

Accordingly, the charge currents flowing in the capacitors 3UN become substantially equal, and the duties of the capacitors 3UN also become substantially equal. Thereby, by making equal the electrostatic capacitances of the capacitors 3UN, the heat generation or voltage increase of the capacitor 3UN itself can be suppressed.

From the above, according to the power conversion apparatus of the present embodiment, like the above-described first embodiment, the suppression of a switching loss can be realized without performing high-speed switching, and an increase in size of the power conversion apparatus can be avoided.

Specifically, according to the power conversion apparatus of the present embodiment, the energy loss can be held down, and an increase in size can be avoided.

Next, a power conversion apparatus of a third embodiment will be described in detail with reference to the drawings.

In the description below, the same structural parts as in the above-described first and second embodiments are denoted by like reference signs, and a description thereof is omitted.

Figure 7:
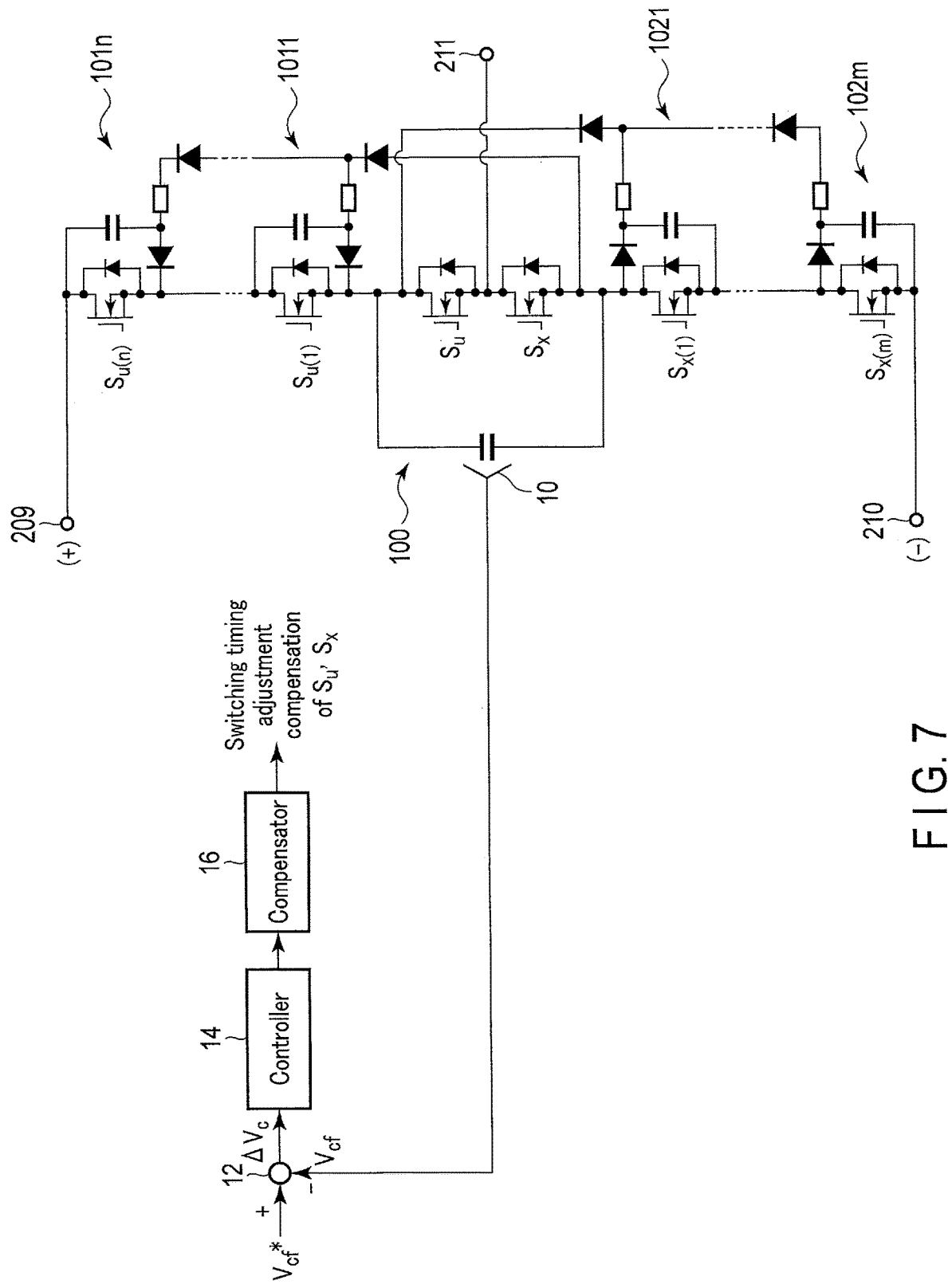
FIG. 7 is a view schematically illustrating an example of the configuration of a power conversion apparatus of an embodiment.

FIG. 7 is a view schematically illustrating an example of the configuration of the power conversion apparatus of the embodiment.

The power conversion apparatus of the embodiment is different from the first embodiment in that the power conversion apparatus of this embodiment includes a voltage detector 10, a subtracter 12, a controller 14, and a compensator 16.

A voltage instruction value Vcf* of the floating capacitor 2 and a voltage detection value Vcf of the floating capacitor 2, which is detected by the voltage detector 10, are input to the subtracter 12. The subtracter 12 outputs a difference ΔVcf, which is calculated by subtracting the voltage detection value Vcf from the voltage instruction value Vcf*, to the controller 14.

In the present embodiment, the voltage instruction value Vcf* of the floating capacitor 2 is a value that is set by, for example, the following equation (1).

$$V_{cf}^* = \max\left(\frac{V}{n+1}, \frac{V}{m+1}\right) + \alpha \quad (1)$$

In the above equation (1), α is a value greater than zero, and V is a voltage which is applied between the positive-side DC terminal 209 and negative-side DC terminal 210.

Here, according to the equation (1), the voltage instruction value Vcf* of the floating capacitor 2 becomes greater than the maximum value of a voltage (V/(n+1)) applied to each switch circuit 101N and a voltage (V/(m+1)) applied to each switch circuit 102M. By setting the voltage instruction value Vcf* in this manner, when current is commutated from the positive-side DC terminal 209 to negative-side DC terminal 210 or from the negative-side DC terminal 210 to positive-side DC terminal 209, the voltage applied to the parasitic inductance increases, and, in particular, the commutation time at the time of turning off the switching elements can be shortened.

Note that it is preferable to control the voltage of the floating capacitor 2 such that the energy by the discharge of the floating capacitor 2 becomes equal to the energy by the discharge of the capacitors 3UN and 3XM of the switch circuits 101N and 102M and the energy by the charge of magnetic energy accumulated in the parasitic inductance.

The controller 14 calculates and outputs an operation amount which decreases the difference ΔVcf, which is input from the subtracter 12, to zero. The controller 14 is, for example, a PI (proportional-plus-integral) controller which multiplies an input value by a predetermined gain and outputs the result.

The compensator 16 calculates, based on the operation amount input from the controller 14, an adjustment compensation amount for adjusting the switching timings of the switching elements 1U, 1UN, 1X and 1XM, and outputs the adjustment compensation amount to a gate signal generator (not shown). Here, the adjustment compensation amount calculated by the compensator 16 is, for example, a compensation amount for adjusting the modulation rate of the power conversion apparatus and the phase of a carrier wave.

The gate signal generator adjusts the modulation rate and the phase of the carrier wave by using the compensation amount received from the compensator 16, and can generate and output the gate signals Su, Su(N), Sx, and Sx(M) of the switching elements 1UN and 1XM, for example, by comparing the output instruction value and carrier wave.

As described above, according to the power conversion apparatus of the present embodiment, the same advantageous effects as in the above-described first embodiment can be obtained. Further, according to the power conversion apparatus of the present embodiment, the voltage of the floating capacitor 2 can be controlled, and thereby, for example, it is possible to avoid destruction of elements by a high voltage being applied to the floating capacitor 2, and to realize a stable circuit operation.

Next, a power conversion apparatus of a fourth embodiment will be described in detail with reference to the drawings.

In the description below, the same structural parts as in the above-described first to third embodiments are denoted by like reference signs, and a description thereof is omitted.

Figure 8:
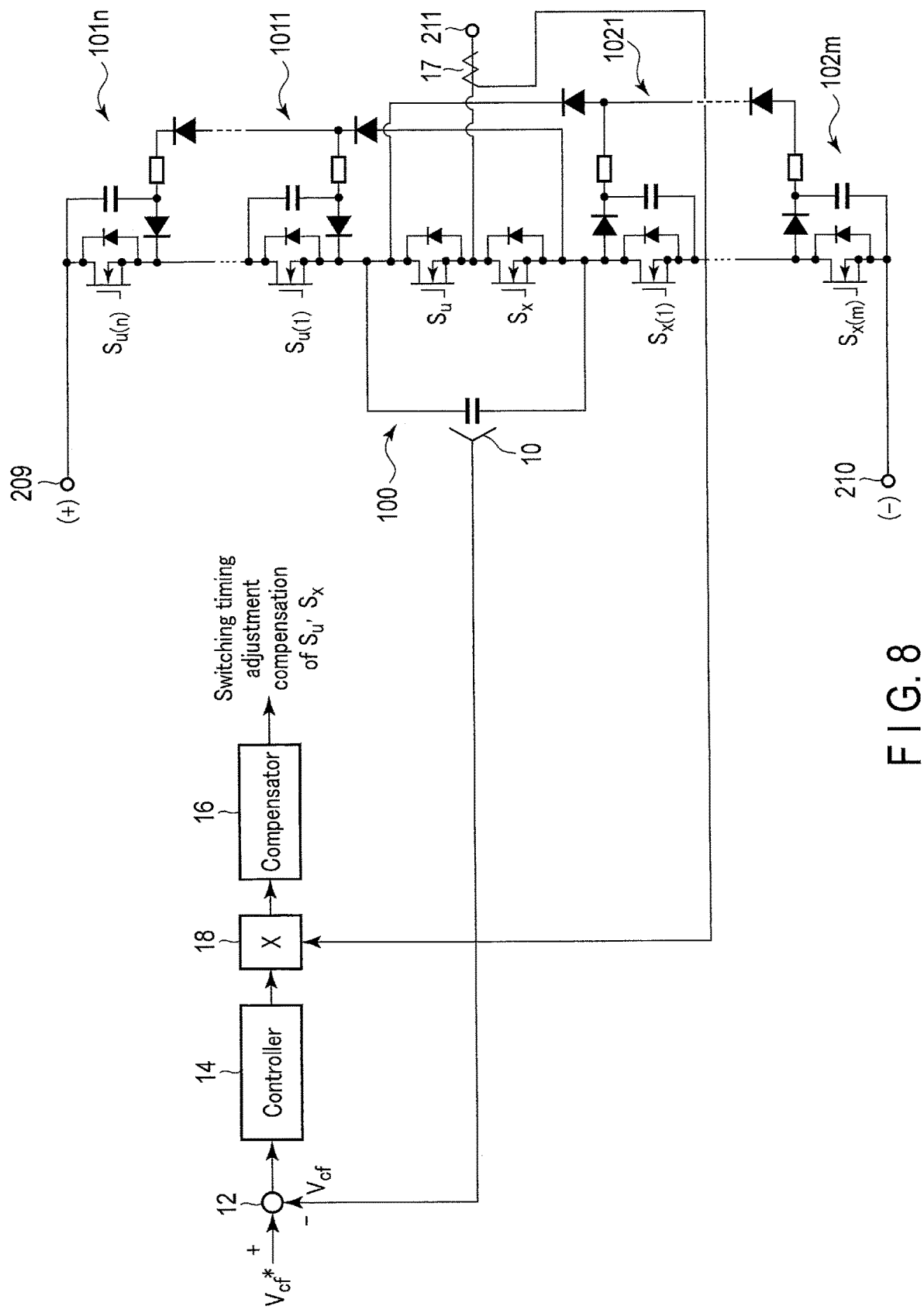
FIG. 8 is a view schematically illustrating an example of the configuration of a power conversion apparatus of an embodiment.

FIG. 8 is a view schematically illustrating an example of the configuration of the power conversion apparatus of the embodiment.

The power conversion apparatus of the embodiment is different from the first embodiment in that the power conversion apparatus of this embodiment includes a voltage detector 10, a subtracter 12, a controller 14, a compensator 16, a current detector 17, and a multiplier 18.

A voltage instruction value Vcf* of the floating capacitor 2 and a voltage detection value Vcf of the floating capacitor 2, which is detected by the voltage detector 10, are input to the subtracter 12. The subtracter 12 outputs a difference ΔVcf, which is calculated by subtracting the voltage detection value Vcf from the voltage instruction value Vcf*, to the controller 14. In the present embodiment, like the power conversion apparatus of the above-described third embodiment, the voltage instruction value Vcf* of the floating capacitor 2 is a value that is set by, for example, the equation (1).

The controller 14 calculates and outputs an operation amount which decreases the difference ΔVcf, which is input from the subtracter 12, to zero. The controller 14 is, for example, a PI (proportional-plus-integral) controller which multiplies an input value by a predetermined gain and outputs the result.

The current detector 17 detects a value of current (or a value corresponding to current) flowing in the AC terminal 211 of the power conversion apparatus, and supplies the detection value to the multiplier 18.

The multiplier 18 outputs a product, which is obtained by multiplying the operation amount input from the controller 14 and the detection value input from the current detector 17, to the compensator 16.

The compensator 16 calculates, based on the product between the operation amount input from the multiplier 18 and the current detection value, an adjustment compensation amount for adjusting the switching timings of the switching elements 1U, 1UN, 1X and 1XM, and outputs the adjustment compensation amount to a gate signal generator (not shown). Here, the adjustment compensation amount calculated by the compensator 16 is, for example, a compensation amount for adjusting the modulation rate of the power conversion apparatus and the phase of the carrier wave.

The gate signal generator adjusts the modulation rate and the phase of the carrier wave by using the compensation amount received from the compensator 16, and can generate and output the gate signals Su, Su(N), Sx, and Sx(M) of the switching elements 1UN and 1XM, for example, by comparing the output instruction value and carrier wave.

As described above, by controlling the voltage of the floating capacitor 2 by using the operation amount which is further based on the current value (or the value corresponding to current) that is output from the power conversion apparatus, it is possible to control the voltage of the floating capacitor 2 with higher precision. Thereby, it is possible to avoid destruction of elements by a high voltage being applied to the floating capacitor 2.

Thus, according to the power conversion apparatus of the present embodiment, the same advantageous effects as in the above-described first embodiment can be obtained. Furthermore, the voltage of the floating capacitor 2 can be controlled, and a stable circuit operation can be realized.

Next, a power conversion apparatus of a fifth embodiment will be described in detail with reference to the drawings.

Figure 9:
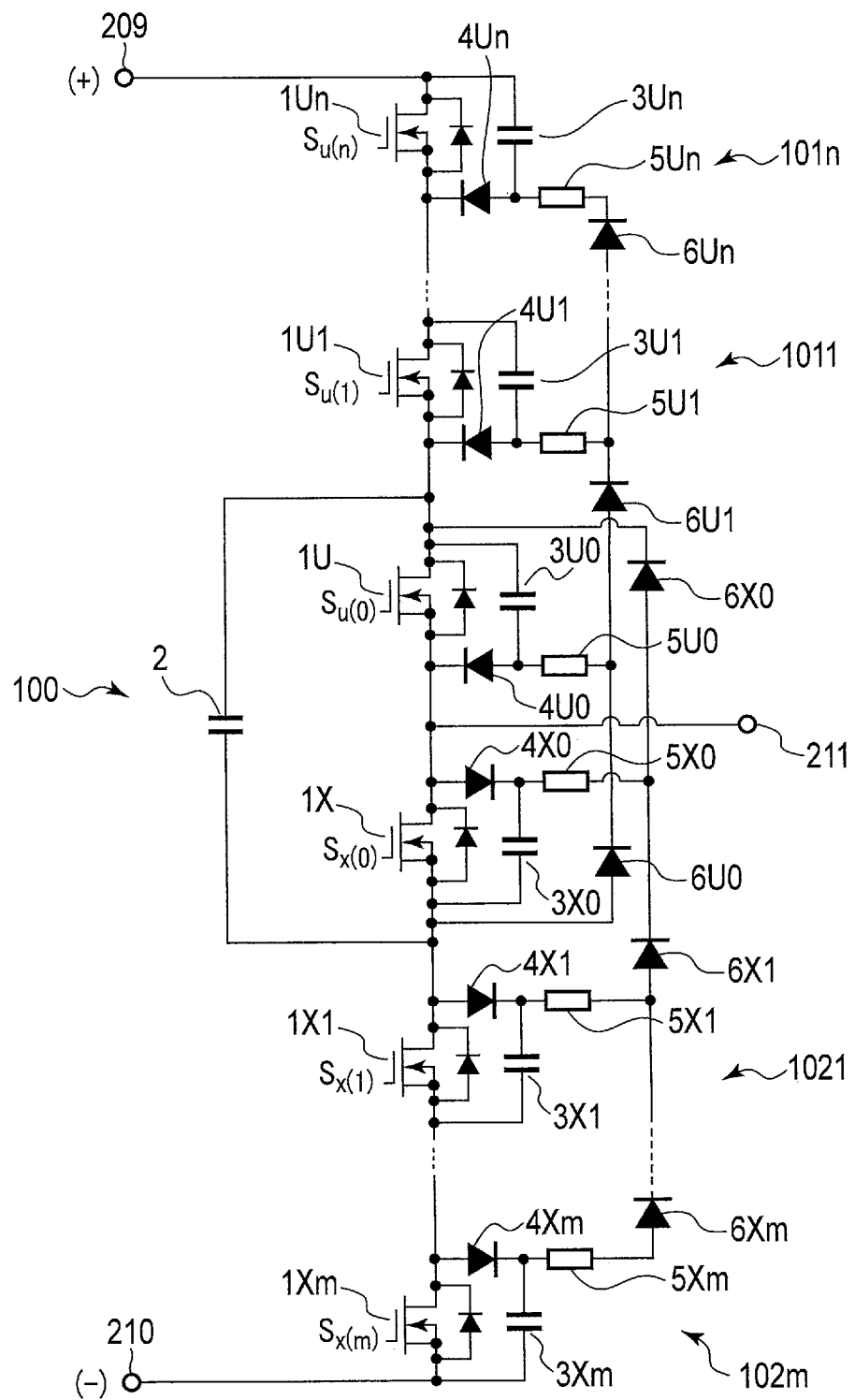
FIG. 9 is a view schematically illustrating an example of the configuration of a power conversion apparatus of an embodiment.

FIG. 9 is a view schematically illustrating an example of the configuration of the power conversion apparatus of the embodiment.

In the description below, the same structural parts as in the above-described first to fourth embodiments are denoted by like reference signs, and a description thereof is omitted.

The power conversion apparatus of the present embodiment further includes capacitors 3U0 and 3X0, diodes 4U0 and 4UX, resistors 5U0 and 5X0, and regenerative rectification diodes 6U0 and 6X0.

The cathode of the diode (upper-side diode) 4U0 is electrically connected to the source of the switching element 1U and the AC terminal 211, and the anode thereof is electrically connected to the resistor 5U0. Note that it is preferable that the diode 4U0 has fast recovery characteristics with a low recovery loss, and it is preferable that, for example, a Schottky barrier diode (SBD) with good recovery characteristics or an element utilizing a wide bandgap semiconductor (e.g. SiC, GaN) is used as the diode 4U0.

One end of the capacitor (upper-side capacitor) 3U0 is electrically connected to the drain of the switching element 1U, and the other end thereof is electrically connected to the anode of the diode 4U0 and the resistor 5U0.

One end of the resistor (upper-side resistor) 5U0 is electrically connected to the anode of the diode 4U0 and the other end of the capacitor 3U0. The other end of the resistor 5U0 is electrically connected to the anode of the regenerative rectification diode 6U1 and the cathode of the regenerative rectification diode 6U0.

The anode of the diode (lower-side diode) 4X0 is electrically connected to the drain of the switching element 1X and the AC terminal 211, and the cathode thereof is electrically connected to the resistor 5X0. Note that it is preferable that the diode 4X0 has fast recovery characteristics with a low recovery loss, and it is preferable that, for example, a Schottky barrier diode (SBD) with good recovery characteristics or an element utilizing a wide bandgap semiconductor (e.g. SiC, GaN) is used as the diode 4X0.

One end of the capacitor (lower-side capacitor) 3X0 is electrically connected to the source of the switching element 1X, and the other end thereof is electrically connected to the cathode of the diode 4X0 and the resistor 5X0.

One end of the resistor (lower-side resistor) 5X0 is electrically connected to the cathode of the diode 4X0 and the other end of the capacitor 3X0. The other end of the resistor 5X0 is electrically connected to the anode of the regenerative rectification diode 6X0 and the cathode of the regenerative rectification diode 6X1.

As described above, in the power conversion apparatus of the present embodiment, the upper-side arm of the inverter cell 100 is a voltage-clamp-type switch circuit having the same configuration as the switch circuit 101N, and the lower-side arm of the inverter cell 100 is a voltage-clamp-type switch circuit having the same configuration as the switch circuit 102M. Accordingly, in the present embodiment, the upper-side arm and lower-side arm of the inverter cell 100 can use common circuits as switch circuits similar to the switch circuits 101N and 102M.

In the present embodiment, a plurality of first regenerative rectification circuits are further connected between the first capacitor of the first switch circuit, which is located on the most low-potential side, and the upper-side capacitor, and between the upper-side capacitor and the low-potential-side terminal of the lower-side switching element.

In addition, in the present embodiment, a plurality of second regenerative rectification circuits are further connected between the second capacitor of the second switch circuit, which is located on the most high-potential side, and the lower-side capacitor, and between the lower-side capacitor and the high-potential-side terminal of the upper-side switching element.

The operation of the power conversion apparatus of the present embodiment is the same as in the above-described first embodiment and second embodiment. Specifically, the switching elements 1UN of the upper arm and the switching elements 1XM of the lower arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment can be obtained. Specifically, according to the power conversion apparatus of the present embodiment, the energy loss can be held down, and an increase in size can be avoided.

Next, a power conversion apparatus of a sixth embodiment will be described in detail with reference to the drawings.

Figure 10:
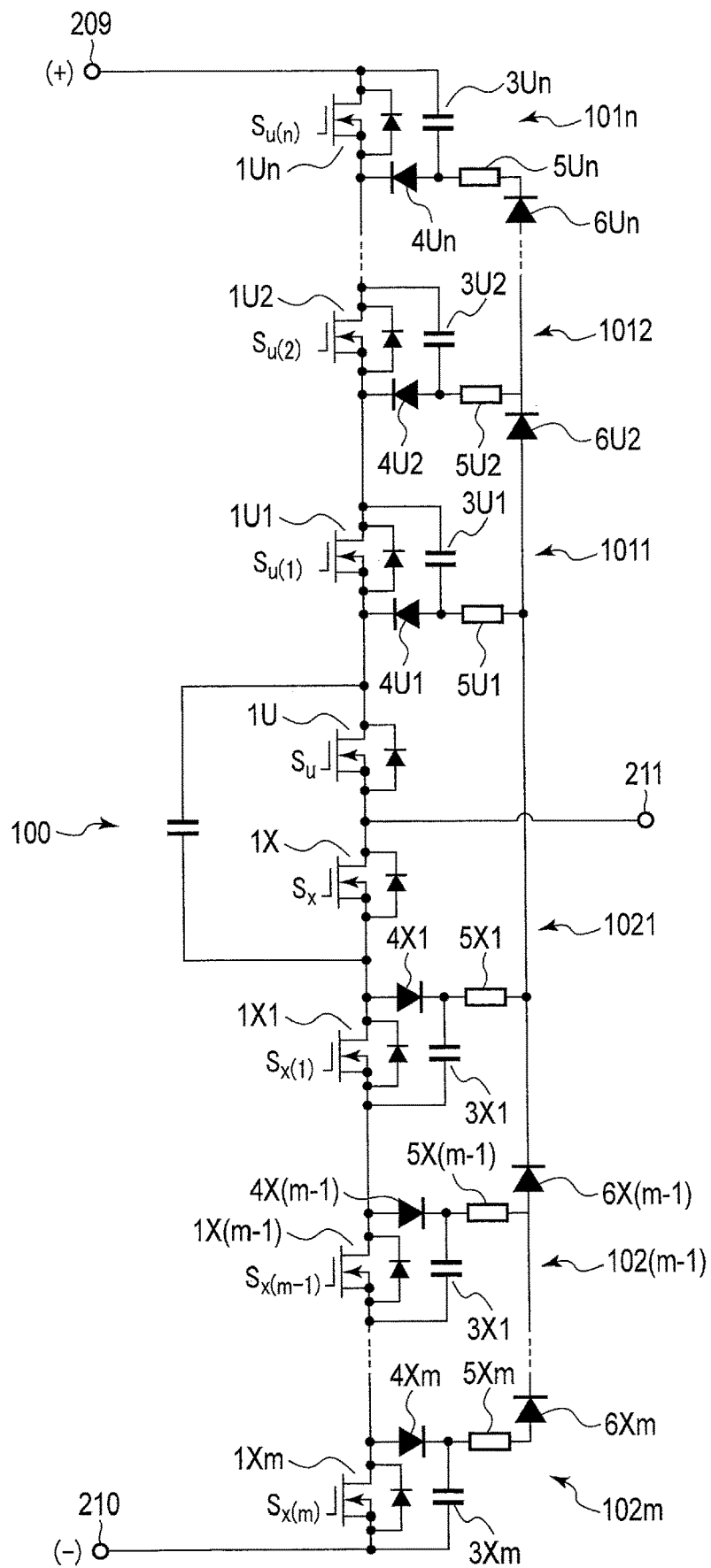
FIG. 10 is a view schematically illustrating an example of the configuration of a power conversion apparatus of an embodiment.

FIG. 10 is a view schematically illustrating an example of the configuration of the power conversion apparatus of the embodiment.

In the description below, the same structural parts as in the above-described first to fifth embodiments are denoted by like reference signs, and a description thereof is omitted.

In the power conversion apparatus of the present embodiment, the regenerative rectification diodes 6U1 and 6X1 are omitted. In addition, the anode of the regenerative rectification diode 6U2 is not electrically connected to the source of the switching element 1X, but is electrically connected to the cathode of the regenerative rectification diodes 6X2. The cathode of the regenerative rectification diode 6X2 is not connected to the drain of the switching element 1U, but is electrically connected to the anode of the regenerative rectification diodes 6U2.

Specifically, the power conversion apparatus of the present embodiment includes a plurality of regenerative rectification diodes 6UN and 6XM (N=2~n, M=2~m) which are connected between neighboring switch circuits 101N and between neighboring switch circuits 102M and are connected in series to each other, with a direction from the low-potential side toward the high-potential side being set as a forward direction.

In the present embodiment, with a direction from the low-potential side toward the high-potential side being set as a forward direction, regenerative rectification circuits are connected between the first capacitors of neighboring first switch circuits and between the second capacitors of neighboring second switch circuits, and the regenerative rectification circuits are connected in series to each other.

Specifically, the power conversion apparatus of the present embodiment includes, when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element 1UN, the regenerative rectification circuit which connects the low-potential-side terminal of the inverter cell 100 and the low-potential-side terminal of the first capacitor 3UN of the upper arm, with a direction from the low-potential side toward the high-potential side being set as a forward direction.

In addition, the power conversion apparatus of the present embodiment includes, when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects the high-potential-side terminal of the inverter cell 100 and the high-potential-side terminal of the second capacitor 3XM of the lower arm, with a direction from the low-potential side toward the high-potential side being set as a forward direction.

Note that in the present embodiment, the configuration of the inverter cell 100 may be the same as in the first embodiment, or may be the same as in the fifth embodiment. When the inverter cell 100 has the same configuration as in the fifth embodiment, the regenerative rectification circuit includes a circuit which connects the low-potential-side terminal of the inverter cell 100, the low-potential-side terminal of the upper-side capacitor 3U0 and the low-potential-side terminal of the first capacitor 3UN of the upper arm, and connects the high-potential-side terminal of the inverter cell 100, the high-potential-side terminal of the lower-side capacitor 3X0 and the high-potential-side terminal of the second capacitor 3XM of the lower arm, with a direction from the low-potential side toward the high-potential side being set as a forward direction.

The operation of the power conversion apparatus of the present embodiment is the same as in the above-described first embodiment and second embodiment. Specifically, the switching elements 1UN of the upper arm and the switching elements 1XM of the lower arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment can be obtained. Specifically, according to the power conversion apparatus of the present embodiment, the energy loss can be held down, and an increase in size can be avoided.

Next, a power conversion apparatus of a seventh embodiment will be described in detail with reference to the drawings.

Figure 11:
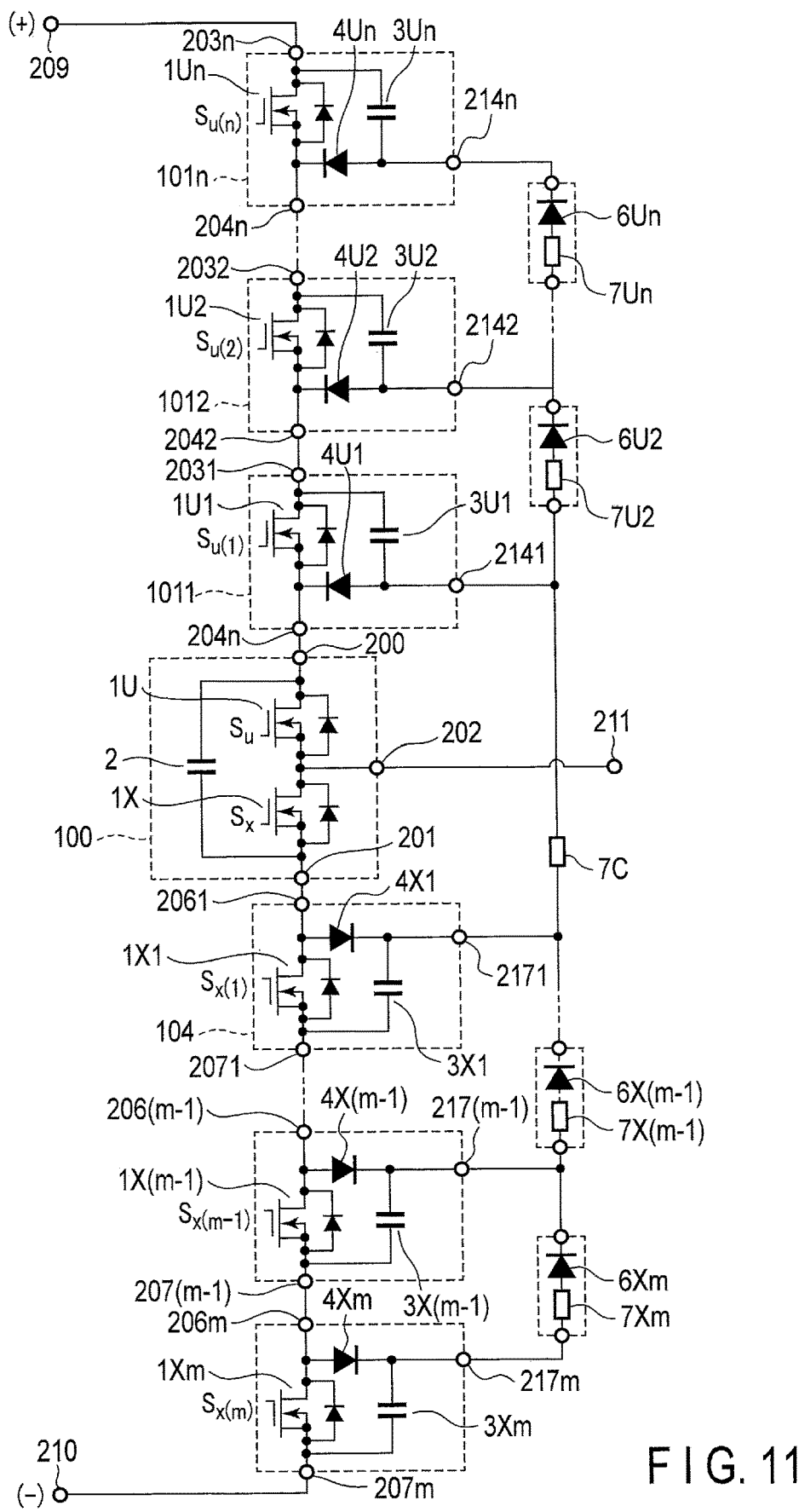
FIG. 11 is a view schematically illustrating an example of the configuration of a power conversion apparatus of an embodiment.

FIG. 11 is a view schematically illustrating an example of the configuration of the power conversion apparatus of the embodiment.

In the description below, the same structural parts as in the above-described first to sixth embodiments are denoted by like reference signs, and a description thereof is omitted.

The power conversion apparatus of the present embodiment is different from the power conversion apparatus of the above-described sixth embodiment in that the regenerative rectification circuit further includes resistors 7C, 7UN (N=2~n) and 7XM (M=2~m).

The resistor 7UN (N=2~n) is connected in series to the regenerative rectification diode 6UN in a path which electrically connects the snubber terminal 205(N−1) of the switch circuit 101(N−1) and the regenerative rectification diode 6UN.

The resistor 7XM (M=2~m) is connected in series to the regenerative rectification diode 6XM in a path which electrically connects the snubber terminal 208M of the switch circuit 102M and the regenerative rectification diode 6XM.

The resistor 7C is connected in series to the snubber terminal 205*l* and snubber terminal 208*l* in a path which electrically connects the snubber terminal 205*l* of the switch circuit 101*l* and the snubber terminal 208*l* of the switch circuit 102*l*.

As described above, the power conversion apparatus of the present embodiment is configured to include the resistors 7C, 7UN (N=2~n) and 7XM (M=2~m) which are connected in series to the regenerative rectification diodes 6UN and 6XM, and the number of resistors, which are present on the path that electrically connects the capacitors 3UN and 3XM of the switch circuits 101N and 102M via the snubber terminals 205N and 208M, can be reduced. For example, in the configuration illustrated in FIG. 1, the resistor 5Un and resistor 5U(n-1) are present on the path in which the capacitor 3Un and capacitor 3U(n-1) are electrically connected via the snubber terminals 205*n* and 205(*n*-1). By contrast, in the configuration illustrated in FIG. 11, the resistor 7Un is present on the path in which the capacitor 3Un and capacitor 3U(n-1) are electrically connected via the snubber terminals 205*n* and 205(*n*-1). Thereby, the energy charged via the path, which electrically connects the switch circuits 101N and switch circuits 102M, can more efficiently be regenerated.

Note that in the present embodiment, the configuration of the inverter cell 100 may be the same as in the first embodiment, or may be the same as in the fifth embodiment. When the inverter cell 100 has the same configuration as in the fifth embodiment, the regenerative rectification circuit includes a circuit which connects the low-potential-side terminal of the inverter cell 100, the low-potential-side terminal of the upper-side capacitor 3U0 and the low-potential-side terminal of the first capacitor 3UN of the upper arm, and connects the high-potential-side terminal of the inverter cell 100, the high-potential-side terminal of the lower-side capacitor 3X0 and the high-potential-side terminal of the second capacitor 3XM of the lower arm, with a direction from the low-potential side toward the high-potential side being set as a forward direction.

The operation of the power conversion apparatus of the present embodiment is the same as in the above-described first embodiment and second embodiment. Specifically, the switching elements 1UN of the upper arm and the switching elements 1XM of the lower arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment can be obtained. Specifically, according to the power conversion apparatus of the present embodiment, the energy loss can be held down, and an increase in size can be avoided.

Next, a power conversion apparatus of an eighth embodiment will be described in detail with reference to the drawings.

Figure 12:
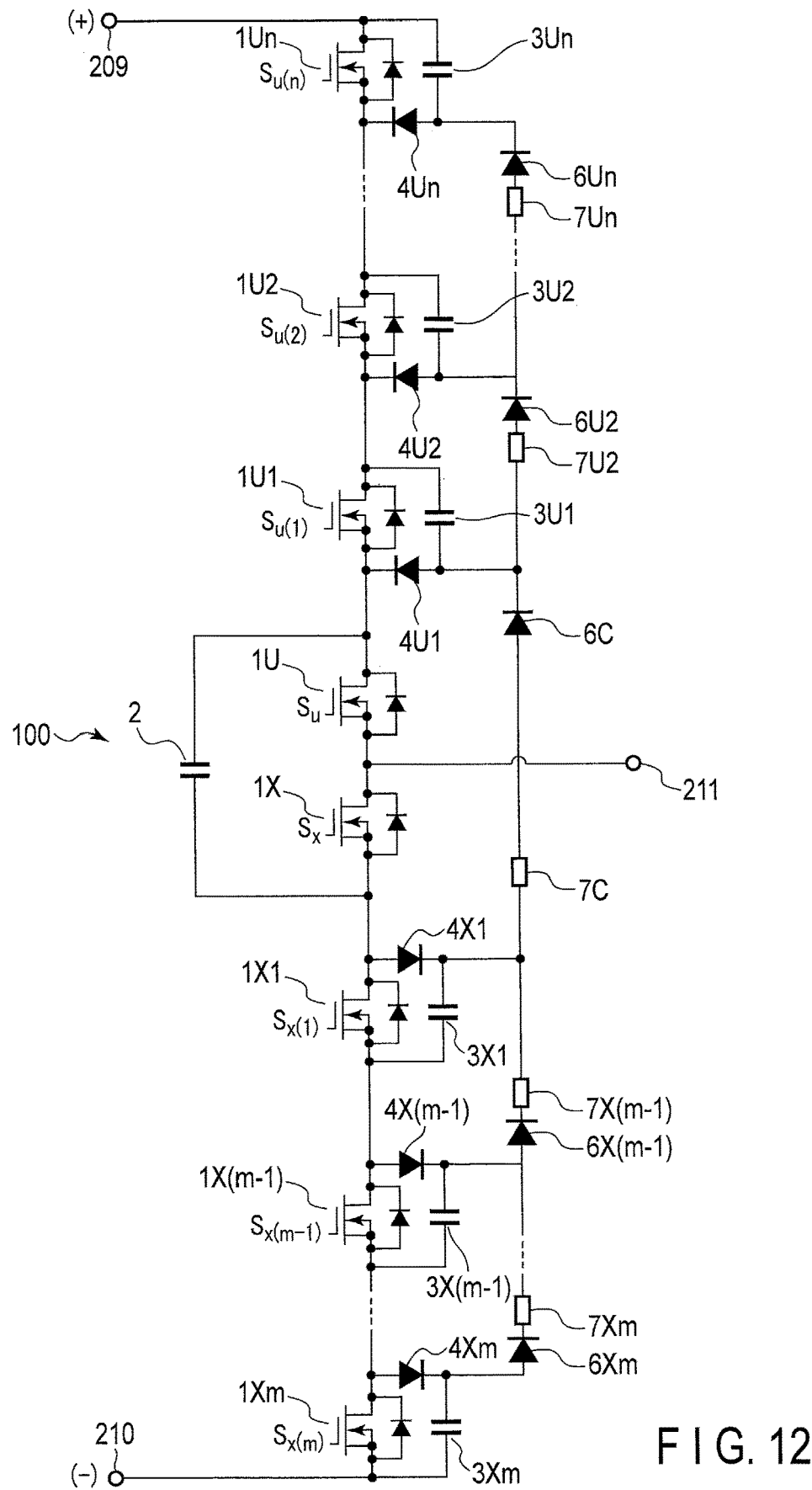
FIG. 12 is a view schematically illustrating an example of the configuration of a power conversion apparatus of an embodiment.

FIG. 12 is a view schematically illustrating an example of the configuration of the power conversion apparatus of the embodiment.

In the description below, the same structural parts as in the above-described first to seventh embodiments are denoted by like reference signs, and a description thereof is omitted.

The power conversion apparatus of the present embodiment is configured to further include a regenerative rectification diode 6C in the power conversion apparatus of the above-described seventh embodiment.

The regenerative rectification diode 6C is connected in series to the resistor 7C in the path which electrically connects the snubber terminal 205*l* (shown in FIG. 11) of the switch circuit 101*l* and the resistor 7C.

In addition, in the power conversion apparatus of the present embodiment, the resistor 7XM is connected in series to the regenerative rectification diode 6XM between the regenerative rectification diode 6XM and the snubber terminal 208(M-1) of the switch circuit 102(M-1).

Except for the above-described configuration, the configuration of the power conversion apparatus of the present embodiment is the same as that of the power conversion apparatus of the seventh embodiment.

In the present embodiment, like the above-described seventh embodiment, the number of resistors, which are present on the path that electrically connects the capacitors 3UN and 3XM of the switch circuits 101N and 102M via the snubber terminals 205N and 208M, can be reduced. Thereby, the energy charged via the path, which electrically connects the switch circuits 101N and switch circuits 102M, can more efficiently be regenerated.

Note that in the present embodiment, the configuration of the inverter cell 100 may be the same as in the first embodiment, or may be the same as in the fifth embodiment. When the inverter cell 100 has the same configuration as in the fifth embodiment, the regenerative rectification circuit includes a circuit which connects the low-potential-side terminal of the inverter cell 100, the low-potential-side terminal of the upper-side capacitor 3U0 and the low-potential-side terminal of the first capacitor 3UN of the upper arm, and connects the high-potential-side terminal of the inverter cell 100, the high-potential-side terminal of the lower-side capacitor 3X0 and the high-potential-side terminal of the second capacitor 3XM of the lower arm, with a direction from the low-potential side toward the high-potential side being set as a forward direction.

The operation of the power conversion apparatus of the present embodiment is the same as in the above-described first embodiment and second embodiment. Specifically, the switching elements 1UN of the upper arm and the switching elements 1XM of the lower arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment can be obtained. Specifically, according to the power conversion apparatus of the present embodiment, the energy loss can be held down, and an increase in size can be avoided.

Next, a power conversion apparatus of a ninth embodiment will be described in detail with reference to the drawings.

Figure 13:
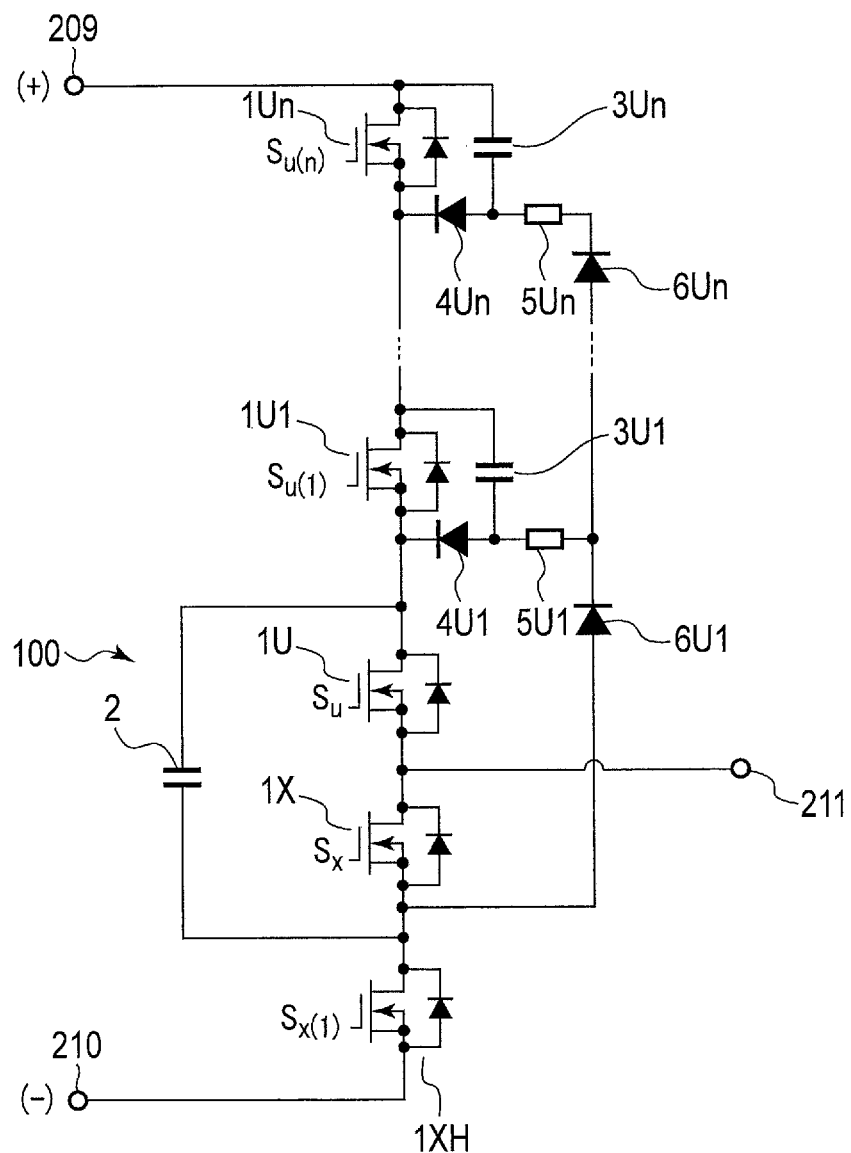
FIG. 13 is a view schematically illustrating an example of the configuration of a power conversion apparatus of an embodiment.

FIG. 13 is a view schematically illustrating an example of the configuration of the power conversion apparatus of the embodiment.

In the description below, the same structural parts as in the above-described first to eighth embodiments are denoted by like reference signs, and a description thereof is omitted.

The power conversion apparatus of the present embodiment is different from the above-described first embodiment with respect to the configuration of the lower arm. In the power conversion apparatus of the present embodiment, a switching element 1XH is connected to a path between the negative-side DC terminal 210 and inverter cell 100. Note that it is preferable to use an element with a higher breakdown voltage than the switching element 1UN of the switch circuit 101N as the switching element 1XH. In addition, in FIG. 13, in the power conversion apparatus, although one switching element 1XH is provided in the lower arm, a plurality of switching elements 1XH may be connected in series in the lower arm. Although the power conversion direction becomes a one-way direction, a high-breakdown-voltage diode (passive semiconductor element) may be substituted for the switching element 1XH in the lower arm.

As described above, the power conversion apparatus of the present embodiment is different from the above-described first embodiment with respect to the configuration of the lower arm, and the power conversion apparatus of the present embodiment includes, at least either when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element 1UN, or when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects at least either the low-potential-side terminal of the inverter cell 100 and the low-potential-side terminal of the first capacitor 3UN of the upper arm, or the high-potential-side terminal of the inverter cell 100 and the high-potential-side terminal of the second capacitor 3XM of the lower arm, with a direction from the low-potential side toward the high-potential side being set as a forward direction.

Note that in the present embodiment, the configuration of the inverter cell 100 may be the same as in the first embodiment, or may be the same as in the fifth embodiment. When the inverter cell 100 has the same configuration as in the fifth embodiment, the regenerative rectification circuit includes a circuit which connects the low-potential-side terminal of the inverter cell 100, the low-potential-side terminal of the upper-side capacitor 3U0 and the low-potential-side terminal of the first capacitor 3UN of the upper arm, and connects the high-potential-side terminal of the inverter cell 100 and the high-potential-side terminal of the lower-side capacitor 3X0, with a direction from the low-potential side toward the high-potential side being set as a forward direction.

In the power conversion apparatus of the present embodiment, the operation of the upper arm is the same as in the above-described first embodiment and second embodiment, and the lower arm can be operated similarly as in the conventional 2-level inverter by simultaneously switching the switching element 1X and the switching element 1XH. Accordingly, in the power conversion apparatus of the present embodiment, the switching elements 1UN of the upper arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment can be obtained. Specifically, according to the power conversion apparatus of the present embodiment, the energy loss can be held down, and an increase in size can be avoided.

Next, a power conversion apparatus of a tenth embodiment will be described in detail with reference to the drawings.

FIG. 14 is a view schematically illustrating an example of the configuration of the power conversion apparatus of the embodiment.

In the description below, the same structural parts as in the above-described first to ninth embodiments are denoted by like reference signs, and a description thereof is omitted.

The power conversion apparatus of the present embodiment is different from the above-described first embodiment with respect to the configuration of the upper arm. In the power conversion apparatus of the present embodiment, a switching element 1UH is connected to a path between the positive-side DC terminal 209 and inverter cell 100. Note that it is preferable to use an element with a higher breakdown voltage than the switching element 1XM of the switch circuit 102M as the switching element 1UH. In addition, in FIG. 14, in the power conversion apparatus, although one switching element 1UH is provided in the upper arm, a plurality of switching elements 1UH may be connected in series in the upper arm. Although the power conversion direction becomes a one-way direction, a high-breakdown-voltage diode (passive semiconductor element) may be substituted for the switching element 1UH in the upper arm.

As described above, the power conversion apparatus of the present embodiment is different from the above-described first embodiment with respect to the configuration of the upper arm, and the power conversion apparatus of the present embodiment includes, at least either when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element FUN, or when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects at least either the low-potential-side terminal of the inverter cell 100 and the low-potential-side terminal of the first capacitor 3UN of the upper arm, or the high-potential-side terminal of the inverter cell 100 and the high-potential-side terminal of the second capacitor 3XM of the lower arm, with a direction from the low-potential side toward the high-potential side being set as a forward direction.

Note that in the present embodiment, the configuration of the inverter cell 100 may be the same as in the first embodiment, or may be the same as in the fifth embodiment. When the inverter cell 100 has the same configuration as in the fifth embodiment, the regenerative rectification circuit includes a circuit which connects the low-potential-side terminal of the inverter cell 100 and the low-potential-side terminal of the upper-side capacitor 3U0, and connects the high-potential-side terminal of the inverter cell 100, the high-potential-side terminal of the lower-side capacitor 3X0 and the high-potential-side terminal of the second capacitor 3XM of the lower arm, with a direction from the low-potential side toward the high-potential side being set as a forward direction.

In the power conversion apparatus of the present embodiment, the operation of the lower arm is the same as in the above-described first embodiment and second embodiment, and the upper arm can be operated similarly as in the conventional 2-level inverter by simultaneously switching the switching element 1U and the switching element 1UH.

Accordingly, in the power conversion apparatus of the present embodiment, the switching elements 1XM of the lower arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment can be obtained. Specifically, according to the power conversion apparatus of the present embodiment, the energy loss can be held down, and an increase in size can be avoided.

Next, a power conversion apparatus of an eleventh embodiment will be described in detail with reference to the drawings.

Figure 15:
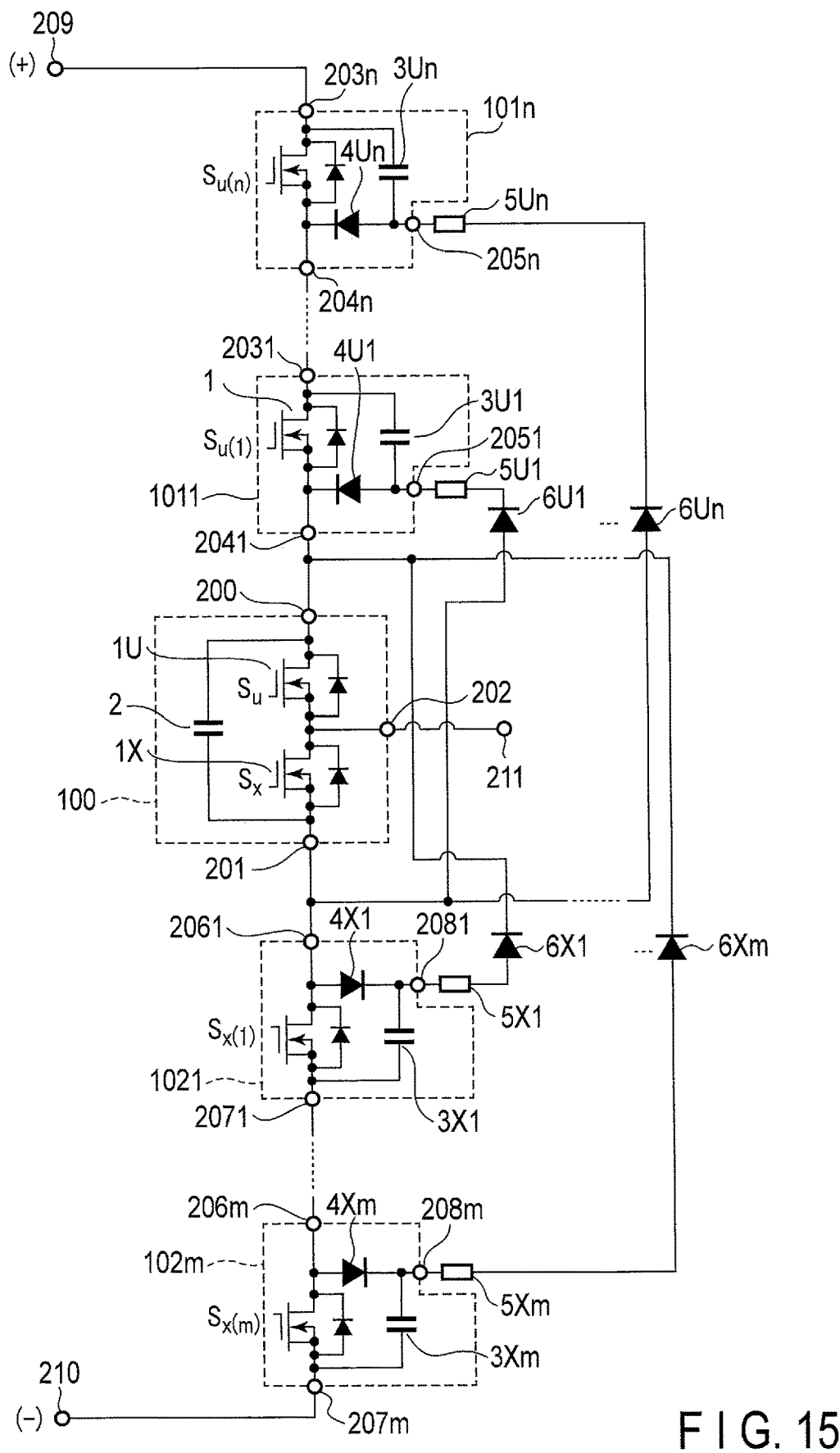
FIG. 15 is a view schematically illustrating an example of the configuration of a power conversion apparatus of an embodiment.

FIG. 15 is a view schematically illustrating an example of the configuration of the power conversion apparatus of the embodiment.

In the description below, the same structural parts as in the above-described first to tenth embodiments are denoted by like reference signs, and a description thereof is omitted.

The power conversion apparatus of the present embodiment is different from the above-described first embodiment with respect to the configuration of the regenerative rectification circuit.

Each of first regenerative rectification circuits includes a regenerative rectification diode 6UN and a resistor 5UN. The regenerative rectification diode GUN is connected between the negative-side cell terminal 201 and the snubber terminal 205N, with a direction from the negative-side cell terminal 201 of the inverter cell 100 toward the snubber terminal 205N of the switch circuit 101N being set as a forward direction. The resistor 5UN is connected in series to the regenerative rectification diode GUN in the path which electrically connects the cathode of the regenerative rectification diode GUN and the snubber terminal 205N. Specifically, the anodes of a plurality of regenerative rectification diodes 6UN are electrically connected to the negative-side cell terminal 201 of the inverter cell 100 without intervention of other regenerative rectification diodes 6UN.

Specifically, in the present embodiment, the first regenerative rectification circuits are connected between the low-potential-side terminal of the lower-side switching element (the low-potential-side terminal of the inverter cell 100) and the low-potential-side terminals of the first capacitors of the first switch circuits, with a direction from the low-potential side toward the high-potential side being set as a forward direction.

As described above, the power conversion apparatus of the present embodiment includes, at least either when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element 1UN, or when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects at least either the low-potential-side terminal of the inverter cell 100 and the low-potential-side terminal of the first capacitor 3UN of the upper arm, or the high-potential-side terminal of the inverter cell 100 and the high-potential-side terminal of the second capacitor 3XM of the lower arm, with a direction from the low-potential side toward the high-potential side being set as a forward direction.

Each of second regenerative rectification circuits includes a regenerative rectification diode 6XM and a resistor 5XM. The regenerative rectification diode 6XM is connected between the snubber terminal 208M and the positive-side cell terminal 200, with a direction from the snubber terminal 208M of the switch circuit 102M toward the positive-side cell terminal 200 of the inverter cell 100 being set as a forward direction. The resistor 5XM is connected in series to the regenerative rectification diode 6XM in the path which electrically connects the anode of the regenerative rectification diode 6XM and the snubber terminal 208M. Specifically, the cathodes of a plurality of regenerative rectification diodes 6XM are electrically connected to the positive-side cell terminal 200 of the inverter cell 100 without intervention of other regenerative rectification diodes 6XM.

Specifically, in the present embodiment, the second regenerative rectification circuits are connected between the high-potential-side terminal of the upper-side switching element (the high-potential-side terminal of the inverter cell 100) and the high-potential-side terminals of the second capacitors of the second switch circuits.

Note that in the present embodiment, the configuration of the inverter cell 100 may be the same as in the first embodiment, or may be the same as in the fifth embodiment. When the inverter cell 100 has the same configuration as in the fifth embodiment, the regenerative rectification circuit includes a circuit which is connected between the low-potential-side terminal of the inverter cell 100 and the low-potential-side terminal of the upper-side capacitor 3U0, and a circuit which is connected between the high-potential-side terminal of the inverter cell 100 and the high-potential-side terminal of the lower-side capacitor 3X0, with a direction from the low-potential side toward the high-potential side being set as a forward direction.

In the power conversion apparatus of the present embodiment, the switching operations of the switching elements 1U and 1X, the switching elements 1UN and the switching elements 1XM are the same as in the above-described first embodiment and second embodiment. Specifically, the switching elements 1UN of the upper arm and the switching elements 1XM of the lower arm are sequentially switched at predetermined time intervals.

In the present embodiment, by the above-described switching operation and the configuration of the regenerative rectification diodes 6UN and 6XM, the energy stored in the capacitors 3UN and 3XM of the switch circuits 101N and 102M is charged in the floating capacitor 2 without intervention of the regenerative rectification diodes 6UN and 6XM.

Thus, accordingly to the power conversion apparatus of the present embodiment, losses, such as a turn-on loss, a turn-off loss and a recovery loss, can be reduced, the loss of energy decreases in the path which discharges energy from the capacitors 3UN and 3XM to the floating capacitor 2, and energy can be regenerated more efficiently.

Note that in the power conversion apparatus of the present embodiment, since the voltage applied to the regenerative rectification diodes 6UN and 6XM is higher than in the circuit configuration of the power conversion apparatus of the above-described first embodiment, it is preferable that elements with higher breakdown voltages than in the first embodiment are used as the regenerative rectification diodes 6UN and 6XM.

As described above, according to the power conversion apparatus of the present embodiment, the same advantageous effects as in the above-described first embodiment can be obtained. Specifically, according to the power conversion apparatus of the present embodiment, the energy loss can be held down, and an increase in size can be avoided.

Next, a power conversion apparatus of a twelfth embodiment will be described in detail with reference to the drawings.

Figure 16:
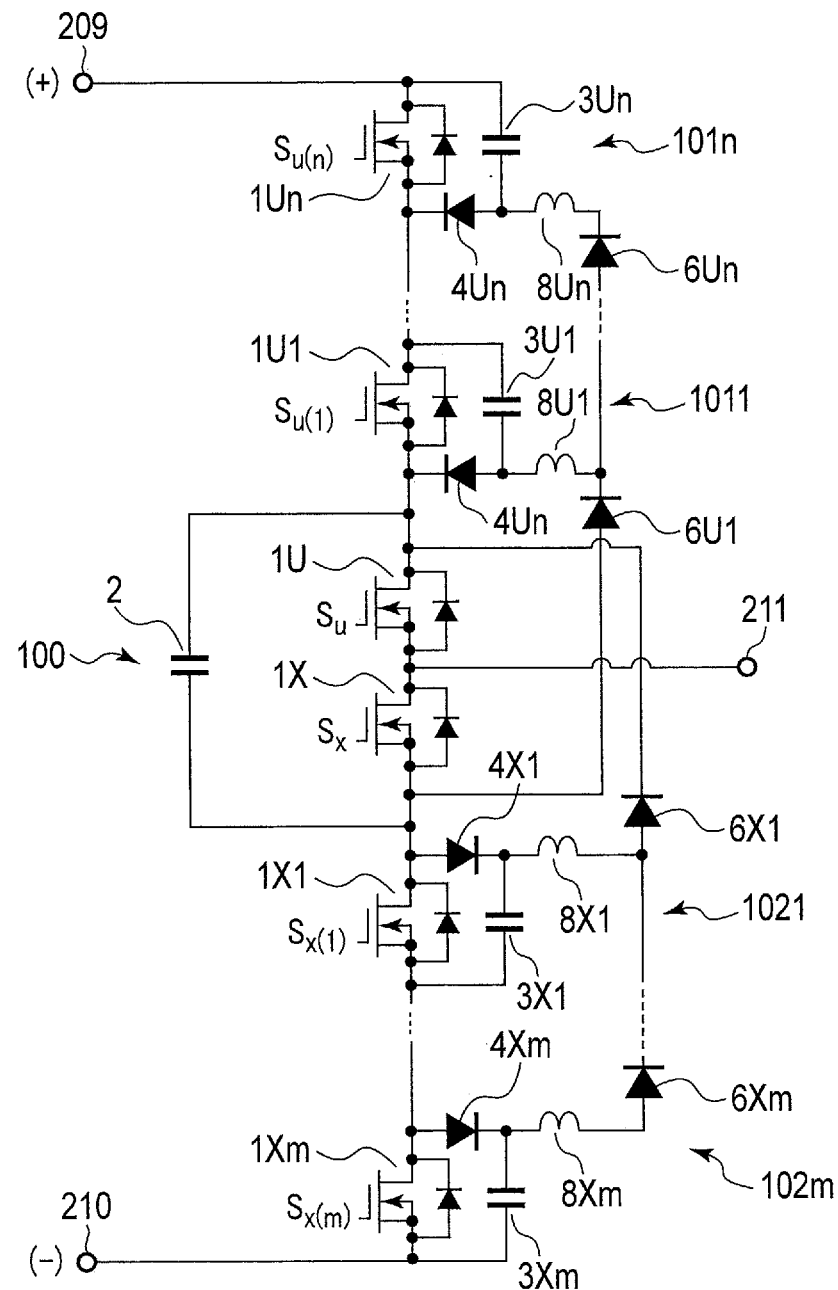
FIG. 16 is a view schematically illustrating an example of the configuration of a power conversion apparatus of an embodiment.

FIG. 16 is a view schematically illustrating an example of the configuration of the power conversion apparatus of the embodiment.

In the description below, the same structural parts as in the above-described first to eleventh embodiments are denoted by like reference signs, and a description thereof is omitted.

The power conversion apparatus of the present embodiment is configured such that, for example, the first resistor 5UN and second resistor 5XM included in the power conversion apparatus of the first embodiment are replaced with a first reactor 8UN and a second reactor 8XM (or a first inductance element 8UN and a second inductance element 8XM). By using the reactors 8UN and 8XM in place of the resistors 5UN and 5XM, for example, energy can efficiently be regenerated even when a voltage difference between the capacitors 3UN is large or when a voltage difference between the capacitors 3XM is large.

Thus, according to the power conversion apparatus of the present embodiment, like the above-described first embodiment, the energy loss can be held down, and an increase in size can be avoided.

Note that although FIG. 16 illustrates an example in which the resistors 5UN and 5XM in the power conversion apparatus of the first embodiment are replaced with the reactors 8UN and 8XM, the same advantageous effects can be obtained in the circuit configurations of the power conversion apparatuses of other embodiments, by using the reactors in place of the resistors.

Next, a power conversion apparatus of a 13th embodiment will be described in detail with reference to the drawings.

Figure 17:
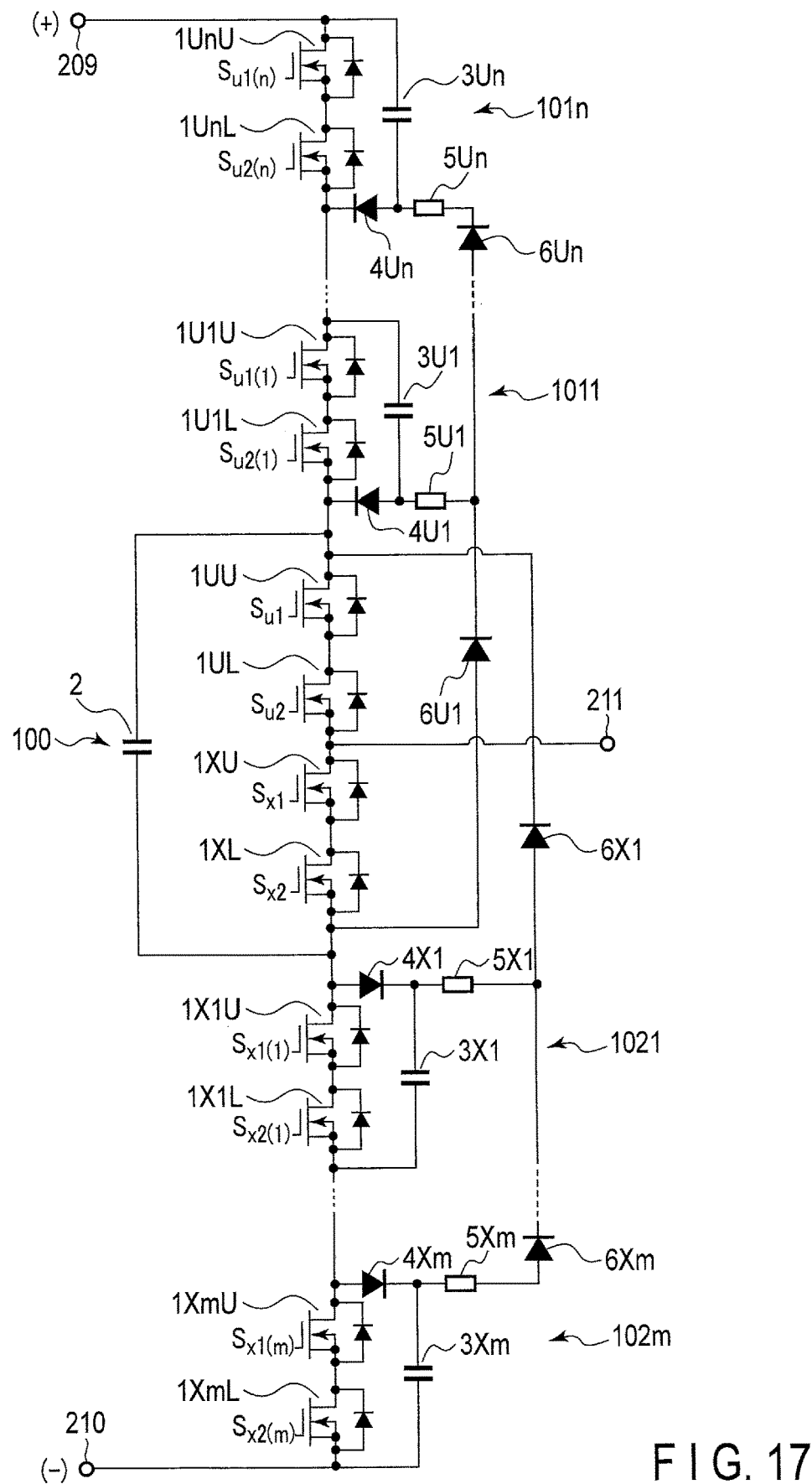
FIG. 17 is a view schematically illustrating an example of the configuration of a power conversion apparatus of an embodiment.

FIG. 17 is a view schematically illustrating an example of the configuration of the power conversion apparatus of the embodiment.

In the description below, the same structural parts as in the above-described first to eleventh embodiments are denoted by like reference signs, and a description thereof is omitted.

The power conversion apparatus of the present embodiment is different from that of the first embodiment with respect to the configuration of the switch circuits 101N and 102M.

The switch circuit 101N includes a positive-side switching element 1UNU and a negative-side switching element 1UNL in place of the switching element 1UN. The positive-side switching element 1UNU and negative-side switching element 1UNL are connected in series.

The switch circuit 102M includes a positive-side switching element 1XMU and a negative-side switching element 1XML in place of the switching element 1XM. The positive-side switching element 1XMU and negative-side switching element 1XML are connected in series.

In the power conversion apparatus of the present embodiment, the positive-side switching element 1UNU and negative-side switching element 1UNL are switched at the same time, and the positive-side switching element 1XMU and negative-side switching element 1XML are switched at the same time. For example, the operations of the positive-side switching element 1UNU and negative-side switching element 1UNL may be controlled based on a common gate signal Su(N), and the operations of the positive-side switching element 1XMU and negative-side switching element 1XML may be controlled based on a common gate signal Sx(M).

The inverter cell 100 includes a positive-side switching element 1UU and a negative-side switching element 1UL in place of the upper-side switching element 1U, and includes a positive-side switching element 1XU and a negative-side switching element 1UL in place of the lower-side switching element 1X. The positive-side switching element 1UU and negative-side switching element 1UL are connected in series. The positive-side switching element 1XU and negative-side switching element 1XL are connected in series.

Specifically, the power conversion apparatus of the present embodiment includes, when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element 1UN, the regenerative rectification circuit which connects the low-potential-side terminal of the inverter cell 100 and the low-potential-side terminal of the first capacitor 3UN of the upper arm, with a direction from the low-potential side toward the high-potential side being set as a forward direction.

In addition, the power conversion apparatus of the present embodiment includes, when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects the high-potential-side terminal of the inverter cell 100 and the high-potential-side terminal of the second capacitor 3XM of the lower arm, with a direction from the low-potential side toward the high-potential side being set as a forward direction.

Note that in the present embodiment, the inverter cell 100 may include, like the fifth embodiment, the upper-side diode 4U0, upper-side capacitor 3U0, lower-side diode 4X0 and lower-side capacitor 3X0. In this case, the regenerative rectification circuit includes a circuit which is connected between the low-potential-side terminal of the inverter cell 100 and the low-potential-side terminal of the upper-side capacitor 3U0, and connected between the high-potential-side terminal of the inverter cell 100 and the high-potential-side terminal of the lower-side capacitor 3X0, with a direction from the low-potential side toward the high-potential side being set as a forward direction.

As regards the operation of the power conversion apparatus of the present embodiment, for example, the positive-side switching element 1UNU and negative-side switching element 1UNL of the power conversion apparatus of the embodiment are switched (turn-on or turn-off) at the timing when the switching element 1UN is switched (turn-on or turn-off) in the power conversion apparatus of the above-described first or second embodiment, and the positive-side switching element 1XMU and negative-side switching element 1XML of the power conversion apparatus of the embodiment are switched (turn-on or turn-off) at the timing when the switching element 1XN is switched (turn-on or turn-off) in the power conversion apparatus of the first or second embodiment. Thereby, in the power conversion apparatus of the present embodiment, like the first and second embodiments, losses, such as a turn-on loss, a turn-off loss and a recovery loss, can be reduced.

As described above, according to the power conversion apparatus of the present embodiment, the same advantageous effects as in the above-described first embodiment can be obtained. Specifically, according to the power conversion apparatus of the present embodiment, the energy loss can be held down, and an increase in size can be avoided.

In the example illustrated in FIG. 17, the switch circuit 101N, 102M includes the two series-connected switching elements in place of the switching element 1UN, 1XM of the power conversion apparatus of the first embodiment. Alternatively, the switch circuit 101N, 102M may include three or more series-connected switching elements in place of the switching element 1UN, 1XM. In this case, too, the same advantageous effects as in the first embodiment can be obtained by switching the switching elements included in the switch circuit 101N, 102M at the same timing, and by performing the same operation as in the first embodiment or second embodiment.

Next, a power conversion apparatus of a 14th embodiment will be described in detail with reference to the drawings.

FIG. 18 is a view schematically illustrating an example of the configuration of the power conversion apparatus of the present embodiment.

The power conversion apparatus of the present embodiment includes an inverter cell 100, a switch circuit 101, a switch circuit 102, a regenerative rectification diode 6, and a resistor 7.

The inverter cell 100 has the same configuration as in the power conversion apparatus of the above-described first embodiment, and a description thereof is omitted here. In the present embodiment, the inverter cell 100 may have the same configuration as in the fifth embodiment.

The switch circuit 101 includes a switching element 1U1, a capacitor 3U1 and a diode 4U1.

The switching element 1U1 is, for example, a MOSFET. The source of the switching element 1U1 is electrically connected to the drain of the switching element 1U, and the drain of the switching element 1U1 is electrically connected to the positive-side DC terminal 209.

The cathode of the diode 4U1 is electrically connected to the source of the switching element 1U1, and the anode thereof is electrically connected to the cathode of the regenerative rectification diode 6. Note that it is preferable that the diode 4U1 has fast recovery characteristics with a low recovery loss, and it is preferable that, for example, a Schottky barrier diode (SBD) with good recovery characteristics or an element utilizing a wide bandgap semiconductor (e.g. SiC, GaN) is used as the diode 4U1.

One end of the capacitor 3U1 is electrically connected to the drain of the switching element 1U1, and the other end thereof is electrically connected to the anode of the diode 4U1 and the cathode of the regenerative rectification diode G.

The switch circuit 102 includes a switching element 1X1, a capacitor 3X1 and a diode 4X1.

The switching element 1X1 is, for example, a MOSFET. The drain of the switching element 1X1 is electrically connected to the source of the switching element 1X, and the source of the switching element 1X1 is electrically connected to the negative-side DC terminal 210.

The anode of the diode 4X1 is electrically connected to the drain of the switching element 1X1, and the cathode thereof is electrically connected to the resistor 7 and one end of the capacitor 3X1. Note that it is preferable that the diode 4X1 has fast recovery characteristics with a low recovery loss, and it is preferable that, for example, a Schottky barrier diode (SBD) with good recovery characteristics or an element utilizing a wide bandgap semiconductor (e.g. SiC, GaN) is used as the diode 4X1.

One end of the capacitor 3X1 is electrically connected to the cathode of the diode 4X1, and the other end thereof is electrically connected to the source of the switching element 1X1 and the negative-side DC terminal 210. The regenerative rectification diode 6 is connected between the capacitor 3U1 and resistor 7, with a direction from the switch circuit 102 toward the switch circuit 101 being set as a forward direction.

The resistor 7 is connected in series to the regenerative rectification diode 6 in a path which connects the switch circuit 102 and the regenerative rectification diode 6. Specifically, the power conversion apparatus of the present embodiment includes a regenerative rectification circuit which connects at least either the low-potential-side terminal of the inverter cell 100 and the low-potential-side terminal of the first capacitor 3UN of the upper arm, or the high-potential-side terminal of the inverter cell 100 and the high-potential-side terminal of the second capacitor 3XM of the lower arm, with a direction from the low-potential side toward the high-potential side being set as a forward direction.

As described above, the power conversion apparatus of the present embodiment includes, at least either when the first switch circuit 101 includes the first diode 4U1 with the cathode connected to the low-potential-side terminal of the first switching element 1U1 and includes the first capacitor 3U1 connected between the anode of the first diode 4U1 and the high-potential-side terminal of the first switching element 1U1, or when at least one of the second switch circuits 102 includes the second diode 4X1 with the anode connected to the high-potential-side terminal of the second switching element 1X1 and includes the second capacitor 3X1 connected between the cathode of the second diode 4X1 and the low-potential-side terminal of the second switching element 1X1, the regenerative rectification circuit which connects at least either the low-potential-side terminal of the inverter cell 100 and the low-potential-side terminal of the first capacitor 3U1 of the upper arm, or the high-potential-side terminal of the inverter cell 100 and the high-potential-side terminal of the second capacitor 3X1 of the lower arm, with a direction from the low-potential side toward the high-potential side being set as a forward direction.

In the power conversion apparatus of the present embodiment, for example, when the upper arm is turned on, the switching element 1U1 is turned on after the switching element 1U is turned on. In addition, for example, when the upper arm is turned off, the switching element 1U is turned off after the switching element 1U1 is turned off. Similarly, as regards the lower arm, when the lower arm is turned on, the switching element 1X1 is turned off after the switching element 1X is turned on. In addition, for example, when the lower arm is turned off, the switching element 1X is turned off after the switching element 1X1 is turned off.

According to the power conversion apparatus of the present embodiment, by performing the above operation, losses, such as a turn-on loss, a turn-off loss and a recovery loss, can be reduced. Specifically, according to the power conversion apparatus of the present embodiment, like the above-described first embodiment, the energy loss can be held down, and an increase in size can be avoided.

In addition, according to the power conversion apparatus of the present embodiment, at the same time as the switching elements 1U, 1U1, 1X and 1X1 perform the operation for power conversion, the energy stored in the floating capacitor 2 can be regenerated. Accordingly, in the power conversion apparatus of the present embodiment, there is no need to cause the switching elements 1U, 1U1, 1X and 1X1 to perform the operation for regenerating energy stored in the floating capacitor 2, and restrictions to the operation of the power conversion apparatus can be avoided.

(Group 2)

Hereinafter, power conversion apparatuses of embodiments will be described in detail with reference to the accompanying drawings.

Figure 19:
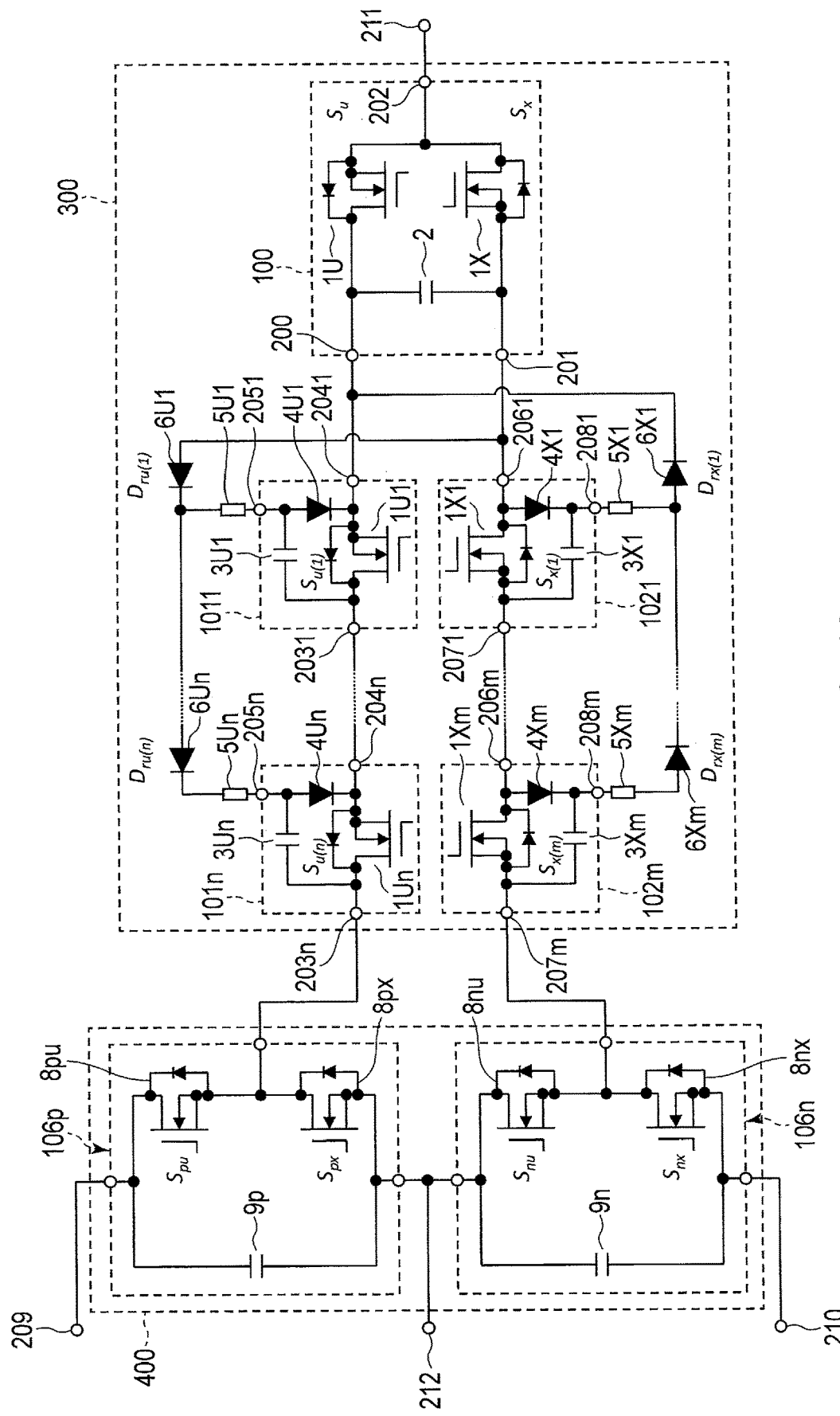
FIG. 19 is a view schematically illustrating an example of the configuration of a power conversion apparatus of an embodiment.

FIG. 19 is a view schematically illustrating an example of the configuration of a power conversion apparatus of an embodiment.

The power conversion apparatus of the embodiment includes a first circuit 300, a second circuit 400, a positive-side DC terminal 209, a negative-side DC terminal 210, and an AC terminal 211.

The first circuit 300 includes an inverter cell 100, an upper arm, a lower arm, an n-number (n is an integer of 2 or more) of first regenerative rectification circuits (regenerative rectification diodes 6UN and first resistors 5UN), and an m-number (m is an integer of 2 or more) of second regenerative rectification circuits (regenerative rectification diodes 6XM and second resistors 5XM). Here, N and M are N=2~n, and M=2~m, and, hereinafter, this definition will be the same unless otherwise defined.

The upper arm of the power conversion apparatus of the embodiment includes an n-number of switch circuits (voltage-clamp-type switch circuits) 101N. The lower arm of the power conversion apparatus of the embodiment includes an m-number of switch circuits (voltage-clamp-type switch circuits) 102M.

Note that, in the power conversion apparatus of the embodiment, a DC capacitor (not shown) is electrically connected between the positive-side DC terminal 209 and negative-side DC terminal 210 (or between the positive-side DC terminal 209 and an intermediate terminal 211 or between the intermediate terminal 211 and the negative-side DC terminal 210). The DC capacitor may be included in the power conversion apparatus, or may be attached to the outside of the power conversion apparatus.

The inverter cell 100 includes a switching element (upper-side switching element) 1U, a switching element (lower-side switching element) 1X, a floating capacitor 2, a positive-side cell terminal (high-potential-side terminal) 200, a negative-side cell terminal (low-potential-side terminal) 201, and a cell AC terminal (AC terminal) 202. Note that it suffices that the positive-side cell terminal 200, negative-side cell terminal 201 and cell AC terminal 202 are configured such that circuits can be electrically connected at the positions of these terminals, and the terminals may be omitted.

The switching element 1U and switching element 1X are, for example, MOSFETs (Metal-Oxide Semiconductor Field-Effect Transistors). The drain (high-potential-side terminal) of the switching element 1U is electrically connected to the positive-side cell terminal 200, and the source (low-potential-side terminal) thereof is electrically connected to the drain (high-potential-side terminal) of the switching element 1X. The source (low-potential-side terminal) of the switching element 1X is electrically connected to the negative-side cell terminal 201. A node between the switching element 1U and switching element 1X is electrically connected to the cell AC terminal 202.

The floating capacitor 2 is connected in parallel to the switching element 1U and switching element 1X. One end of the floating capacitor 2 is electrically connected to the drain of the switching element 1U and the positive-side cell terminal 200, and the other end of the floating capacitor 2 is electrically connected to the source of the switching element 1X and the negative-side cell terminal 201.

Each of the n-number of switch circuits (first switch circuits) 101N includes a switching element (first switching element) 1UN, a diode (first diode) 4UN, a capacitor (first capacitor) 3UN, a snubber terminal 205N, a positive-side terminal 203N, and a negative-side terminal 204N.

Note that it suffices that the snubber terminal 205N, positive-side terminal 203N and negative-side terminal 204N are configured such that circuits can be electrically connected at the positions of these terminals, and the terminals may be omitted. In addition, the switch circuit 101N may include a plurality of switching elements 1UN. In this case, the switching elements 1UN are connected in parallel to the capacitor 3UN and diode 4UN between the positive-side terminal 203N and negative-side terminal 204N. The switching elements 1UN may be connected in series to each other, or may be connected in parallel to each other.

The switching element 1UN is, for example, a MOSFET. The drain (high-potential-side terminal) of the switching element 1UN is electrically connected to the positive-side terminal 203N, and the source (low-potential-side terminal) of the switching element 1UN is electrically connected to the negative-side terminal 204N.

The cathode of the diode 4UN is electrically connected to the source of the switching element 1UN and the negative-side terminal 204N, and the anode thereof is electrically connected to the snubber terminal 205N. Note that it is preferable that the diode 4UN has fast recovery characteristics with a low recovery loss, and it is preferable that, for example, a Schottky barrier diode (SBD) with good recovery characteristics or an element utilizing a wide bandgap semiconductor (e.g. SiC, GaN) is used as the diode 4UN.

One end (high-potential-side terminal) of the capacitor 3UN is electrically connected to the drain of the switching element 1UN and the positive-side terminal 203N, and the other end (low-potential-side terminal) thereof is electrically connected to the anode of the diode 4UN and electrically connected to the snubber terminal 205N.

The n-number of switch circuits 101N are connected in series. Specifically, the positive-side terminal (high-potential-side terminal) 203N of a switch circuit 101N is electrically connected to the negative-side terminal (low-potential-side terminal) 204N of a switch circuit 101N which neighbors on the high-potential side, and the positive-side terminal 203N (N=n) of a switch circuit 101N, which is located on the most high-potential side, is electrically connected to the second circuit 400. The negative-side terminal 204N of a switch circuit 101N is electrically connected to the positive-side terminal 203N of a switch circuit 101N which neighbors on the low-potential side, and the negative-side terminal 204N (N=1) of a switch circuit 101N, which is located on the most low-potential side, is electrically connected to the positive-side cell terminal 200 of the inverter cell 100.

The n-number of regenerative rectification diodes 6UN (N=1~n) are connected in series to each other, with a direction from the low-potential side toward the high-potential side being set as a forward direction, and are connected between the low-potential-side terminal of the switching element 1X (the low-potential-side terminal of the inverter cell 100) and the low-potential-side terminal of the capacitor 3U1 of the first switch circuit 101I which is located on the most low-potential side, and the low-potential-side terminal of the capacitor 3UN of a neighboring first switch circuit 101N.

The cathode of each of the regenerative rectification diodes (first regenerative rectification diodes) 6UN (N=1~n) is electrically connected to the snubber terminal 205N (N=1~n) of the switch circuit 101N and the anode of the regenerative rectification diode 6UN (N=1~n) which neighbors on the high-potential side. For example, the cathode of a regenerative rectification diode 6Uk (1☐k≤n−1) is electrically connected to a snubber terminal 205k of a switch circuit 101k and the anode of a regenerative rectification diode 6U(k+1).

One end of the resistor 5UN is connected in series to a connection node between the diode 4UN and capacitor 3UN (a part of a structure which electrically connects the other end (low-potential-side terminal) of the capacitor 3UN and the anode of the diode 4UN). The other end of the resistor 5UN is electrically connected via the regenerative rectification diode 6UN to a circuit in which the capacitor 3UN and resistor 5UN of the switch circuit 101N connected on the low-potential side are connected in series. The other end of the resistor 5UN of the switch circuit 101N (N=1), which is located on the most low-potential side, is electrically connected to the negative-side cell terminal 201 of the inverter cell 100 via the snubber terminal 205N and regenerative rectification diode 6UN.

Each of the m-number of switch circuits (second switch circuits) 102M includes a switching element (second switching element) 1XM, a diode (second diode) 4XM, a capacitor (second capacitor) 3XM, a snubber terminal 208M, a positive-side terminal 206M, and a negative-side terminal 207M.

Note that it suffices that the positive-side terminal 206M, negative-side terminal 207M and snubber terminal 208M are configured such that circuits can be electrically connected at the positions of these terminals, and the terminals may be omitted. In addition, the switch circuit 102M may include a plurality of switching elements 1XM. In this case, the switching elements 1XM are connected in parallel to the capacitor 3XM and diode 4XM between the positive-side terminal 206M and negative-side terminal 207M. The switching elements 1XM may be connected in series to each other, or may be connected in parallel to each other.

The switching element 1XM is, for example, a MOSFET. The drain (high-potential-side terminal) of the switching element 1XM is electrically connected to the positive-side terminal 206M, and the source (low-potential-side terminal) of the switching element 1XM is electrically connected to the negative-side terminal 207M.

The anode of the diode 4XM is electrically connected to the drain of the switching element 1XM and the positive-side terminal 206M, and the cathode thereof is electrically connected to the snubber terminal 208M. Note that it is preferable that the diode 4XM has fast recovery characteristics with a low recovery loss, and it is preferable that, for example, a Schottky barrier diode (SBD) with good recovery characteristics or an element utilizing a wide bandgap semiconductor (e.g. SiC, GaN) is used as the diode 4XM.

One end (low-potential-side terminal) of the capacitor 3XM is electrically connected to the source of the switching element 1XM and the negative-side terminal 207M, and the other end (high-potential-side terminal) thereof is electrically connected to the cathode of the diode 4XM and electrically connected to the snubber terminal 208M.

The m-number of switch circuits 102M are connected in series. Specifically, the positive-side terminal 206M of a switch circuit 102M is electrically connected to the negative-side terminal 207M of a switch circuit 102M which neighbors on the high-potential side, and the positive-side terminal 206M (M=1) of a switch circuit 102M, which is located on the most high-potential side, is electrically connected to the negative-side cell terminal 201 of the inverter cell 100. The negative-side terminal 207M of a switch circuit 102M is electrically connected to the positive-side terminal 206M of a switch circuit 102M which neighbors on the low-potential side, and the negative-side terminal 207M (M=m) of a switch circuit 102M, which is located on the most low-potential side, is electrically connected to the second circuit 400.

The m-number of regenerative rectification diodes (second regenerative rectification diodes) 6XM (M=1~m) are connected in series to each other, with a direction from the low-potential side toward the high-potential side being set as a forward direction, and are connected between the high-potential-side terminal of the switching element 1U (the high-potential-side terminal of the inverter cell 100) and the high-potential-side terminal of the capacitor 3X1 of the second switch circuit 102I which is located on the most high-potential side, and the high-potential-side terminal of the capacitor 3XM of a neighboring second switch circuit 102M.

The anode of each of the regenerative rectification diodes 6XM (M=1~m) is electrically connected to the snubber terminal 208M (M=1~m) of the switch circuit 102M and the cathode of the regenerative rectification diode 6XM (M=1~m) which neighbors on the low-potential side. For example, the anode of a regenerative rectification diode 6Xj (1⊔j≤m−1) is electrically connected to a snubber terminal 208j of a switch circuit 102j and the cathode of a regenerative rectification diode 6X(j+1).

One end of the resistor 5XM is connected in series to a connection node between the diode 4XM and capacitor 3XM (a part of a structure which electrically connects the other end (high-potential-side terminal) of the capacitor 3XM and the cathode of the diode 4XM). The resistor 5 is electrically connected via the regenerative rectification diode 6XM to a circuit in which the capacitor 3XM and resistor 5XM of the switch circuit 102M connected on the high-potential side are connected in series. The other end of the resistor 5XM of the switch circuit 102M (M=1), which is located on the most high-potential side, is electrically connected to the positive-side cell terminal 200 of the inverter cell 100 via the snubber terminal 208M and regenerative rectification diode 6XM.

Specifically, the power conversion apparatus of the present embodiment includes, when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element 1UN, the regenerative rectification circuit which connects the low-potential-side terminal of the inverter cell 100 and the low-potential-side terminal of the first capacitor 3UN of the upper arm, with a direction from the low-potential side toward the high-potential side being set as a forward direction.

In addition, the power conversion apparatus of the present embodiment includes, when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects the high-potential-side terminal of the inverter cell 100 and the high-potential-side terminal of the second capacitor 3XM of the lower arm, with a direction from the low-potential side toward the high-potential side being set as a forward direction.

In the power conversion apparatus of the present embodiment, although it is preferable that the number n of switch circuits 101N and the number m of switch circuits 102M are equal, the numbers n and m may be different.

In addition, in the power conversion apparatus of the present embodiment, the switching elements 1U, 1X, 1UN and 1XM are not limited to MOSFETs, and may be IGBTs (Insulated Gate Bipolar Transistors) or mechanical switches.

Besides, although advantageous effects of the present embodiment can be obtained even when the elements with different voltage ratings or current ratings are used as the switching elements 1U, 1X, 1UN and 1XM, it is preferable to use elements with the same voltage rating and current rating as the switching elements 1U, 1X, 1UN and 1XM.

In addition, the first resistors 5UN and second resistors 5XM included in the first circuit 300 may be replaced with reactors or inductance elements.

The second circuit 400 includes an upper-side high-breakdown-voltage inverter cell 106p and a lower-side high-breakdown-voltage inverter cell 106n.

The upper-side high-breakdown-voltage inverter cell 106p and lower-side high-breakdown-voltage inverter cell 106n are connected in series between the positive-side DC terminal 209 and negative-side DC terminal 210. A node between the upper-side high-breakdown-voltage inverter cell 106p and lower-side high-breakdown-voltage inverter cell 106n is electrically connected to an intermediate terminal 212 of the whole circuit of the power conversion apparatus of the present embodiment.

The upper-side high-breakdown-voltage inverter cell 106p includes high-breakdown-voltage switching elements 8pu and 8px and a DC capacitor 9p. The high-breakdown-voltage switching element 8pu and high-breakdown-voltage switching element 8px are, for example, MOSFETs.

The high-breakdown-voltage switching element (upper-side high-breakdown-voltage switching element) 8pu, 8nu is connected between the high-potential-side terminal and output terminal of the high-breakdown-voltage inverter cell 106p, 106n. The high-breakdown-voltage switching element (lower-side high-breakdown-voltage switching element) 8px, 8nx is connected between the low-potential-side terminal and output terminal of the high-breakdown-voltage inverter cell 106p, 106n.

The drain of the high-breakdown-voltage switching element 8pu is electrically connected to the positive-side DC terminal 209, and the source thereof is electrically connected to the drain of the high-breakdown-voltage switching element 8px. The source of the high-breakdown-voltage switching element 8px is electrically connected to the lower-side high-breakdown-voltage inverter cell 106n.

The DC capacitor 9p is connected between the drain of the high-breakdown-voltage switching element 8pu and the source of the high-breakdown-voltage switching element 8px.

The upper-side high-breakdown-voltage inverter cell 106p is connected, at a node between the high-breakdown-voltage switching element 8pu and high-breakdown-voltage switching element 8px, to the positive-side terminal 203n of the n-th switch circuit (first switch circuit) 101n.

The lower-side high-breakdown-voltage inverter cell 106n includes high-breakdown-voltage switching elements 8nu and 8nx and a DC capacitor 9n. The high-breakdown-voltage switching element 8nu and high-breakdown-voltage switching element 8nx are, for example, MOSFETs.

The drain of the high-breakdown-voltage switching element 8nu (upper-side high-breakdown-voltage switching element) is electrically connected to the upper-side high-breakdown-voltage inverter cell 106p, and the source thereof is electrically connected to the drain of the high-breakdown-voltage switching element 8nx. The source of the high-breakdown-voltage switching element (lower-side high-breakdown-voltage switching element) 8nx is electrically connected to the negative-side DC terminal 210.

The DC capacitor 9n is connected between the drain of the high-breakdown-voltage switching element 8nu and the source of the high-breakdown-voltage switching element 8nx.

The lower-side high-breakdown-voltage inverter cell 106n is connected, at a node between the high-breakdown-voltage switching element 8nu and high-breakdown-voltage switching element 8nx, to the negative-side terminal 207m of the m-th switch circuit (second switch circuit) 102m.

Note that, in the power conversion apparatus of the present embodiment, the high-breakdown-voltage switching elements 8pu, 8px, 8nu and 8nx are not limited to MOSFETs, and may be IGBTs (Insulated Gate Bipolar Transistors) or mechanical switches.

In the power conversion apparatus of the present embodiment, a closed circuit is constituted via the positive-side DC terminal 209, negative-side DC terminal 210, and DC capacitors (not shown) which are connected between the positive-side DC terminal 209 and intermediate terminal 212 and between the negative-side DC terminal 210 and intermediate terminal 212. There is a case where a surge voltage occurs due to a parasitic inductance (not shown) which parasitizes this closed circuit. At this time, in the power conversion apparatus of the present embodiment, the surge voltage that occurs can be suppressed by the capacitors 3UN and 3XM.

Next, an example of the operation of the power conversion apparatus of the present embodiment will be described.

Figure 20:
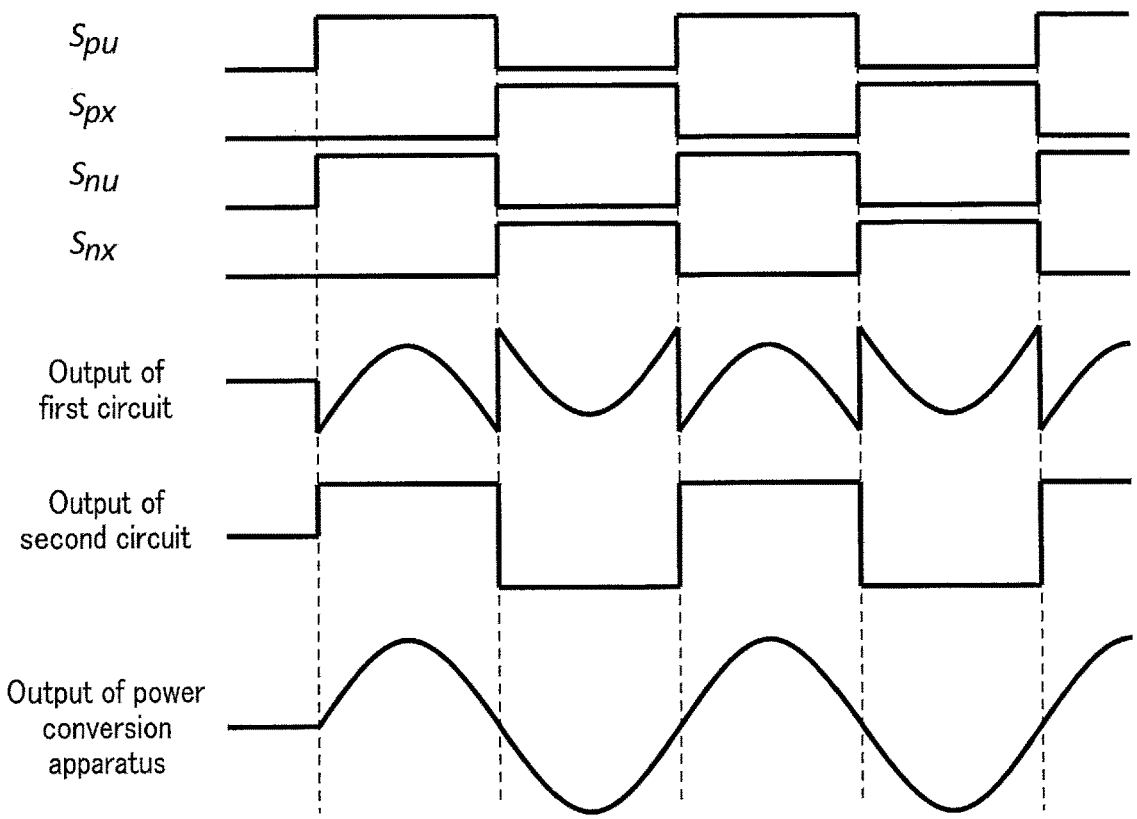
FIG. 20 is a view for describing an example of the operation of the power conversion apparatus of the embodiment.

FIG. 20 is a view for describing an example of the operation of the power conversion apparatus of the first embodiment.

Here, FIG. 20 illustrates an example of waveforms of gate signals of the high-breakdown-voltage switching elements 8pu, 8px, 8nu and 8nx of the second circuit 400, an output voltage waveform of the first circuit 300, an output voltage waveform of the second circuit 400, and an output voltage waveform of the power conversion apparatus (inverter).

In the example illustrated in FIG. 20, the upper-side high-breakdown-voltage inverter cell 106p and lower-side high-breakdown-voltage inverter cell 106n perform the same operation. Specifically, the gate signal Spu of the upper-side high-breakdown-voltage switching element Spu of the upper-side high-breakdown-voltage inverter cell 106p and the gate signal Snu of the upper-side high-breakdown-voltage switching element Snu of the lower-side high-breakdown-voltage inverter cell 106n have the same waveform. The gate signal Spx of the lower-side high-breakdown-voltage switching element 8px of the upper-side high-breakdown-voltage inverter cell 106p and the gate signal Snx of the lower-side high-breakdown-voltage switching element Snx of the lower-side high-breakdown-voltage inverter cell 106n have the same waveform.

In the power conversion apparatus of the present embodiment, in each of the upper-side high-breakdown-voltage inverter cell 106*p* and lower-side high-breakdown-voltage inverter cell 106*n* of the second circuit 400, the polarity of the output voltage of the power conversion apparatus becomes positive by turning on the upper-side high-breakdown-voltage switching element 8*pu*, 8*nu*, and the polarity of the output voltage of the power conversion apparatus becomes negative by turning on the lower-side high-breakdown-voltage switching element 8*px*, 8*nx*.

The first circuit 300 can generate a freely selected waveform by performing PWM (Pulse Width Modulation). In the example illustrated in FIG. 2, for example, a gate signal of the upper arm and a gate signal of the lower arm of the first circuit 300 are generated by comparing, for example, a voltage instruction value, which is an output of a difference between a sine wave and an output voltage of the second circuit 400, and a triangular wave.

In the power conversion apparatus of the present embodiment, by operating the second circuit 400 and the first circuit 300 as described above, a freely selected waveform (e.g. a sine wave) can be output.

Next, an example of the operation of the first circuit 300 in the power conversion apparatus of the present embodiment will be described.

In the power conversion apparatus of the embodiment, the switching elements 1UN of the upper arm and the switching elements 1XM of the lower arm of the first circuit 300 are sequentially switched at predetermined time intervals, and thereby losses, such as a turn-on loss, a turn-off loss and a recovery loss, can be reduced.

In the state in which all of the switching elements 1U and 1X of the inverter cell 100, the switching elements 1UN of the upper arm and the switching elements 1XM of the lower arm are rendered off, when current is output from the AC terminal 211, current flows in a parasitic diode of the switching element 1X of the inverter cell 100 and a parasitic diode of the switching element 1XM of the switch circuit 102M.

In this state, if the switching element 1U of the inverter cell 100 is rendered on, current flows in parasitic diodes of the switching elements 1XM of the switch circuits 102M of the lower arm, flows in such a direction as to discharge the floating capacitor 2 in the inverter cell 100, and flows through the switching element 1U, thus flowing to the AC terminal 211.

Subsequently, any one of the switching elements 1UN of the switch circuits 101N of the upper arm is rendered on. Here, a description is given of the case in which the switching element 1U*n* of the switch circuit 101*n* is rendered on.

If the switching element 1U*n* is rendered on, the voltage that is applied to one of the switch circuits 101N is divided into a series number (=m) of the switch circuits 102M, and the divided voltages are applied to the switch circuits 102M, respectively. Thus, the voltage, which is applied at the time of recovery of the parasitic diodes of the switching elements 1XM of the switch circuits 102M, decreases, and the loss (recovery loss) occurring at the time of recovery is reduced. Further, a variation amount of recovery current is decreased by the parasitic inductance of the switching group, which increases in accordance with the series number of switch circuits 102M, and, as a result, the recovery charge decreases and the recovery loss is reduced.

If voltage is applied to the switch circuit 102M, current is unable to flow in the parasitic diode of the switching element 1XM, and is commutated to the switch circuit 101N.

Accordingly, in the switch circuit 101*n*, current flows through the switching element 1U*n* that is rendered on, and, in the switch circuits 1011 to 101(*n*−1), current flows in the capacitors 3U1 to 3U(n−1) and diodes 4U1 to 4U(n−1).

By the transition of the state of flowing of the current, for example, the energy, which is converted to heat as a switching loss in the conventional 2-level inverter, is stored in the capacitors 3U1 to 3U(n−1) in the power conversion apparatus of the present embodiment. Specifically, the switching loss in the power conversion apparatus of the present embodiment is only the loss due to the switching of the switching elements 1UN of the switch circuits 101N, and is much smaller than in the conventional 2-level inverter.

In addition, for example, by rendering on the switching element 1U*n*, the diode 4U*n* and capacitor 3U*n* of the switch circuit 101*n* are connected in parallel.

One end of the resistor 5U*n* is connected in series to a parallel circuit of the diode 4U*n* and capacitor 3U*n*. The other end of the resistor 5U*n* is electrically connected via the regenerative rectification diode 6U*n* to the circuit in which the capacitor 3U(n−1) of the switch circuit 101(*n*−1) and the resistor 5U(n−1) are connected in series. Thereby, the energy stored in the capacitor 3U*n* is discharged to the capacitor 3U(n−1). The discharge ends when the voltage of the capacitor 3U*n* becomes equal to the voltage of the capacitor 3U(n−1).

In the above-described example, when the voltage of the capacitor 3U*n* is higher than the voltage of the capacitor 3U(n−1), the capacitor 3U*n* is discharged. In addition, since the difference between the voltage of the capacitor 3U*n* and the voltage of the capacitor 3U(n−1) is much smaller than the voltage of each of the capacitors 3U*n* and 3U(n−1), discharge can be executed with high efficiency even if the resistors 5U*n* and 5U(n−1) intervene in the path of discharged energy.

When the switching elements 1UN of the switch circuits 101N are sequentially rendered on and all switching elements 1UN are rendered on, the energy stored in the capacitors 3UN is successively discharged, and the discharged energy is stored in the floating capacitor 2. This state is a state in which the switching elements of the upper arm of the power conversion apparatus are rendered on.

Thereafter, if the switching elements 1UN are sequentially rendered off and there comes a state in which all switching elements 1UN are rendered off, the floating capacitor 2 is discharged, and the energy generated by the switching can efficiently be regenerated. Thereafter, there comes a state in which the switching element 1U is rendered off, and there comes a state in which the upper arm of the power conversion apparatus is turned off.

In addition, by similarly operating the switching element 1X and the switch circuits 102M, the energy generated by the switching can be stored in the floating capacitor 2 via the capacitors 3XM, and, by discharging the floating capacitor 2, the energy generated by the switching can efficiently be regenerated.

As described above, in the power conversion apparatus of the present embodiment, for example, most of the energy at the time of switching, which is the loss in the conventional 2-level inverter, can be stored in the floating capacitor 2 via the capacitors 3UN and 3XM, and, by discharging the floating capacitor 2, the switching loss can be reduced without increasing the switching speed. Furthermore, by applying a low voltage to the switching elements 1UN and 1XM at the time of recovery of the parasitic diodes of the switching elements 1UN and 1XM, the recovery loss can be reduced.

Figure 21:
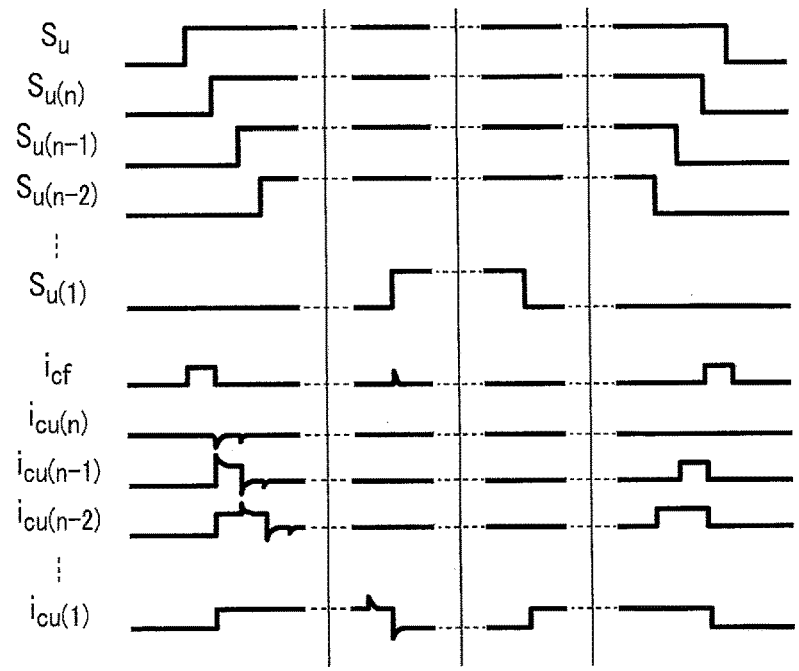
FIG. 21 is a view for describing an example of the operation of a first circuit of the power conversion apparatus of the embodiment.

FIG. 21 is a view for describing an example of the operation of the first circuit of the power conversion apparatus of the embodiment.

Here, FIG. 21 illustrates a timing chart showing an example of turn-on timing and turn-off timing of a gate signal Su of the switching element 1U and gate signals Su(N) of the switching elements 1UN of the upper arm, and illustrates an example of a relationship between currents icu(N) flowing in the capacitors 3UN and a current icf flowing in the floating capacitor 2. Note that, in FIG. 21, as regards the direction of the current icu(N) and current icf, the direction of output from the AC terminal 211 is a positive direction. In addition, in the period shown in FIG. 21, the switching element 1X and the switching elements 1XM of the lower arm are in the OFF state.

To begin with, from the state in which the switching element 1U and the switching elements 1UN of the upper arm are in the OFF state, the switching element 1U of the inverter cell 100 is turned on. Thereby, current icf flows in the floating capacitor 2, and the stored energy is discharged.

Subsequently, the switching elements 1UN of the switch circuits 101N of the upper arm are sequentially turned on. The order in which the switching elements 1UN of the switch circuits 101N are turned on is not limited. Here, a description is given of an example in which the switching elements 1UN are sequentially turned on in the order from the switching element 1Un of the switch circuit 101n to the switching element 1U1 of the switch circuit 1011, which is located on the side close to the inverter cell 100.

If the switching element 1Un is turned on, the current, which flows from the negative-side terminal of the first circuit 300 (the negative-side terminal 207m of the switch circuit 102m) through the parasitic diodes of the switching elements 1XM of the switch circuits 102M of the lower arm, is commutated so as to flow to the positive-side terminal of the first circuit 300 (the positive-side terminal 203n of the switch circuit 101n). Thereby, the discharge of the floating capacitor 2 is finished.

If the current is commutated to the positive-side terminal 203n, current flows through the turned-on switching element 1Un, and the capacitors 3U1-3U(n−1) and diodes 4U1-4U(n−1) which are connected in parallel to the switching elements 1U1-1U(n−1) that are turned off.

In addition, the capacitor 3Un, which is connected in parallel to the turned-on switching element 1Un, and the capacitor 3U(n−1) of the switch circuit 101(n−1) that is connected to the low-potential side, are connected via the regenerative rectification diode 6Un, and the energy stored in the capacitor 3Un is discharged to the capacitor 3U(n−1).

Next, if the switching element 1U(n−1) of the switch circuit 101(n−1), which is connected to the low-potential side of the switch circuit 101n, is turned on, the current flowing in the capacitor 3U(n−1) is commutated to the switching element 1U(n−1), and the charge to the capacitor 3U(n−1) is finished.

Subsequently, if the switching element 1U(n−1) of the switch circuit 101(n−1) is turned on, the capacitor 3U(n−1) and the capacitor 3U(n−2) of the switch circuit 101(n−2), which is connected to the low-potential side, are connected via the regenerative rectification diode 6U(n−1), and the energy stored in the capacitor 3U(n−1) is discharged to the capacitor 3U(n−2).

In the example illustrated in FIG. 21, FIG. 21 illustrates the timings of two discharge operations, i.e. the discharge from the capacitor 3Un to capacitor 3U(n−1), and the discharge from the capacitor 3U(n−1) to capacitor 3U(n−2). Since the discharge between the capacitors 3UN varies depending on the relation in voltage between the capacitors 3UN, the discharge is not limited to this example. For example, when the voltage of the capacitor 3Un is higher than the voltages of the capacitor 3U(n−1) and capacitor 3U(n−2), the energy stored in the capacitor 3Un is discharged to the capacitor 3U(n−1) and capacitor 3U(n−2). Specifically, the energy stored in the capacitor 3Un can be discharged to one or a plurality of other capacitors 3UN having lower voltages.

For example, as illustrated in FIG. 21, if the switching element 1U is turned on, and the switching element 1Un to switching element 1U1 are sequentially turned on, all switching elements of the upper arm of the power conversion apparatus are turned on, and the energy successively discharged from the capacitor 3Un to capacitor 3U1 is ultimately charged in the floating capacitor 2.

Subsequently, the switching element 1U of the inverter cell 100 and the switching elements 1UN of the switch circuits 101N are sequentially turned off. The order in which the switching elements 1UN are turned off is not limited. Here, a description is given of an example in which the switching elements 1UN are sequentially turned off in the order from the switching element 1U1 of the switch circuit 1011, which is located on the side close to the inverter cell 100 (the low-potential side), to the switching element 1Un of the switch circuit 101n. The switching element 1U is turned off after all of the switching elements 1UN are turned off.

In the state in which the switching element 1U and the switching elements 1UN are all turned on, for example, if the switching element 1U1 is turned off, the current flowing through the switching element 1U1 flows to the capacitor 3U1, and the capacitor 3U1 is charged. At this time, since the energy, which is converted to heat as a switching loss, for example, in the conventional 2-level inverter, is charged in the capacitor 3U1, a switching operation with high efficiency can be performed.

The above-described turn-off operation is sequentially performed from the switching element 1U1 to the switching element 1Un. Thereby, the energy charged in the capacitors 3U1 to 3U(n−1) is sequentially discharged to the capacitor 3Un. Subsequently, if the switching element 1Un is turned off, the energy stored in the capacitor 3Un is ultimately charged in the floating capacitor 2.

If the above-described turn-off operation is finished, there comes the state in which the switching element 1U is turned on and all the switching elements 1UN are turned off, and the energy charged in the floating capacitor 2 is discharged. Thereby, the energy stored in the floating capacitor 2 can efficiently be regenerated.

Thereafter, if the switching element 1U is turned off, the discharge of the floating capacitor 2 is finished.

According to the switching operation of the switching elements 1U and 1UN, the charge current flowing in the capacitor 3Un, which is connected in parallel to the first turned-on switching element 1Un, is small, and the charge current flowing in the capacitor 3U1, which is connected in parallel to the last turned-on switching element 1U1, is large.

In addition, the charge current flowing in the capacitor 3U1, which is connected in parallel to the first turned-off switching element 1U1, is large, and the charge current flowing in the capacitor 3Un, which is connected in parallel to the last turned-off switching element 1Un, is small.

Accordingly, there is a tendency that the charge current flowing in the capacitor 3UN connected in parallel to the switching element 1UN, the turn-on timing of which is later and the turn-off timing of which is earlier, increases, and the duty thereof is large. By adjusting the electrostatic capacitance of the capacitor 3UN in accordance with the duty thereof, the heat generation or voltage increase of the capacitor 3UN itself can be suppressed.

Figure 22:
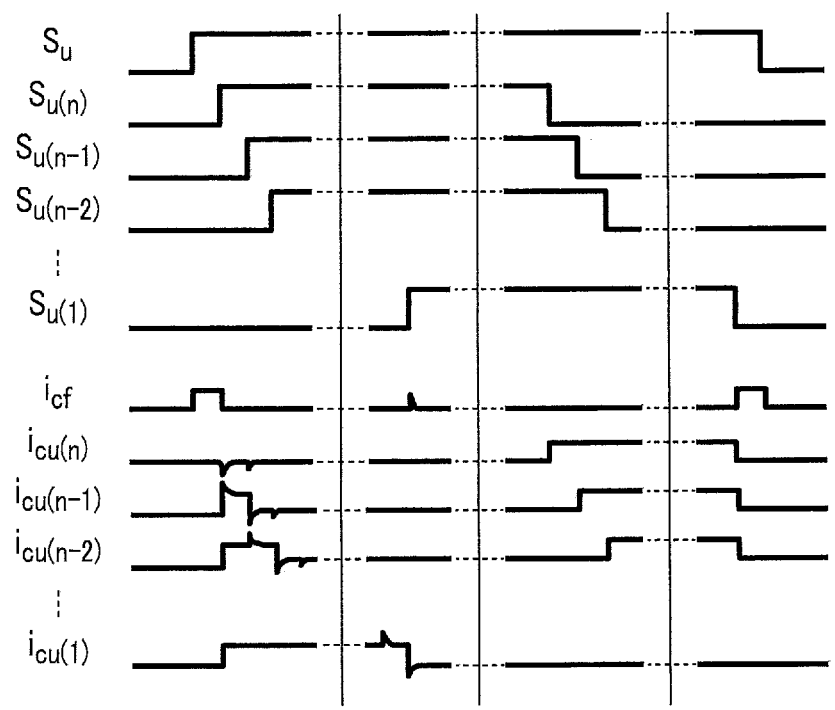
FIG. 22 is a view for describing another example of the operation of the first circuit of the power conversion apparatus of the embodiment.

FIG. 22 is a view for describing another example of the operation of the first circuit of the power conversion apparatus of the embodiment.

Here, FIG. 22 illustrates a timing chart showing an example of turn-on timing and turn-off timing of a gate signal Su of the switching element 1U and gate signals Su(N) of the switching elements 1UN of the upper arm, and illustrates an example of a relationship between currents icu(N) flowing in the capacitors 3UN and a current icf flowing in the floating capacitor 2. Note that, in FIG. 22, as regards the direction of the current icu(N) and current icf, the direction of output from the AC terminal 211 is a positive direction. In addition, in the period shown in FIG. 22, the switching element 1X and the switching elements 1XM of the lower arm are in the OFF state.

The operation of the power conversion apparatus of the present embodiment is different from the operation in the above-described first embodiment with respect to the order of turn-off of the switching elements 1UN. In this example, the switching elements 1UN are turned off in the same order as the order in which the switching elements 1UN are turned on. For instance, in the example illustrated in FIG. 22, after the switching element 1U is turned on, the switching elements 1UN are sequentially turned on in the order from the switching element 1Un of the switch circuit 101n to the switching element 1U1 of the switch circuit 1011, which is located on the side close to the inverter cell 100 (the low-potential side), and, in the same order as this, the switching elements 1UN are turned off from the switching element 1Un to the switching element 1U1. The switching element 1U is turned off after all of the switching elements 1UN are turned off.

Here, a description is given of the operation of turning off the switching elements 1UN.

In the state in which the switching element 1U and the switching elements 1UN are all turned on, for example, if the switching element 1Un is turned off, the current flowing through the switching element 1Un flows to the capacitor 3Un, and the capacitor 3Un is charged.

The above-described turn-off operation is sequentially performed from the switching element 1Un to the switching element 1U1. Thereby, the energy charged in the capacitor 3Un is sequentially discharged to the capacitor 3U1, and is ultimately charged in the floating capacitor 2.

If the above-described turn-off operation of the switching elements 1UN is finished, there comes the state in which the switching element 1U is turned on and all the switching elements 1UN are turned off, and the energy charged in the floating capacitor 2 is discharged. Thereby, the energy stored in the floating capacitor 2 can efficiently be regenerated.

Thereafter, if the switching element 1U is turned off, the discharge of the floating capacitor 2 is finished.

According to the switching operation of the switching elements 1U and 1UN, the charge current flowing in the capacitor 3Un, which is connected in parallel to the first turned-on switching element 1Un, is small, and the charge current flowing in the capacitor 3U1, which is connected in parallel to the last turned-on switching element 1U1, is large.

In addition, the charge current flowing in the capacitor 3Un, which is connected in parallel to the first turned-off switching element 1Un, is large, and the charge current flowing in the capacitor 3U1, which is connected in parallel to the last turned-off switching element 1U1, is small.

Accordingly, the charge currents flowing in the capacitors 3UN become substantially equal, and the duties of the capacitors 3UN also become substantially equal. Thereby, by making equal the electrostatic capacitances of the capacitors 3UN, the heat generation or voltage increase of the capacitor 3UN itself can be suppressed.

From the above, according to the power conversion apparatus of the present embodiment, like the above-described example illustrated in FIG. 21, the suppression of a switching loss can be realized without performing high-speed switching, and an increase in size of the power conversion apparatus can be avoided.

Hereinafter, examples of the advantageous effects of the power conversion apparatus of the present embodiment will be described.

FIG. 23A to FIG. 25B are views for describing examples of the advantageous effects of the power conversion apparatus of the embodiment.

Figure 23A:
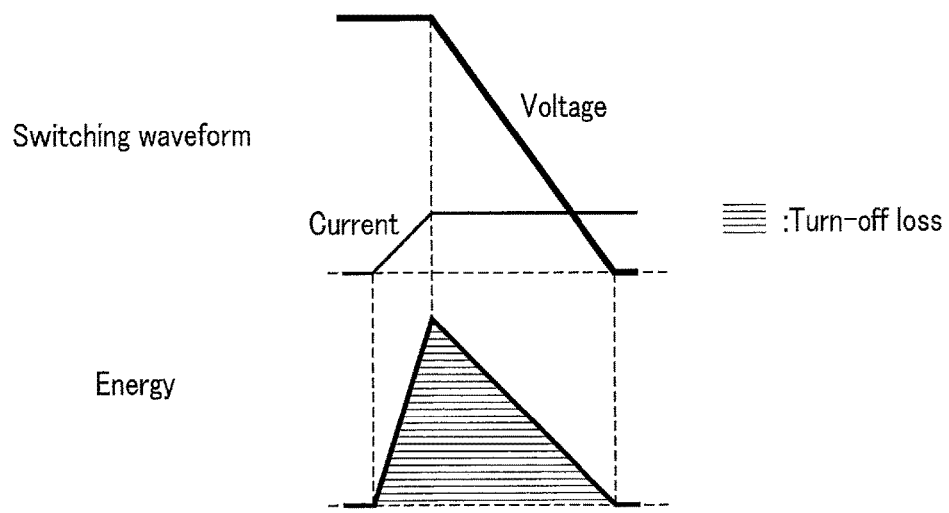
FIG. 23A is a view illustrating, as a comparative example, an example of a loss occurring by turn-on of a switching element in a conventional 2-level inverter.

FIG. 23A is a view illustrating, as a comparative example, an example of a loss occurring by turn-on of a switching element in a conventional 2-level inverter.

Figure 23B:
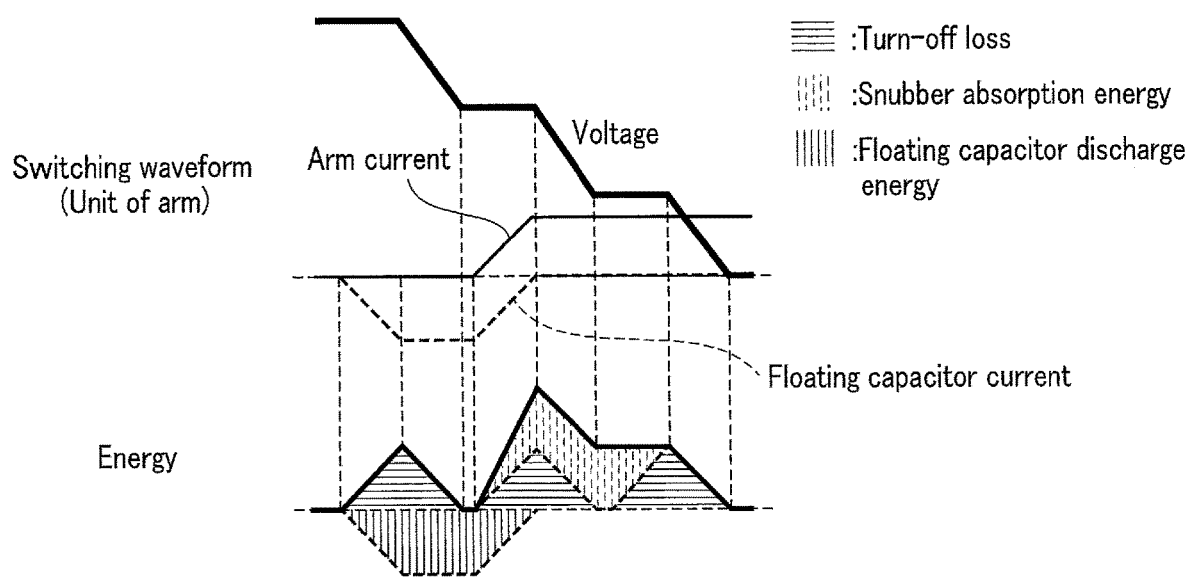
FIG. 23B is a view illustrating an example of a loss occurring in an arm by turn-on of a switching element in the power conversion apparatus of the embodiment.

FIG. 23B is a view illustrating an example of a loss occurring in an arm by turn-on of switching elements in the power conversion apparatus of the embodiment.

Figure 23C:
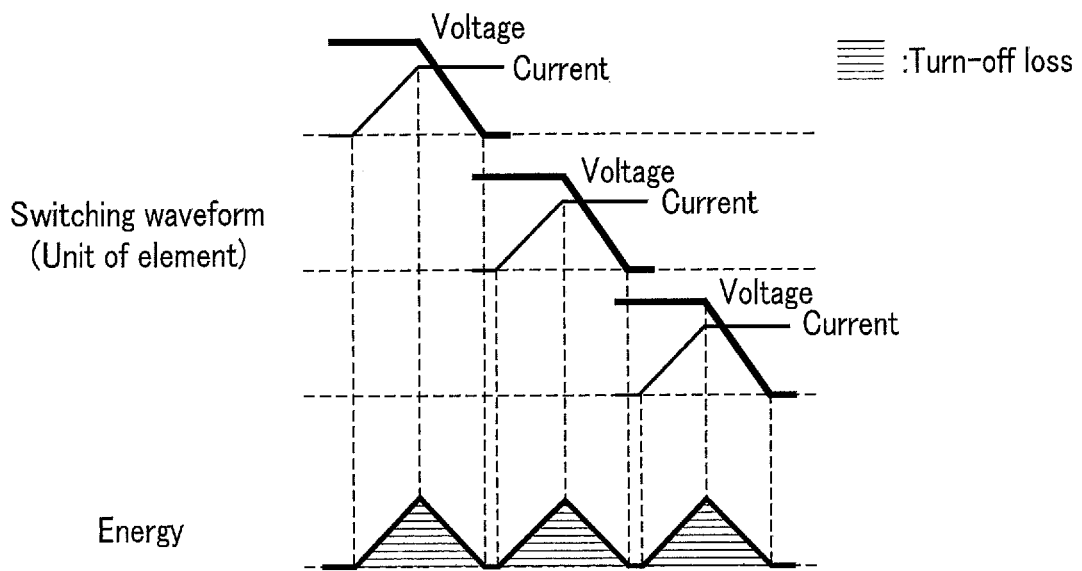
FIG. 23C is a view illustrating an example of a loss occurring in each element by turn-on of switching elements in the power conversion apparatus of the embodiment.

FIG. 23C is a view illustrating an example of a loss occurring in each element by turn-on of switching elements in the power conversion apparatus of the embodiment.

For example, as illustrated in FIG. 23A, in the conventional 2-level inverter, at a timing when the switching element is turned on, the current flowing through the switching element increases and the voltage applied to the switching element decreases. The energy, which occurs in the switching element by the current flowing through the switching element and the voltage applied to the switching element, changes to heat without being absorbed by other elements, and becomes a switching loss.

On the other hand, in the power conversion apparatus of the present embodiment, as illustrated in FIG. 23C, when consideration is given to each switching element, energy occurs at a turn-on time, like the conventional art. However, as illustrated in FIG. 23B, when consideration is given to the entire arm, the energy occurring at a switching time is absorbed by the capacitors 3UN. The energy stored in the capacitors 3UN is discharged to the floating capacitor 2, and is regenerated as discharge energy of the floating capacitor 2. Thus, the loss in the entire arm is part of the energy occurring when the switching elements 1U and 1UN are turned on, and the energy efficiency is improved.

Figure 24A:
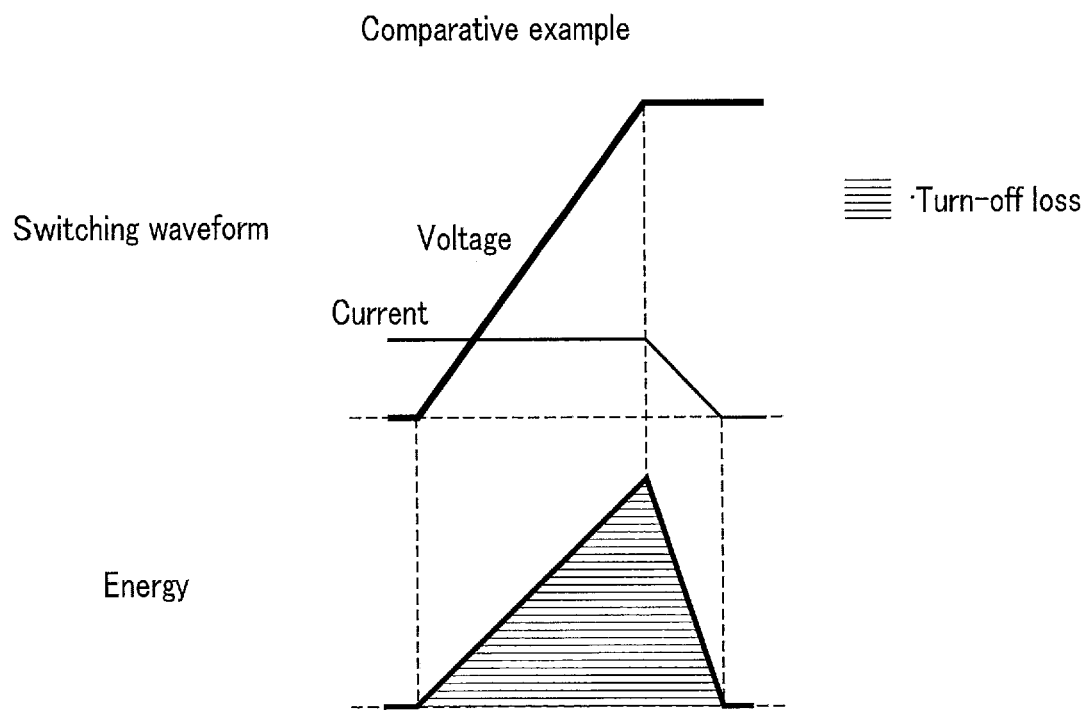
FIG. 24A is a view illustrating, as a comparative example, an example of a loss occurring by turn-off of a switching element in a conventional 2-level inverter.

FIG. 24A is a view illustrating, as a comparative example, an example of a loss occurring by turn-off of a switching element in a conventional 2-level inverter.

Figure 24B:
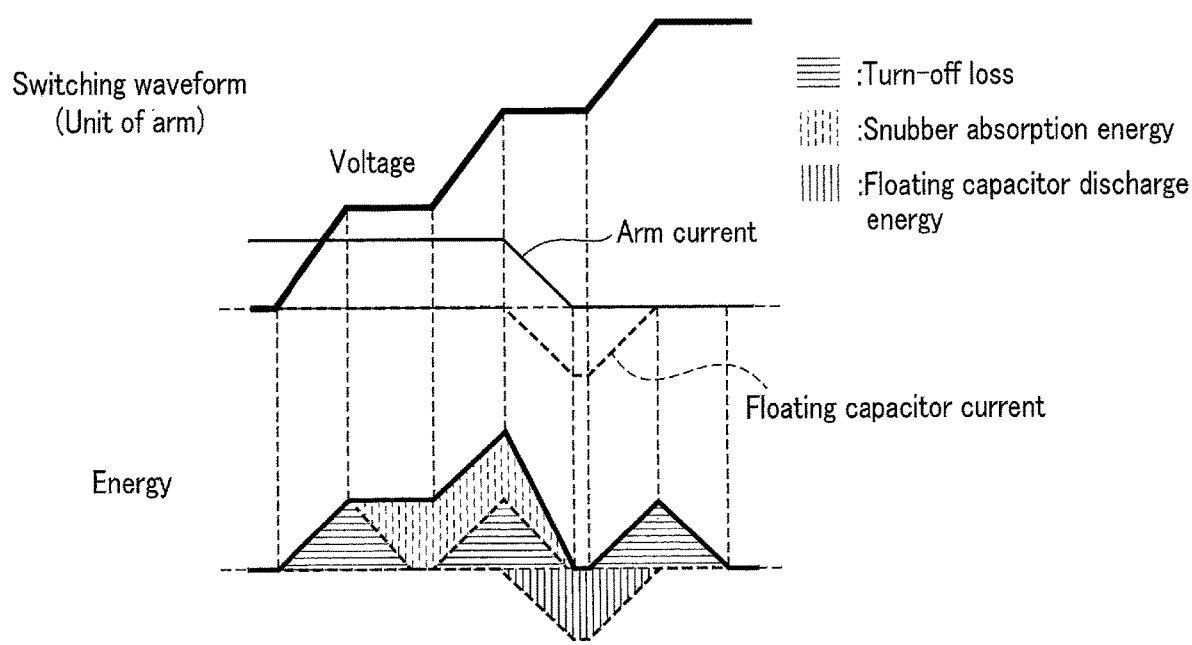
FIG. 24B is a view illustrating an example of a loss occurring in an arm by turn-off of switching elements in the power conversion apparatus of the embodiment.

FIG. 24B is a view illustrating an example of a loss occurring in an arm by turn-off of switching elements in the power conversion apparatus of the embodiment.

Figure 24C:
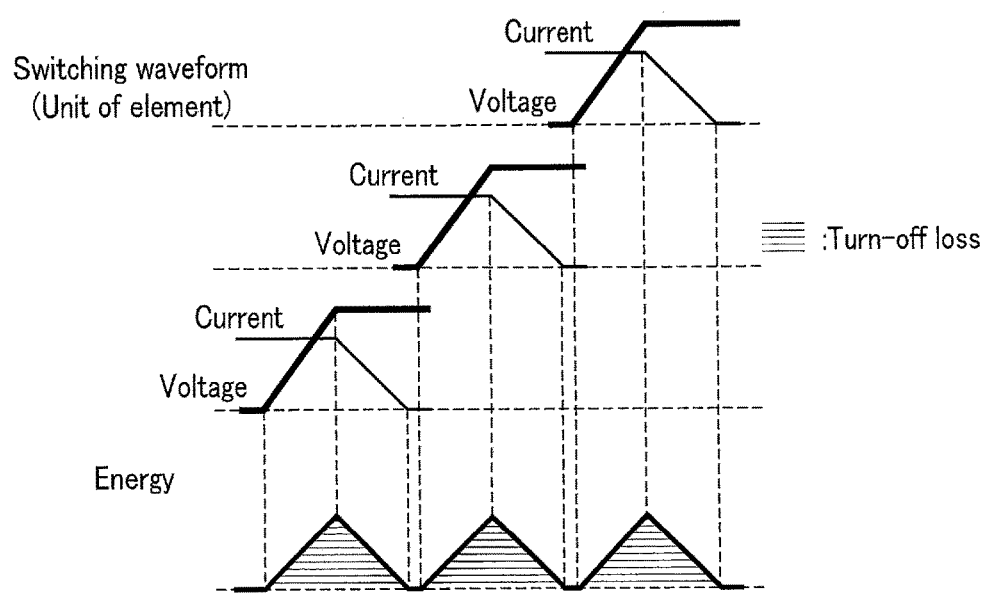
FIG. 24C is a view illustrating an example of a loss occurring in each element by turn-off of switching elements in the power conversion apparatus of the embodiment.

FIG. 24C is a view illustrating an example of a loss occurring in each element by turn-off of switching elements in the power conversion apparatus of the embodiment.

For example, as illustrated in FIG. 24A, in the conventional 2-level inverter, at a timing when the switching element is turned off, the voltage applied to the switching element increases and the current flowing through the switching element decreases. In this manner, the energy, which occurs in the switching element by the current flowing through the switching element and the voltage applied to the switching element, changes to heat without being absorbed by other elements, and becomes a switching loss.

On the other hand, in the power conversion apparatus of the present embodiment, as illustrated in FIG. 24C, when consideration is given to each switching element, energy occurs at a turn-off time, like the conventional art. However, as illustrated in FIG. 24B, when consideration is given to the entire arm, the energy occurring at a switching time is absorbed by the capacitors 3UN and is regenerated as discharge energy of the floating capacitor 2. Thus, the loss in the entire arm is part of the energy occurring when the switching elements 1U and 1UN are turned off, and the energy efficiency is improved.

Figure 25A:
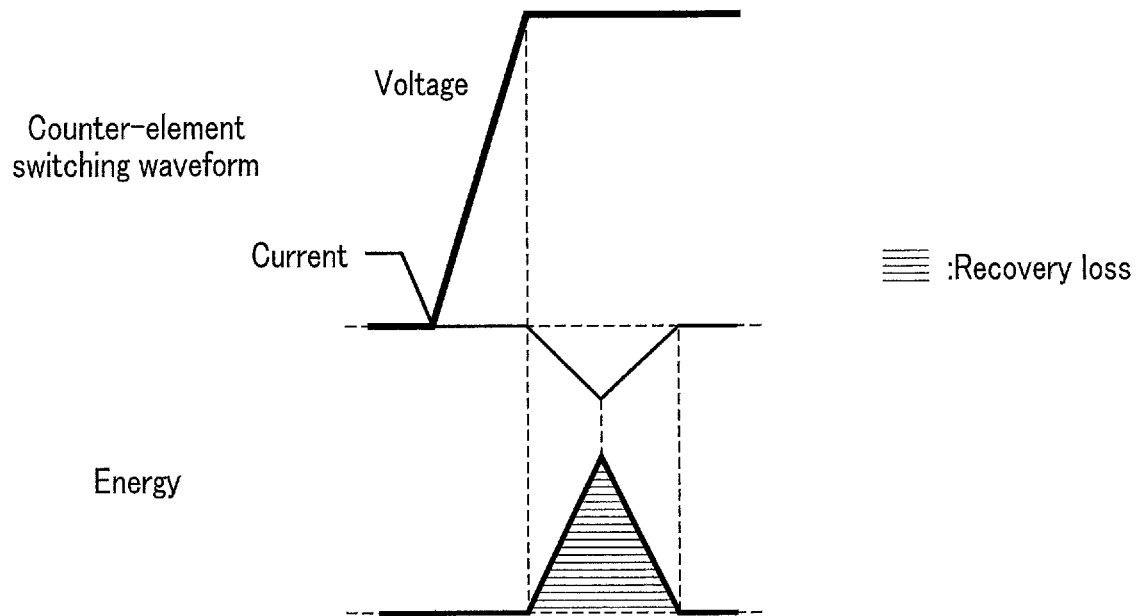
FIG. 25A is a view illustrating, as a comparative example, an example of a recovery loss occurring in a conventional 2-level inverter.

FIG. 25A is a view illustrating, as a comparative example, an example of a recovery loss occurring in a conventional 2-level inverter.

Figure 25B:
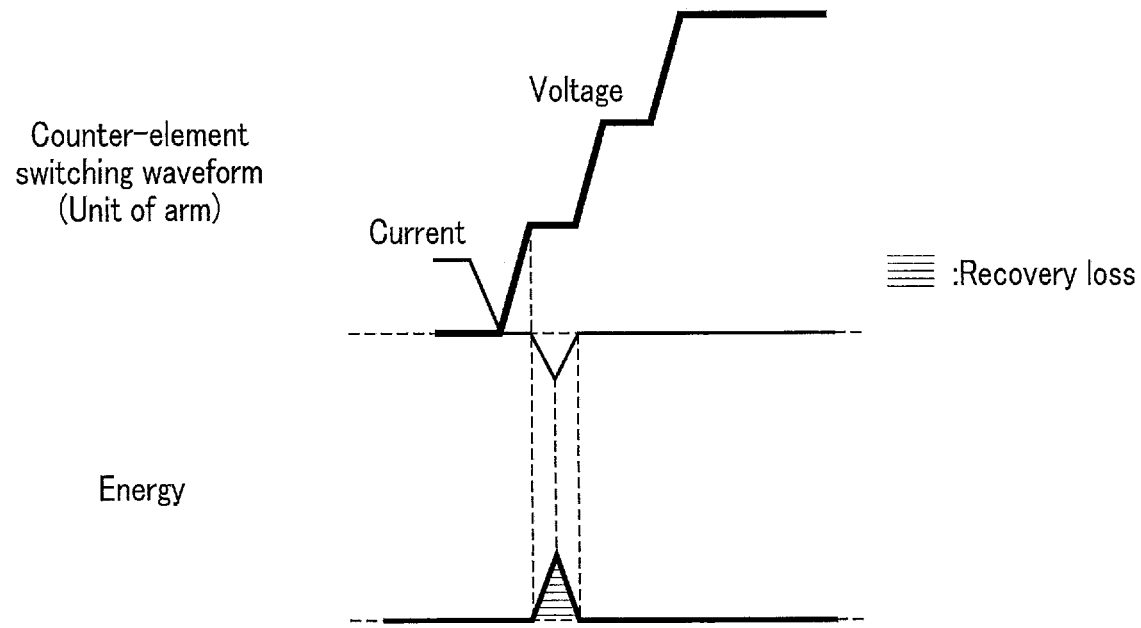
FIG. 25B is a view illustrating an example of a recovery loss occurring in the power conversion apparatus of the embodiment.

FIG. 25B is a view illustrating an example of a recovery loss occurring in the power conversion apparatus of the embodiment.

For example, as illustrated in FIG. 25A, in the conventional 2-level inverter, when the switching element of the lower arm is turned on, a recovery loss occurs by the current flowing in the parasitic diode at the time of recovery of the parasitic diode of the switching element of the upper arm and the applied voltage.

On the other hand, in the power conversion apparatus of the present embodiment, for example, when any one of the switching elements 1XM is turned on, as illustrated in FIG. 25B, the voltage applied to one of the switch circuits 102M is divided into a series number (=n) of the switch circuits 101N, and the divided voltages are applied to the switch circuits 101N, respectively. Thus, the voltage applied at the time of recovery of the parasitic diodes of the switching elements 1UN of the switch circuits 101N decreases, and the loss (recovery loss) occurring at the recovery time is decreased.

Note that in the present embodiment, although the operation of the upper arm (switch circuits 101N) of the power conversion apparatus was described, the same applies to the lower arm (switch circuits 101M). Specifically, when the lower arm is turned on, the switching element 1X of the inverter cell 100 is first turned on and then the switching elements 1XM are sequentially turned on at predetermined time intervals. When the lower arm is turned off, the switching elements 1XM are sequentially turned off and then the switching element 1X of the inverter cell 100 is turned off. Thereby, the switching loss and recovery loss of the switching elements 1X and 1XM can be reduced without performing high-speed switching.

As described above, according to the power conversion apparatus of the present embodiment, the suppression of a switching loss can be realized without performing high-speed switching. In addition, in the power conversion apparatus of the present embodiment, capacitors with small capacitances, which substantially correspond to snubber capacitors, are used, and capacitors with large capacitances do not need to be provided. It is thus possible to avoid an increase in size of the power conversion apparatus.

Specifically, according to the power conversion apparatus of the present embodiment, the energy loss can be held down, and an increase in size can be avoided.

Note that in the power conversion apparatus of the present embodiment, by simultaneously switching the switching elements 1UN of the upper arm and simultaneously switching the switching elements 1XM of the lower arm, it is also possible to realize a high breakdown voltage and high dv/dt, and to perform an operation of suppressing a surge voltage by high di/dt and parasitic inductance in the capacitors 3UN and capacitors 3XM.

In addition, in the power conversion apparatus of the present embodiment, by switching the high-breakdown-voltage switching elements 8pu, 8px, 8nu and 8nx of the high-breakdown-voltage inverter cells 106p and 106n, the output voltage of the power conversion apparatus can be switched in three levels, and the noise of the output power can further be reduced. In this case, the series number of the switch circuits 101N of the upper arm and the switch circuits 102M of the lower arm of the first circuit 300 can be halved, and the size of the power conversion apparatus can be reduced.

Next, a power conversion apparatus of a second embodiment will be described in detail with reference to the drawings.

FIG. 26 is a view schematically illustrating an example of the configuration of the power conversion apparatus of the embodiment.

In the description below, the same structural parts as in the above-described first embodiment of the (Group 2) are denoted by like reference signs, and a description thereof is omitted.

The power conversion apparatus of the present embodiment includes a third circuit 500, a fourth circuit 601 and a fifth circuit 602. The configurations of the third circuit 500, fourth circuit 601 and fifth circuit 602 are the same as the configuration of the first circuit 300 of the above-described first embodiment.

The positive-side terminal of the switch circuit 101n of the fourth circuit 601 is electrically connected to the positive-side. DC terminal 209. The cell AC terminal 202 of the inverter cell 100 of the fourth circuit 601 is electrically connected to the positive-side terminal of the switch circuit 101n of the third circuit 500.

The negative-side terminal of the switch circuit 102m of the fifth circuit 602 is electrically connected to the negative-side DC terminal 210. The cell AC terminal 202 of the inverter cell 100 of the fifth circuit 602 is electrically connected to the negative-side terminal of the switch circuit 102m of the third circuit 500.

The negative-side terminal of the switch circuit 102m of the fourth circuit 601 and the positive-side terminal of the switch circuit 101n of the fifth circuit 602 are electrically connected to the intermediate terminal 212.

Note that in the power conversion apparatus of the present embodiment, although the fourth circuit 601 and fifth circuit 602 have the same configuration as the third circuit 500, the embodiment is not limited to this. For example, the fourth circuit 601 and fifth circuit 602 may have the same configuration as the first circuit 300 of the power conversion apparatus of any one of third to ninth embodiments which will be described later, or the fourth circuit 601 and fifth circuit 602 may have different configurations.

Figure 27:
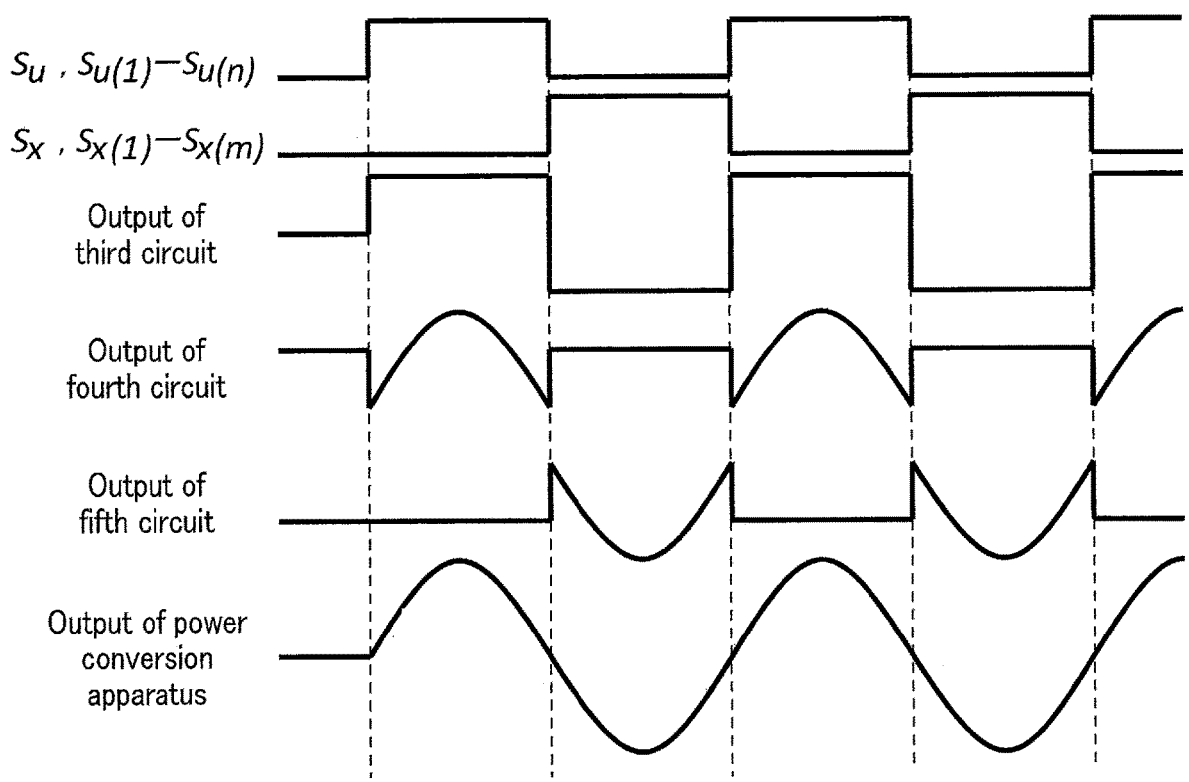
FIG. 27 is a view for describing an example of the operation of a power conversion apparatus of a second embodiment.

FIG. 27 is a view for describing an example of the operation of the power conversion apparatus of the second embodiment.

In the present embodiment, the third circuit 500 functions as a connection switching unit which switches the connection state between the output terminal of the fourth circuit 601 (the intermediate terminal of the inverter cell 100) and the AC terminal 211, and the connection state between the output terminal of the fifth circuit 602 (the intermediate terminal of the inverter cell 100) and the AC terminal 211.

FIG. 27 illustrates an example of gate signal waveforms Su, Su(1)-Su(n), and Sx, Sx(1)-Sx(m) of the switching elements of the third circuit 500, an output waveform of only the third circuit 500 which is compounded with the outputs of the fourth circuit 601 and fifth circuit 602, output waveforms of the fourth circuit 601 and fifth circuit 602, and an output waveform of the power conversion apparatus.

In the third circuit 500, the gate signal of the switching element 1U of the inverter cell 100 and the gate signals of the switching elements 1UN of the switch circuits 101N have the same waveform. During the period in which the switching element 1U of the third circuit 500 and the switching elements 1UN are rendered on, the output terminal of the fourth circuit 601 and the AC terminal 211 are electrically connected via the third circuit 500.

In the third circuit 500, the gate signal of the switching element 1X of the inverter cell 100 and the gate signals of the switching elements 1XM of the switch circuits 102M have the same waveform. During the period in which the switching element 1X of the third circuit 500 and the switching elements 1XM are rendered on, the output terminal of the fifth circuit 602 and the AC terminal 211 are electrically connected via the third circuit 500.

Each of the fourth circuit 601 and fifth circuit 602 can generate a freely selected output voltage waveform by performing PWM control. In the example illustrated in FIG. 27, the waveform of the output voltage of each of the fourth circuit 601 and fifth circuit 602 is a difference between a sine wave and an output voltage waveform of the third circuit 500. The fourth circuit 601 and fifth circuit 602 can generate a gate signal of the upper arm and a gate signal of the lower arm by comparing voltage instruction values, which correspond to output voltages thereof, and a triangular wave.

As described above, according to the power conversion apparatus of the present embodiment, a freely selected output voltage can be realized, and the same advantageous effects as in the above-described first embodiment of the (Group 2) can be obtained. Specifically, according to the power conversion apparatus of the present embodiment, the energy loss can be held down, and an increase in size can be avoided.

Next, a power conversion apparatus of a third embodiment will be described in detail with reference to the drawings.

Figure 28:
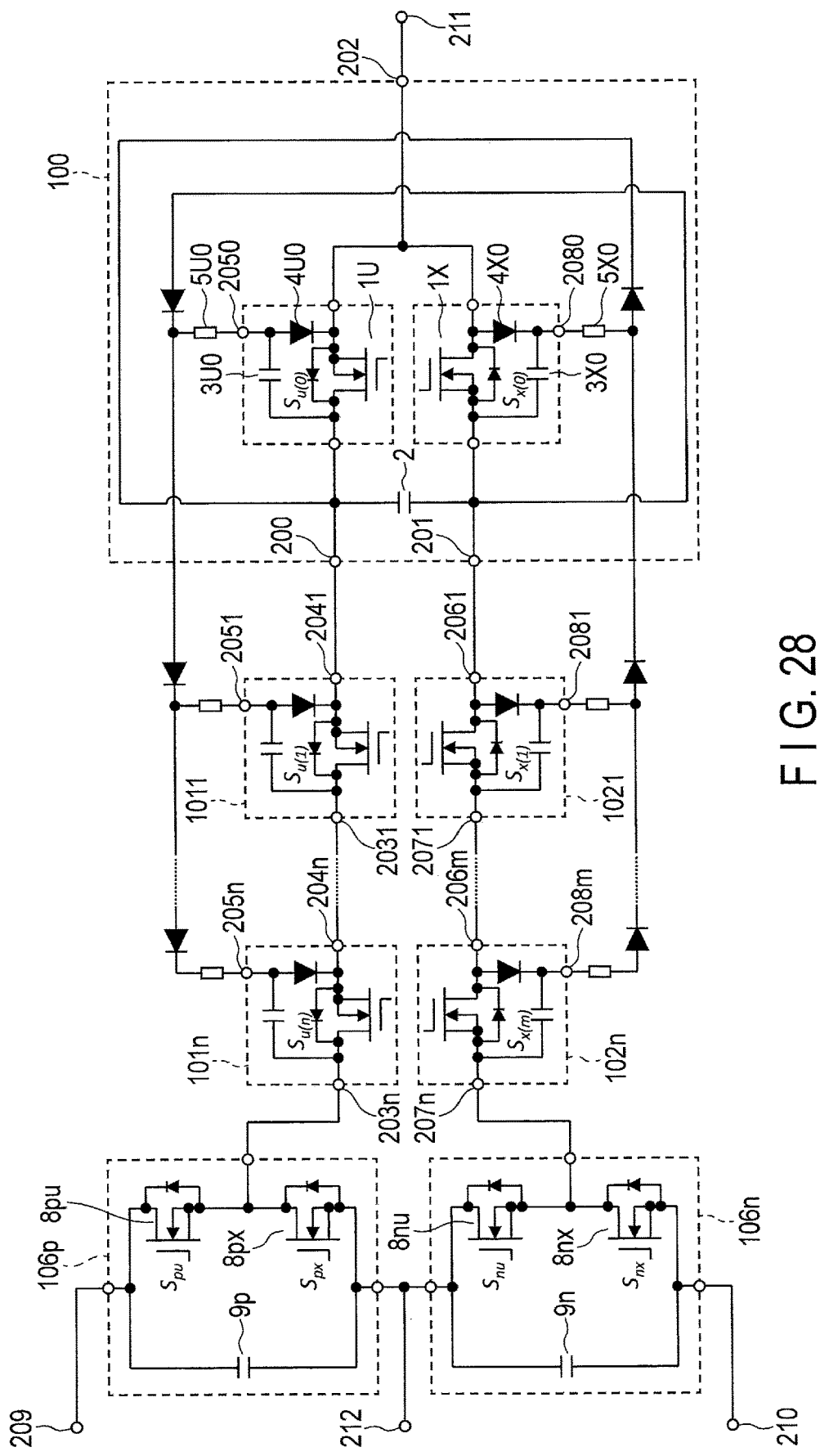
FIG. 28 is a view schematically illustrating an example of the configuration of a power conversion apparatus of an embodiment.

FIG. 28 is a view schematically illustrating an example of the configuration of the power conversion apparatus of the embodiment.

In the description below, the same structural parts as in the above-described first or second embodiment of the (Group 2) are denoted by like reference signs, and a description thereof is omitted.

The power conversion apparatus of the present embodiment is different from the above-described first embodiment with respect to the configuration of the inverter cell 100 of the first circuit 300. The power conversion apparatus of the present embodiment further includes capacitors 3U0 and 3X0, diodes 4U0 and 411X, resistors 5110 and 5X0, and regenerative rectification diodes 6U0 and 6X0.

The cathode of the diode (upper-side diode) 4U0 is electrically connected to the source of the switching element 1U and the AC terminal 211, and the anode thereof is electrically connected to the resistor 5U0. Note that it is preferable that the diode 4U0 has fast recovery characteristics with a low recovery loss, and it is preferable that, for example, a Schottky barrier diode (SBD) with good recovery characteristics or an element utilizing a wide bandgap semiconductor (e.g. SiC, GaN) is used as the diode 4U0.

One end of the capacitor (upper-side capacitor) 3U0 is electrically connected to the drain of the switching element 1U, and the other end thereof is electrically connected to the anode of the diode 4U0 and the resistor 5U0.

One end of the resistor (upper-side resistor) 5U0 is electrically connected to the anode of the diode 4U0 and the other end of the capacitor 3U0. The other end of the resistor 5U0 is electrically connected to the anode of the regenerative rectification diode 6U1 and the cathode of the regenerative rectification diode 6U0.

The anode of the diode (lower-side diode) 4X0 is electrically connected to the drain of the switching element 1X and the AC terminal 211, and the cathode thereof is electrically connected to the resistor 5X0. Note that it is preferable that the diode 4X0 has fast recovery characteristics with a low recovery loss, and it is preferable that, for example, a Schottky barrier diode (SBD) with good recovery characteristics or an element utilizing a wide bandgap semiconductor (e.g. SiC, GaN) is used as the diode 4X0.

One end of the capacitor (lower-side capacitor) 3X0 is electrically connected to the source of the switching element 1X, and the other end thereof is electrically connected to the cathode of the diode 4X0 and the resistor 5XM.

One end of the resistor (lower-side resistor) 5X0 is electrically connected to the cathode of the diode 4X0 and the other end of the capacitor 3X0. The other end of the resistor 5X0 is electrically connected to the anode of the regenerative rectification diode 6X0 and the cathode of the regenerative rectification diode 6X1.

As described above, in the power conversion apparatus of the present embodiment, the upper-side arm of the inverter cell 100 is a voltage-clamp-type switch circuit having the same configuration as the switch circuit 101N, and the lower-side arm of the inverter cell 100 is a voltage-clamp-type switch circuit having the same configuration as the switch circuit 102M. Accordingly, in the present embodiment, the upper-side arm and lower-side arm of the inverter cell 100 can use common circuits as switch circuits similar to the switch circuits 101N and 102M.

In the present embodiment, a plurality of first regenerative rectification circuits are further connected between the first capacitor of the first switch circuit, which is located on the most low-potential side, and the upper-side capacitor, and between the upper-side capacitor and the low-potential-side terminal of the lower-side switching element.

In addition, in the present embodiment, a plurality of second regenerative rectification circuits are further connected between the second capacitor of the second switch circuit, which is located on the most high-potential side, and the lower-side capacitor, and between the lower-side capacitor and the high-potential-side terminal of the upper-side switching element.

The operation of the power conversion apparatus of the present embodiment is the same as in the above-described first embodiment of the (Group 2). Specifically, in the first circuit 300, the switching elements 1UN of the upper arm and the switching elements 1XM of the lower arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment of the (Group 2) can be obtained. Specifically, according to the power conversion apparatus of the present embodiment, the energy loss can be held down, and an increase in size can be avoided.

Next, a power conversion apparatus of a fourth embodiment will be described in detail with reference to the drawings.

FIG. 29 is a view schematically illustrating an example of the configuration of the power conversion apparatus of the embodiment.

In the power conversion apparatus of the present embodiment, the regenerative rectification diodes 6U1 and 6X1 of the first circuit 300 are omitted. In addition, the anode of the regenerative rectification diode 6U2 is not electrically connected to the source of the switching element 1X, but is electrically connected to the cathode of the regenerative rectification diodes 6X2. The cathode of the regenerative rectification diode 6X2 is not connected to the drain of the switching element 1U, but is electrically connected to the anode of the regenerative rectification diodes 6U2.

Specifically, the power conversion apparatus of the present embodiment includes a plurality of regenerative rectification diodes 6UN and 6XM (N=2~n, M=2~m) which are connected between neighboring switch circuits 101N and between neighboring switch circuits 102M and are connected in series to each other, with a direction from the low-potential side toward the high-potential side being set as a forward direction.

In the present embodiment, with a direction from the low-potential side toward the high-potential side being set as a forward direction, regenerative rectification circuits are connected between the first capacitors of neighboring first switch circuits and between the second capacitors of neighboring second switch circuits, and the regenerative rectification circuits are connected in series to each other.

Specifically, the power conversion apparatus of the present embodiment includes, when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element 1UN, the regenerative rectification circuit which connects the low-potential-side terminal of the inverter cell 100 and the low-potential-side terminal of the first capacitor 3UN of the upper arm, with a direction from the low-potential side toward the high-potential side being set as a forward direction.

In addition, the power conversion apparatus of the present embodiment includes, when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects the high-potential-side terminal of the inverter cell 100 and the high-potential-side terminal of the second capacitor 3XM of the lower arm, with a direction from the low-potential side toward the high-potential side being set as a forward direction.

Note that in the present embodiment, the configuration of the inverter cell 100 may be the same as in the first embodiment of the (Group 2), or may be the same as in the third embodiment of the (Group 2). When the inverter cell 100 has the same configuration as in the third embodiment of the (Group 2), the regenerative rectification circuit includes a circuit which connects the low-potential-side terminal of the inverter cell 100, the low-potential-side terminal of the upper-side capacitor 3U0 and the low-potential-side terminal of the first capacitor 3UN of the upper arm, and connects the high-potential-side terminal of the inverter cell 100, the high-potential-side terminal of the lower-side capacitor 3X0 and the high-potential-side terminal of the second capacitor 3XM of the lower arm, with a direction from the low-potential side toward the high-potential side being set as a forward direction.

The operation of the power conversion apparatus of the present embodiment is the same as in the above-described first embodiment of the (Group 2). Specifically, in the first circuit 300, the switching elements 1UN of the upper arm and the switching elements 1XM of the lower arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment can be obtained. Specifically, according to the power conversion apparatus of the present embodiment, the energy loss can be held down, and an increase in size can be avoided.

Next, a power conversion apparatus of a fifth embodiment will be described in detail with reference to the drawings.

Figure 30:
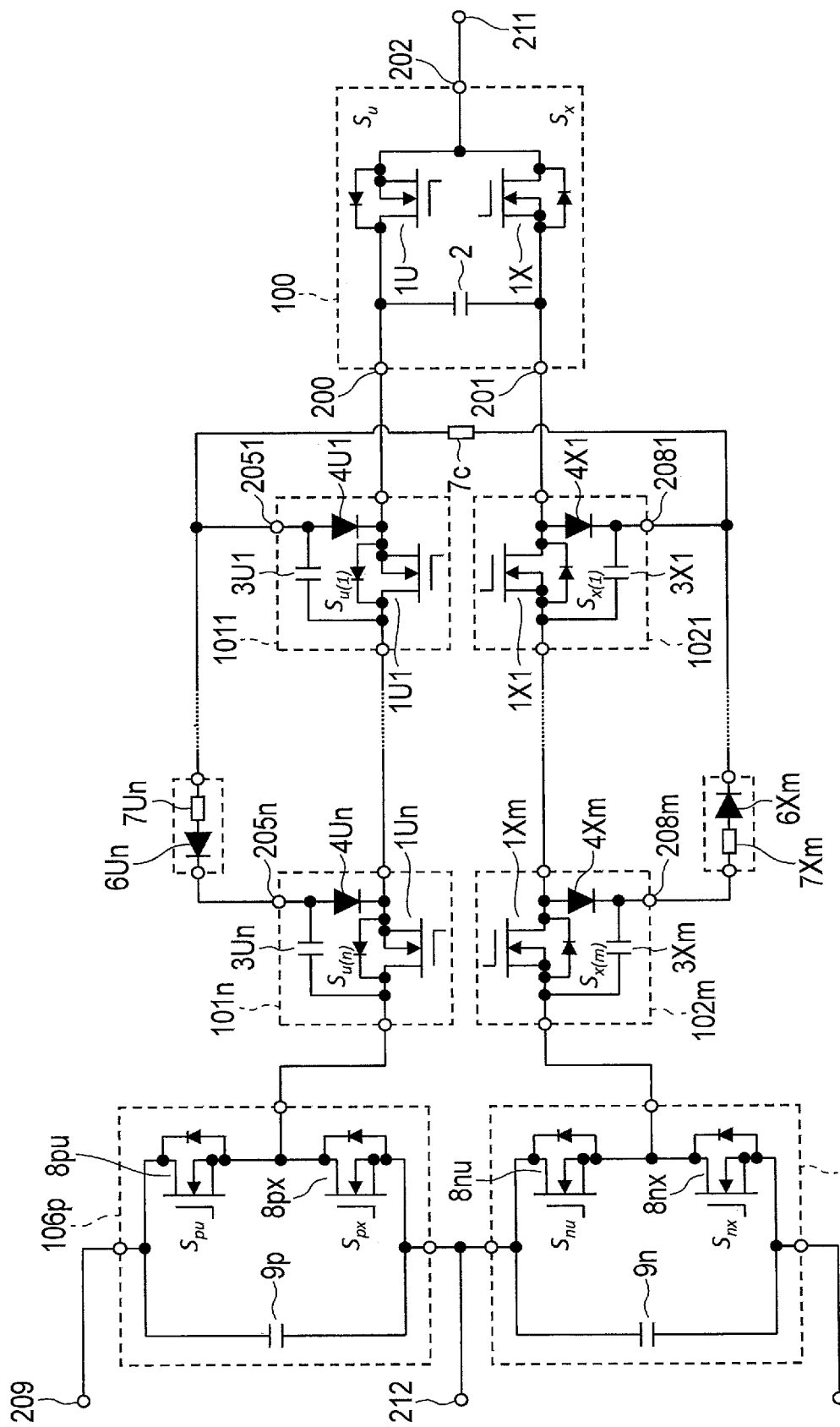
FIG. 30 is a view schematically illustrating an example of the configuration of a power conversion apparatus of an embodiment.

FIG. 30 is a view schematically illustrating an example of the configuration of the power conversion apparatus of the embodiment.

In the description below, the same structural parts as in any one of the above-described first to fourth embodiments of the (Group 2) are denoted by like reference signs, and a description thereof is omitted.

The power conversion apparatus of the present embodiment is different from the power conversion apparatus of the above-described fourth embodiment of the (Group 2) in that the regenerative rectification circuit of the first circuit 300 further includes resistors 7C, 7UN (N=2~n) and 7XM (M=2~m).

The resistor 7UN (N=2~n) is connected in series to the regenerative rectification diode 6UN in a path which electrically connects the snubber terminal 205(N−1) of the switch circuit 101(N−1) and the regenerative rectification diode 6UN.

The resistor 7XM (M=2~m) is connected in series to the regenerative rectification diode 6XM in a path which electrically connects the snubber terminal 208M of the switch circuit 102M and the regenerative rectification diode 6XM.

The resistor 7C is connected in series to the snubber terminal 2051 and snubber terminal 2081 in a path which electrically connects the snubber terminal 2051 of the switch circuit 1011 and the snubber terminal 2081 of the switch circuit 1021.

As described above, the power conversion apparatus of the present embodiment is configured to include the resistors 7C, 7UN (N=2~n) and 7XM (M=2~m) which are connected in series to the regenerative rectification diodes 6UN and 6XM, and the number of resistors, which are present on the path that electrically connects the capacitors 3UN and 3XM of the switch circuits 101N and 102M via the snubber terminals 205N and 208M, can be reduced. For example, in the configuration illustrated in FIG. 19, the resistor 5Un and resistor 5U(n−1) are present on the path in which the capacitor 3Un and capacitor 3U(n−1) are electrically connected via the snubber terminals 205n and 205(n−1). By contrast, in the configuration illustrated in FIG. 29, the resistor 7Un is present on the path in which the capacitor 3Un and capacitor 3U(n−1) are electrically connected via the snubber terminals 205n and 205(n−1). Thereby, the energy charged via the path, which electrically connects the switch circuits 101N and switch circuits 102M, can more efficiently be regenerated.

Note that in the present embodiment, the configuration of the inverter cell 100 may be the same as in the first embodiment of the (Group 2), or may be the same as in the third embodiment of the (Group 2). When the inverter cell 100 has the same configuration as in the fifth embodiment, the regenerative rectification circuit includes a circuit which connects the low-potential-side terminal of the inverter cell 100, the low-potential-side terminal of the upper-side capacitor 3U0 and the low-potential-side terminal of the first capacitor 3UN of the upper arm, and connects the high-potential-side terminal of the inverter cell 100, the high-potential-side terminal of the lower-side capacitor 3X0 and the high-potential-side terminal of the second capacitor 3XM of the lower arm, with a direction from the low-potential side toward the high-potential side being set as a forward direction.

The operation of the power conversion apparatus of the present embodiment is the same as in the above-described first embodiment of the (Group 2). Specifically, in the first circuit 300, the switching elements 1UN of the upper arm and the switching elements 1XM of the lower arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment of the (Group 2) can be obtained. Specifically, according to the power conversion apparatus of the present embodiment, the energy loss can be held down, and an increase in size can be avoided.

Next, a power conversion apparatus of a sixth embodiment will be described in detail with reference to the drawings.

Figure 31:
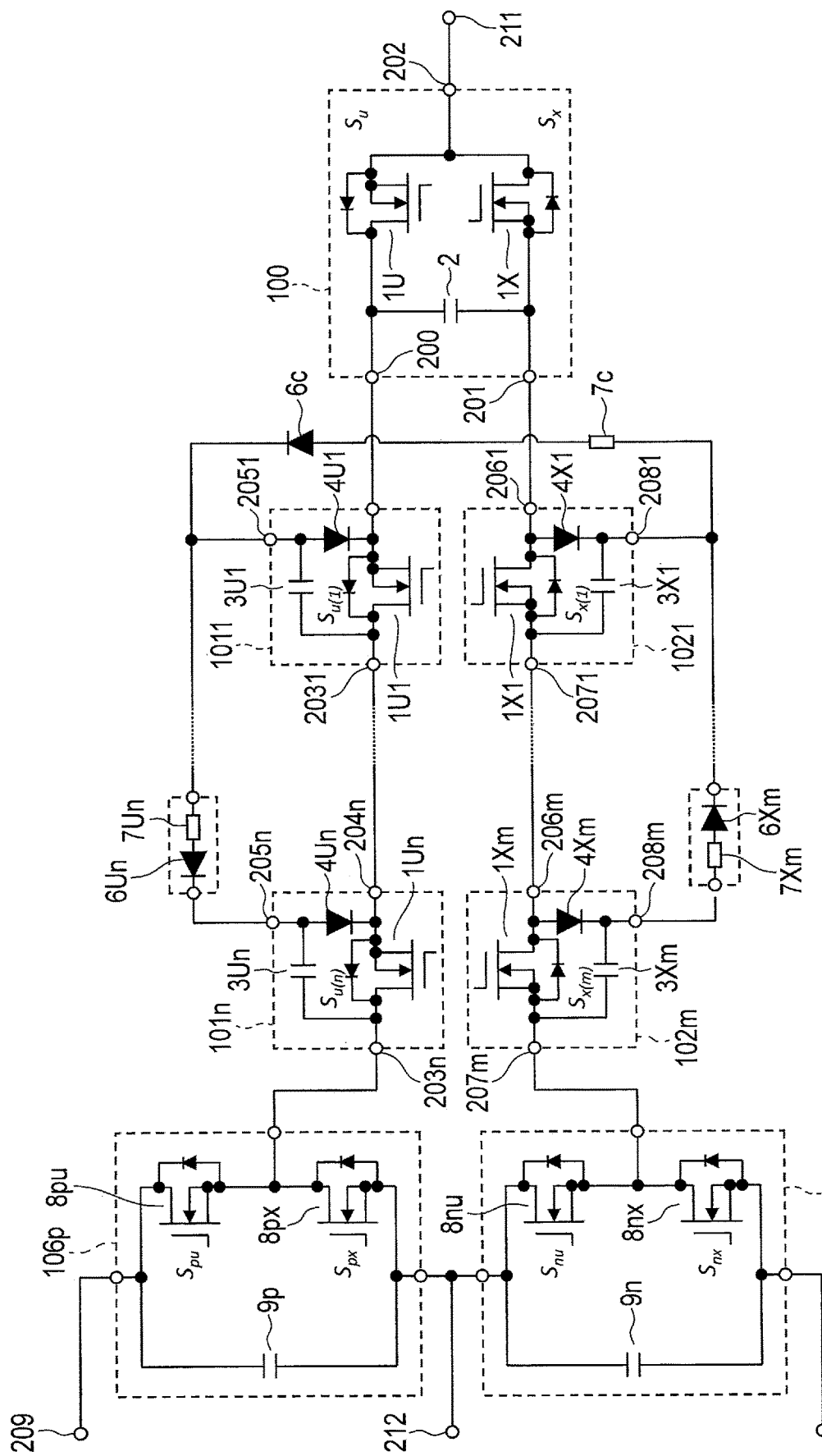
FIG. 31 is a view schematically illustrating an example of the configuration of a power conversion apparatus of an embodiment.

FIG. 31 is a view schematically illustrating an example of the configuration of the power conversion apparatus of the embodiment.

In the description below, the same structural parts as in any one of the above-described first to fourth embodiments of the (Group 2) are denoted by like reference signs, and a description thereof is omitted.

The power conversion apparatus of the present embodiment is configured such that the first circuit 300 further includes a regenerative rectification diode 6C in the power conversion apparatus of the above-described fourth embodiment of the (Group 2).

The regenerative rectification diode 6C is connected in series to the resistor 7C in the path which electrically connects the snubber terminal 205I of the switch circuit 101I and the resistor 7C.

In addition, in the power conversion apparatus of the present embodiment, the resistor 7XM is connected in series to the regenerative rectification diode 6XM between the regenerative rectification diode 6XM and the snubber terminal 208(M−1) of the switch circuit 102(M−1).

Except for the above-described configuration, the configuration of the power conversion apparatus of the present embodiment is the same as that of the power conversion apparatus of the fifth embodiment.

In the present embodiment, like the above-described fifth embodiment of the (Group 2), the number of resistors, which are present on the path that electrically connects the capacitors 3UN and 3XM of the switch circuits 101N and 102M via the snubber terminals 205N and 208M, can be reduced. Thereby, the energy charged via the path, which electrically connects the switch circuits 101N and switch circuits 102M, can more efficiently be regenerated.

Note that in the present embodiment, the configuration of the inverter cell 100 may be the same as in the first embodiment of the (Group 2), or may be the same as in the third embodiment of the (Group 2). When the inverter cell 100 has the same configuration as in the third embodiment of the (Group 2), the regenerative rectification circuit includes a circuit which connects the low-potential-side terminal of the inverter cell 100, the low-potential-side terminal of the upper-side capacitor 3U0 and the low-potential-side terminal of the first capacitor 3UN of the upper arm, and connects the high-potential-side terminal of the inverter cell 100, the high-potential-side terminal of the lower-side capacitor 3X0 and the high-potential-side terminal of the second capacitor 3XM of the lower arm, with a direction from the low-potential side toward the high-potential side being set as a forward direction.

The operation of the power conversion apparatus of the present embodiment is the same as in the above-described first embodiment. Specifically, in the first circuit 300, the switching elements 1UN of the upper arm and the switching elements 1XM of the lower arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment of the (Group 2) can be obtained. Specifically, according to the power conversion apparatus of the present embodiment, the energy loss can be held down, and an increase in size can be avoided.

Next, a power conversion apparatus of a seventh embodiment will be described in detail with reference to the drawings.

FIG. 32 is a view schematically illustrating an example of the configuration of the power conversion apparatus of the embodiment.

In the description below, the same structural parts as in any one of the above-described first to sixth embodiments of the (Group 2) are denoted by like reference signs, and a description thereof is omitted.

The power conversion apparatus of the present embodiment is different from the above-described first embodiment of the (Group 2) with respect to the configuration of the lower arm of the first circuit 300.

In the power conversion apparatus of the present embodiment, a switching element 1XH is connected to a path between the negative-side terminal of the first circuit 300 (the negative-side terminal 207m of the switch circuit 102m) and the inverter cell 100. Note that it is preferable to use an element with a higher breakdown voltage than the switching element 1UN of the switch circuit 101N as the switching element 1XH. In addition, in FIG. 32, in the power conversion apparatus, although one switching element 1XH is provided in the lower arm, a plurality of switching elements 1XH may be connected in series in the lower arm. Although the power conversion direction becomes a one-way direction, a high-breakdown-voltage diode (passive semiconductor element) may be substituted for the switching element 1XH in the lower arm.

As described above, the power conversion apparatus of the present embodiment is different from the above-described first embodiment of the (Group 2) with respect to the configuration of the lower arm, and the power conversion apparatus of the present embodiment includes, at least either when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element 1UN, or when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects at least either the low-potential-side terminal of the inverter cell 100 and the low-potential-side terminal of the first capacitor 3UN of the upper arm, or the high-potential-side terminal of the inverter cell 100 and the high-potential-side terminal of the second capacitor 3XM of the lower arm, with a direction from the low-potential side toward the high-potential side being set as a forward direction.

Note that in the present embodiment, the configuration of the inverter cell 100 may be the same as in the first embodiment of the (Group 2), or may be the same as in the third embodiment of the (Group 2). When the inverter cell 100 has the same configuration as in the third embodiment of the (Group 2), the regenerative rectification circuit includes a circuit which connects the low-potential-side terminal of the inverter cell 100, the low-potential-side terminal of the upper-side capacitor 3U0 and the low-potential-side terminal of the first capacitor 3UN of the upper arm, and connects the high-potential-side terminal of the inverter cell 100 and the high-potential-side terminal of the lower-side capacitor 3X0, with a direction from the low-potential side toward the high-potential side being set as a forward direction.

In the power conversion apparatus of the present embodiment, the operation of the upper arm is the same as in the above-described first embodiment of the (Group 2), and the lower arm can be operated similarly as in the conventional 2-level inverter by simultaneously switching the switching element 1X and the switching element 1XH. Accordingly, in the power conversion apparatus of the present embodiment, the switching elements 1UN of the upper arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment of the (Group 2) can be obtained. Specifically, according to the power conversion apparatus of the present embodiment, the energy loss can be held down, and an increase in size can be avoided.

Next, a power conversion apparatus of an eighth embodiment will be described in detail with reference to the drawings.

Figure 33:
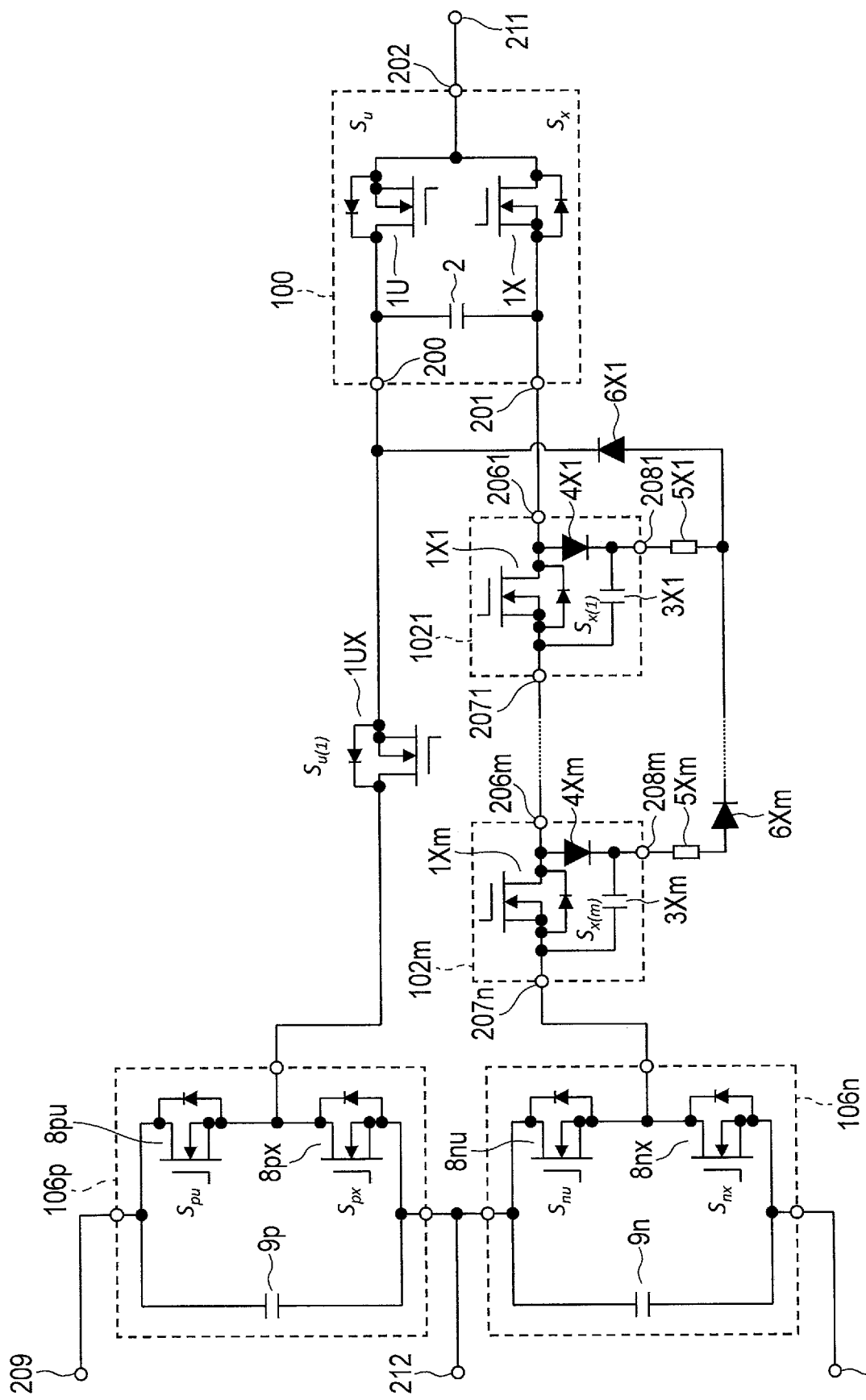
FIG. 33 is a view schematically illustrating an example of the configuration of a power conversion apparatus of an embodiment.

FIG. 33 is a view schematically illustrating an example of the configuration of the power conversion apparatus of the embodiment.

In the description below, the same structural parts as in any of the above-described first to seventh embodiments of the (Group 2) are denoted by like reference signs, and a description thereof is omitted.

The power conversion apparatus of the present embodiment is different from the above-described first embodiment of the (Group 2) with respect to the configuration of the upper arm.

In the power conversion apparatus of the present embodiment, a switching element 1UH is connected to a path between the positive-side terminal of the first circuit 300 (the positive-side terminal 203n of the switch circuit 101n) and the inverter cell 100. Note that it is preferable to use an element with a higher breakdown voltage than the switching element 1XM of the switch circuit 102M as the switching element 1UH. In addition, in FIG. 33, in the power conversion apparatus, although one switching element 1UH is provided in the upper arm, a plurality of switching elements 1UH may be connected in series in the upper arm. Although the power conversion direction becomes a one-way direction, a high-breakdown-voltage diode (passive semiconductor element) may be substituted for the switching element 1UH in the upper arm.

As described above, the power conversion apparatus of the present embodiment is different from the above-described first embodiment of the (Group 2) with respect to the configuration of the upper arm, and the power conversion apparatus of the present embodiment includes, at least either when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element 1UN, or when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects at least either the low-potential-side terminal of the inverter cell 100 and the low-potential-side terminal of the first capacitor 3UN of the upper arm, or the high-potential-side terminal of the inverter cell 100 and the high-potential-side terminal of the second capacitor 3XM of the lower arm, with a direction from the low-potential side toward the high-potential side being set as a forward direction.

Note that in the present embodiment, the configuration of the inverter cell 100 may be the same as in the first embodiment of the (Group 2), or may be the same as in the third embodiment of the (Group 2). When the inverter cell 100 has the same configuration as in the third embodiment of the (Group 2), the regenerative rectification circuit includes a circuit which connects the low-potential-side terminal of the inverter cell 100 and the low-potential-side terminal of the upper-side capacitor 3U0, and connects the high-potential-side terminal of the inverter cell 100, the high-potential-side terminal of the lower-side capacitor 3X0 and the high-potential-side terminal of the second capacitor 3XM of the lower arm, with a direction from the low-potential side toward the high-potential side being set as a forward direction.

In the power conversion apparatus of the present embodiment, the operation of the lower arm is the same as in the above-described first embodiment of the (Group 2), and the upper arm can be operated similarly as in the conventional 2-level inverter by simultaneously switching the switching element 1U and the switching element 1UH. Accordingly, in the power conversion apparatus of the present embodiment, the switching elements 1XM of the lower arm are sequentially switched at predetermined time intervals, and thereby losses, such as a turn-on loss, a turn-off loss and a recovery loss, can be reduced.

As described above, according to the power conversion apparatus of the present embodiment, the same advantageous effects as in the above-described first embodiment of the (Group 2) can be obtained. Specifically, according to the power conversion apparatus of the present embodiment, the energy loss can be held down, and an increase in size can be avoided.

Next, a power conversion apparatus of a ninth embodiment will be described in detail with reference to the drawings.

FIG. 34 is a view schematically illustrating an example of the configuration of the power conversion apparatus of the embodiment.

In the description below, the same structural parts as in the above-described first to eighth embodiments of the (Group 2) are denoted by like reference signs, and a description thereof is omitted.

The power conversion apparatus of the present embodiment is different from the above-described first embodiment of the (Group 2) with respect to the configuration of the regenerative rectification circuit of the first circuit 300.

Each of first regenerative rectification circuits includes a regenerative rectification diode 6UN and a resistor 5UN. The regenerative rectification diode 6UN is connected between the negative-side cell terminal 201 and the snubber terminal 205N, with a direction from the negative-side cell terminal 201 of the inverter cell 100 toward the snubber terminal 205N of the switch circuit 101N being set as a forward direction. The resistor 5UN is connected in series to the regenerative rectification diode 6UN in the path which electrically connects the cathode of the regenerative rectification diode 6UN and the snubber terminal 205N. Specifically, the anodes of a plurality of regenerative rectification diodes 6UN are electrically connected to the negative-side cell terminal 201 of the inverter cell 100 without intervention of other regenerative rectification diodes 6UN.

Specifically, in the present embodiment, the first regenerative rectification circuits are connected between the low-potential-side terminal of the lower-side switching element (the low-potential-side terminal of the inverter cell 100) and the low-potential-side terminals of the first capacitors of the first switch circuits, with a direction from the low-potential side toward the high-potential side being set as a forward direction.

As described above, the power conversion apparatus of the present embodiment includes, at least either when at least one of the first switch circuits 101N includes the first diode 4UN with the cathode connected to the low-potential-side terminal of the first switching element 1UN and includes the first capacitor 3UN connected between the anode of the first diode 4UN and the high-potential-side terminal of the first switching element 1UN, or when at least one of the second switch circuits 102X includes the second diode 4XM with the anode connected to the high-potential-side terminal of the second switching element 1XM and includes the second capacitor 3XM connected between the cathode of the second diode 4XM and the low-potential-side terminal of the second switching element 1XM, the regenerative rectification circuit which connects at least either the low-potential-side terminal of the inverter cell 100 and the low-potential-side terminal of the first capacitor 3UN of the upper arm, or the high-potential-side terminal of the inverter cell 100 and the high-potential-side terminal of the second capacitor 3XM of the lower arm, with a direction from the low-potential side toward the high-potential side being set as a forward direction.

Each of second regenerative rectification circuits includes a regenerative rectification diode 6XM and a resistor 5XM. The regenerative rectification diode 6XM is connected between the snubber terminal 208M and the positive-side cell terminal 200, with a direction from the snubber terminal 208M of the switch circuit 102M toward the positive-side cell terminal 200 of the inverter cell 100 being set as a forward direction. The resistor 5XM is connected in series to the regenerative rectification diode 6XM in the path which electrically connects the anode of the regenerative rectification diode 6XM and the snubber terminal 208M. Specifically, the cathodes of a plurality of regenerative rectification diodes 6XM are electrically connected to the positive-side cell terminal 200 of the inverter cell 100 without intervention of other regenerative rectification diodes 6XM.

Specifically, in the present embodiment, the second regenerative rectification circuits are connected between the high-potential-side terminal of the upper-side switching element (the high-potential-side terminal of the inverter cell 100) and the high-potential-side terminals of the second capacitors of the second switch circuits.

Note that in the present embodiment, the configuration of the inverter cell 100 may be the same as in the first embodiment of the (Group 2), or may be the same as in the third embodiment of the (Group 2). When the inverter cell 100 has the same configuration as in the third embodiment of the (Group 2), the regenerative rectification circuit includes a circuit which is connected between the low-potential-side terminal of the inverter cell 100 and the low-potential-side terminal of the upper-side capacitor 3U0, and a circuit which is connected between the high-potential-side terminal of the inverter cell 100 and the high-potential-side terminal of the lower-side capacitor 3X0, with a direction from the low-potential side toward the high-potential side being set as a forward direction.

In the power conversion apparatus of the present embodiment, the switching operations of the switching elements 1U and 1X, the switching elements 1UN and the switching elements 1XM are the same as in the above-described first embodiment. Specifically, the switching elements 1UN of the upper arm and the switching elements 1XM of the lower arm are sequentially switched at predetermined time intervals.

In the present embodiment, by the above-described switching operation and the configuration of the regenerative rectification diodes 6UN and 6XM, the energy stored in the capacitors 3UN and 3XM of the switch circuits 101N and 102M is charged in the floating capacitor 2 without intervention of the regenerative rectification diodes 6UN and 6XM.

Thus, accordingly to the power conversion apparatus of the present embodiment, losses, such as a turn-on loss, a turn-off loss and a recovery loss, can be reduced, the loss of energy decreases in the path which discharges energy from the capacitors 3UN and 3XM to the floating capacitor 2, and energy can be regenerated more efficiently.

Note that in the power conversion apparatus of the present embodiment, since the voltage applied to the regenerative rectification diodes 6UN and 6XM is higher than in the circuit configuration of the power conversion apparatus of the above-described first embodiment of the (Group 2), it is preferable that elements with higher breakdown voltages than in the first embodiment are used as the regenerative rectification diodes 6UN and 6XM.

As described above, according to the power conversion apparatus of the present embodiment, the same advantageous effects as in the above-described first embodiment of the (Group 2) can be obtained. Specifically, according to the power conversion apparatus of the present embodiment, the energy loss can be held down, and an increase in size can be avoided.

Note that the power conversion apparatuses relating to the (Group 2) can be configured, for example, as described below.

(1) A power conversion apparatus including:

an upper-side high-breakdown-voltage inverter cell with a high-potential-side terminal electrically connected to a positive-side DC terminal, and with a low-potential-side terminal electrically connected to an intermediate terminal;

a lower-side high-breakdown-voltage inverter cell with a high-potential-side terminal electrically connected to the intermediate terminal, and with a low-potential-side terminal electrically connected to a negative-side DC terminal;

an inverter cell including an upper-side switching element connected between an AC terminal and a high-potential-side terminal, a lower-side switching element connected between the AC terminal and a low-potential-side terminal, and a floating capacitor connected in parallel to the upper-side switching element and the lower-side switching element between the high-potential-side terminal and the low-potential-side terminal;

an upper arm connected between the high-potential-side terminal of the inverter cell and an output terminal of the upper-side high-breakdown-voltage inverter cell, and configured such that one or a plurality of first switch circuits each including a first switching element are connected in series; and a lower arm connected between the low-potential-side terminal of the inverter cell and an output terminal of the lower-side high-breakdown-voltage inverter cell, and configured such that one or a plurality of second switch circuits each including a second switching element are connected in series, wherein each of the upper-side high-breakdown-voltage inverter cell and the lower-side high-breakdown-voltage inverter cell includes an upper-side high-breakdown-voltage switching element connected between the high-potential-side terminal and the output terminal, a lower-side high-breakdown-voltage switching element connected between the low-potential-side terminal and the output terminal, and a DC capacitor connected between the high-potential-side terminal and the low-potential-side terminal, when at least one of the first switch circuits includes a first diode with a cathode connected to a low-potential-side terminal of the first switching element and includes a first capacitor connected between an anode of the first diode and a high-potential-side terminal of the first switching element, the power conversion apparatus includes a first rectification circuit which connects the low-potential-side terminal of the inverter cell and a low-potential-side terminal of the first capacitor, and when at least one of the second switch circuits includes a second diode with an anode connected to a high-potential-side terminal of the second switching element and includes a second capacitor connected between a cathode of the second diode and a low-potential-side terminal of the second switching element, the power conversion apparatus includes a second rectification circuit which connects the high-potential-side terminal of the inverter cell and a high-potential-side terminal of the second capacitor.

(2) A power conversion apparatus including:

a third circuit, a fourth circuit and a fifth circuit which include an inverter cell including an upper-side switching element connected between an AC terminal and a high-potential-side terminal, a lower-side switching element connected between the AC terminal and a low-potential-side terminal, and a floating capacitor connected in parallel to the upper-side switching element and the lower-side switching element between the high-potential-side terminal and the low-potential-side terminal; an upper arm connected to the high-potential-side terminal of the inverter cell and configured such that one or a plurality of first switch circuits each including a first switching element are connected in series; and a lower arm connected to the low-potential-side terminal of the inverter cell and configured such that one or a plurality of second switch circuits each including a second switching element are connected in series, wherein when at least one of the first switch circuits includes a first diode with a cathode connected to a low-potential-side terminal of the first switching element and includes a first capacitor connected between an anode of the first diode and a high-potential-side terminal of the first switching element, each of the third circuit, the fourth circuit and the fifth circuit includes a first rectification circuit which connects the low-potential-side terminal of the inverter cell and a low-potential-side terminal of the first capacitor, when at least one of the second switch circuits includes a second diode with an anode connected to a high-potential-side terminal of the second switching element and includes a second capacitor connected between a cathode of the second diode and a low-potential-side terminal of the second switching element, each of the third circuit, the fourth circuit and the fifth circuit includes a second rectification circuit which connects the high-potential-side terminal of the inverter cell and a high-potential-side terminal of the second capacitor, the fourth circuit is electrically connected to a positive-side DC terminal at a high-potential-side terminal, electrically connected to an intermediate terminal at a low-potential-side terminal, and electrically connected to a high-potential-side terminal of the third circuit at an AC terminal, and the fifth circuit is electrically connected to the intermediate terminal at a high-potential-side terminal, electrically connected to a negative-side DC terminal at a low-potential-side terminal, and electrically connected to a low-potential-side terminal of the third circuit at an AC terminal.

(3) The power conversion apparatus of the above (1) or (2), wherein the first rectification circuit includes one or a plurality of first regenerative rectification diodes which are connected in series, and a first resistor connected between a cathode of the one first regenerative rectification diode and the low-potential-side terminal of the first capacitor or a plurality of first resistors connected between cathodes of the plurality of first regenerative rectification diodes and the low-potential-side terminals of the corresponding first capacitors, and the second rectification circuit includes one or a plurality of second regenerative rectification diodes which are connected in series, and a second resistor connected between an anode of the one second regenerative rectification diode and the high-potential-side terminal of the second capacitor or a plurality of second resistors connected between anodes of the plurality of second regenerative rectification diodes and the high-potential-side terminals of the corresponding second capacitors.

(4) The power conversion apparatus of the above (1) or (2), wherein the second switching element of one or a plurality of the second switch circuits which are connected in series has a higher breakdown voltage than the first switching element, or the first switching element of one or a plurality of the first switch circuits which are connected in series has a higher breakdown voltage than the second switching element.

(5) The power conversion apparatus of the above (3), wherein the power conversion apparatus includes a first inductance element in place of the first resistor, and includes a second inductance element in place of the second resistor.

(6) The power conversion apparatus of any one of the above (1) to (5), wherein
the inverter cell includes an upper-side diode with a cathode connected to a low-potential-side terminal of the upper-side switching element, an upper-side capacitor connected between an anode of the upper-side diode and a high-potential-side terminal of the upper-side switching element, a lower-side diode with an anode connected to a high-potential-side terminal of the lower-side switching element, and a lower-side capacitor connected between a cathode of the lower-side diode and a low-potential-side terminal of the lower-side switching element,
the first rectification circuit further connects a low-potential-side terminal of the upper-side capacitor and
the low-potential-side terminal of the inverter cell, and the second rectification circuit further connects a high-potential-side terminal of the lower-side capacitor and the high-potential-side terminal of the inverter cell.

(7) The power conversion apparatus of any one of the above (1) to (6), wherein each of the first switching element, the second switching element, the upper-side switching element and the lower-side switching element includes a plurality of switching elements which are connected in series.

(8) The power conversion apparatus of the above (1) or (2), wherein
the first switching elements and the second switching elements are sequentially switched at predetermined time intervals,
in the upper arm, electrostatic capacitances of the first capacitors are set such that the electrostatic capacitance of the first capacitor connected to the first switching element with a longer time period from turn-on to turn-off is less than the electrostatic capacitance of the first capacitor connected to the first switching element with a shorter time period from turn-on to turn-off, and
in the lower arm, electrostatic capacitances of the second capacitors are set such that the electrostatic capacitance of the second capacitor connected to the second switching element with a longer time period from turn-on to turn-off is less than the electrostatic capacitance of the second capacitor connected to the second switching element with a shorter time period from turn-on to turn-off.

(9) A power conversion apparatus including:
an inverter cell including an upper-side switching element connected between an AC terminal and a high-potential-side terminal, a lower-side switching element connected between the AC terminal and a low-potential-side terminal, and a floating capacitor connected in parallel to the upper-side switching element and the lower-side switching element between the high-potential-side terminal and the low-potential-side terminal;
an upper arm connected to the high-potential-side terminal of the inverter cell and configured such that one or a plurality of first switch circuits each including a first switching element are connected in series; and
a lower arm connected to the low-potential-side terminal of the inverter cell and configured such that one or a plurality of second switch circuits each including a second switching element are connected in series, wherein
at least one of the first switch circuits includes a first diode with a cathode connected to a low-potential-side terminal of the first switching element and includes a first capacitor connected between an anode of the first diode and a high-potential-side terminal of the first switching element,
at least one of the second switch circuits includes a second diode with an anode connected to a high-potential-side terminal of the second switching element and includes a second capacitor connected between a cathode of the second diode and a low-potential-side terminal of the second switching element,
the power conversion apparatus includes a first regenerative rectification circuit which includes one or a plurality of first regenerative rectification diodes which are connected in series and connect the low-potential-side terminal of the inverter cell and a low-potential-side terminal of the first capacitor, and a first resistor connected between a cathode of the one first regenerative rectification diode and the low-potential-side terminal of the first capacitor or a plurality of first resistors connected between cathodes of the plurality of first regenerative rectification diodes and the low-potential-side terminals of the corresponding first capacitors, and a second regenerative rectification circuit which includes one or a plurality of second regenerative rectification diodes which are connected in series and connect the high-potential-side terminal of the inverter cell and a high-potential-side terminal of the second capacitor, and a second resistor connected between an anode of the one second regenerative rectification diode and the high-potential-side terminal of the second capacitor or a plurality of second resistors connected between anodes of the plurality of second regenerative rectification diodes and the high-potential-side terminals of the corresponding second capacitors, and
the low-potential-side terminal of the first capacitor of the first switch circuit, which is located on the most low-potential side, and the high-potential-side terminal of the second capacitor of the second switch circuit, which is located on the most high-potential side, are directly connected, or are connected via a resistor, or are connected via a resistor and a regenerative rectification diode.

The above-described embodiments have been presented by way of example only, and are not intended to limit the scope of the invention. These novel embodiments may be embodied in a variety of other forms, and various omissions, substitutions and changes may be made without departing from the spirit of the inventions. The above-described embodiments and their modifications are included in the scope and spirit of the invention, and included in the inventions of the accompanying claims and their equivalents.

The invention claimed is:
1. A power conversion apparatus comprising:
an inverter cell including an upper-side switching element connected between an AC terminal and a high-potential-side terminal, a lower-side switching element connected between the AC terminal and a low-potential-side terminal, and a floating capacitor connected in parallel to the upper-side switching element and the lower-side switching element between the high-potential-side terminal and the low-potential-side terminal;
an upper arm connected to the high-potential-side terminal of the inverter cell and including at least one first switch circuit having a first switching element; and
a lower arm connected to the low-potential-side terminal of the inverter cell and including at least one second switch circuit having a second switching element, wherein in a case that the upper arm includes the one first switch circuit and the lower arm includes the one second switch circuit, or that the upper arm includes a plurality of first switch circuits connected in series and the lower arm includes a plurality of second switch circuits connected in series, the one first switch circuit or each of the plurality of first switch circuits includes a first diode with a cathode connected to a low-potential-side terminal of the first switching element and includes a first capacitor connected between an anode of the first diode and a high-potential-side terminal of the first switching element, the one second switch circuit or each of the plurality of second switch circuits includes a second diode with an anode connected to a high-potential-side terminal of the second switching element and includes a second capacitor connected between a cathode of the second diode and a low-potential-side terminal of the second switching element, the power conversion apparatus includes a first rectification circuit which connects the low-potential-side terminal of the inverter cell and a low-potential-side terminal of the first capacitor and a second rectification circuit which connects the high-potential-side terminal of the inverter cell and a high-potential-side terminal of the second capacitor, and in a case that the upper arm includes the plurality of first switch circuits and the lower arm includes the one second switch circuit, each of the plurality of first switch circuits includes a first diode with a cathode connected to a low-potential-side terminal of the first switching element and includes a first capacitor connected between an anode of the first diode and a high-potential-side terminal of the first switching element, and the power conversion apparatus includes a first rectification circuit which connects the low-potential-side terminal of the inverter cell and a low-potential-side terminal of the first capacitor, and in a case that the lower arm includes the plurality of second switch circuits and the upper arm includes the one first switch circuit, each of the plurality of second switch circuits includes a second diode with an anode connected to a high-potential-side terminal of the second switching element and includes a second capacitor connected between a cathode of the second diode and a low-potential-side terminal of the second switching element, and the power conversion apparatus includes a second rectification circuit which connects the high-potential-side terminal of the inverter cell and a high-potential-side terminal of the second capacitor.

2. The power conversion apparatus of claim 1, wherein the first rectification circuit includes one or a plurality of first regenerative rectification diodes which are connected in series, and a first resistor connected between a cathode of one first regenerative rectification diode and the low-potential-side terminal of the first capacitor or a plurality of first resistors connected between respective cathodes of the plurality of first regenerative rectification diodes and the low-potential-side terminals of respective first capacitors, and the second rectification circuit includes one or a plurality of second regenerative rectification diodes which are connected in series, and a second resistor connected between an anode of one second regenerative rectification diode and the high-potential-side terminal of the second capacitor or a plurality of second resistors connected between respective anodes of the plurality of second regenerative rectification diodes and the high-potential-side terminals of respective second capacitors.

3. The power conversion apparatus of claim 1, wherein the first switching element of the first switch circuit has a first breakdown voltage and the second switching element of the second switch circuit has a second breakdown voltage, and in the case that the upper arm includes the one first switch circuit and the lower arm includes the plurality of second switch circuits connected in series, the first breakdown voltage is higher than the second breakdown voltage, and in the case that the lower arm includes the one second switch circuit and the upper arm includes the plurality of first switch circuits connected in series, the second breakdown voltage is higher than the first breakdown voltage.

4. The power conversion apparatus of claim 2, wherein the power conversion apparatus includes a first inductance element in place of the first resistor, and includes a second inductance element in place of the second resistor.

5. The power conversion apparatus of claim 1, wherein the inverter cell includes an upper-side diode with a cathode connected to a low-potential-side terminal of the upper-side switching element, an upper-side capacitor connected between an anode of the upper-side diode and a high-potential-side terminal of the upper-side switching element, a lower-side diode with an anode connected to a high-potential-side terminal of the lower-side switching element, and a lower-side capacitor connected between a cathode of the lower-side diode and a low-potential-side terminal of the lower-side switching element, the first rectification circuit further connects a low-potential-side terminal of the upper-side capacitor and the low-potential-side terminal of the inverter cell, and the second rectification circuit further connects a high-potential-side terminal of the lower-side capacitor and the high-potential-side terminal of the inverter cell.

6. The power conversion apparatus of claim 2, wherein the inverter cell includes an upper-side diode with a cathode connected to a low-potential-side terminal of the upper-side switching element, an upper-side capacitor connected between an anode of the upper-side diode and a high-potential-side terminal of the upper-side switching element, a lower-side diode with an anode connected to a high-potential-side terminal of the lower-side switching element, and a lower-side capacitor connected between a cathode of the lower-side diode and a low-potential-side terminal of the lower-side switching element, the first rectification circuit further connects a low-potential-side terminal of the upper-side capacitor and the low-potential-side terminal of the inverter cell, and the second rectification circuit further connects a high-potential-side terminal of the lower-side capacitor and the high-potential-side terminal of the inverter cell.

7. The power conversion apparatus of claim 3, wherein the inverter cell includes an upper-side diode with a cathode connected to a low-potential-side terminal of the upper-side switching element, an upper-side capacitor connected between an anode of the upper-side diode and a high-potential-side terminal of the upper-side switching element, a lower-side diode with an anode connected to a high-potential-side terminal of the lower-side switching element, and a lower-side capacitor connected between a cathode of the lower-side diode and a low-potential-side terminal of the lower-side switching element, the first rectification circuit further connects a low-potential-side terminal of the upper-side capacitor and the low-potential-side terminal of the inverter cell, and the second rectification circuit further connects a high-potential-side terminal of the lower-side capacitor and the high-potential-side terminal of the inverter cell.

8. The power conversion apparatus of claim 4, wherein the inverter cell includes an upper-side diode with a cathode connected to a low-potential-side terminal of the upper-side switching element, an upper-side capacitor connected between an anode of the upper-side diode and a high-potential-side terminal of the upper-side switching element, a lower-side diode with an anode connected to a high-potential-side terminal of the lower-side switching element, and a lower-side capacitor connected between a cathode of the lower-side diode and a low-potential-side terminal of the lower-side switching element, the first rectification circuit further connects a low-potential-side terminal of the upper-side capacitor and the low-potential-side terminal of the inverter cell, and the second rectification circuit further connects a high-potential-side terminal of the lower-side capacitor and the high-potential-side terminal of the inverter cell.

9. The power conversion apparatus of claim 1, wherein each of the first switching element, the second switching element, the upper-side switching element and the lower-side switching element includes a plurality of switching elements connected in series.

10. The power conversion apparatus of claim 2, wherein each of the first switching element, the second switching element, the upper-side switching element and the lower-side switching element includes a plurality of switching elements connected in series.

11. The power conversion apparatus of claim 3, wherein each of the first switching element, the second switching element, the upper-side switching element and the lower-side switching element includes a plurality of switching elements connected in series.

12. The power conversion apparatus of claim 4, wherein each of the first switching element, the second switching element, the upper-side switching element and the lower-side switching element includes a plurality of switching elements connected in series.

13. The power conversion apparatus of claim 1, wherein in the case that the upper arm includes the plurality of first switch circuits, in the upper arm, first switching elements are sequentially switched at predetermined time intervals, and electrostatic capacitances of the first capacitors of the first switch circuits are set such that the electrostatic capacitance of the first capacitor connected to the first switching element with a longer time period from turn-on to turn-off is less than the electrostatic capacitance of the first capacitor connected to the first switching element with a shorter time period from turn-on to turn-off, and in the case that the lower arm includes the plurality of second switch circuits in the lower arm, second switching elements are sequentially switched at predetermined time intervals, and electrostatic capacitances of the second capacitors are set such that the electrostatic capacitance of the second capacitor connected to the second switching element with a longer time period from turn-on to turn-off is less than the electrostatic capacitance of the second capacitor connected to the second switching element with a shorter time period from turn-on to turn-off.

14. The power conversion apparatus of claim 1, further comprising:
a voltage detector configured to detect a voltage of the floating capacitor;
a controller configured to multiply, by a gain, a difference between a voltage instruction value for the floating capacitor and a voltage detection value detected by the voltage detector; and
a compensator configured to generate, based on an output value of the controller, a compensation amount for adjusting switching timings of the first switching element, the second switching element, the upper-side switching element and the lower-side switching element.

15. The power conversion apparatus of claim 14, further comprising:
a current detector configured to detect a current flowing in the AC terminal of the inverter cell; and
a multiplier configured to multiply the output value of the controller and an output current value detected by the current detector,
wherein the compensator is configured to generate, based on an output value of the multiplier, a compensation amount for adjusting the switching timings of the first switching element, the second switching element, the upper-side switching element and the lower-side switching element.

16. The power conversion apparatus of claim 14, wherein the upper arm includes the plurality of first switch circuits and the lower arm includes the plurality of second switch circuits, and
the voltage instruction value for the floating capacitor is set to be higher than a value obtained by dividing an input DC voltage by a numerical value obtained by adding 1 to a smaller number between a number of first switching elements of the first switch circuits included in the upper arm and a number of second switching elements of the second switch circuits included in the lower arm.

17. The power conversion apparatus of claim 15, wherein the upper arm includes the plurality of first switch circuits and the lower arm includes the plurality of second switch circuits, and
the voltage instruction value for the floating capacitor is set to be higher than a value obtained by dividing an input DC voltage by a numerical value obtained by adding 1 to a smaller number between a number of first switching elements of the first switch circuits included in the upper arm and a number of second switching elements of the second switch circuits included in the lower arm.

18. A power conversion apparatus comprising:
an inverter cell including an upper-side switching element connected between an AC terminal and a high-potential-side terminal, a lower-side switching element connected between the AC terminal and a low-potential-side terminal, and a floating capacitor connected in parallel to the upper-side switching element and the lower-side switching element between the high-potential-side terminal and the low-potential-side terminal;
an upper arm connected to the high-potential-side terminal of the inverter cell and including at least one first switch circuit having a first switching element; and a lower arm connected to the low-potential-side terminal of the inverter cell and including at least one second switch circuit having a second switching element, wherein the upper arm includes a plurality of first switch circuits connected in series and the lower arm includes a plurality of second switch circuits connected in series, and at least one of the first switch circuits includes a first diode with a cathode connected to a low-potential-side terminal of the first switching element and includes a first capacitor connected between an anode of the first diode and a high-potential-side terminal of the first switching element, at least one of the second switch circuits includes a second diode with an anode connected to a high-potential-side terminal of the second switching element and includes a second capacitor connected between a cathode of the second diode and a low-potential-side terminal of the second switching element, the power conversion apparatus includes a first rectification circuit which includes a first regenerative rectification diode provided in at least one of intervals between low-potential-side terminals of the first capacitors of the first switch circuits which neighbor each other, and a first resistor connected between a cathode of the first regenerative rectification diode and the low-potential-side terminal of the first capacitor on a high-potential side of neighboring first switch circuits, the power conversion apparatus includes a second rectification circuit which includes a second regenerative rectification diode provided in at least one of intervals between high-potential-side terminals of the second capacitors of the second switch circuits which neighbor each other, and a second resistor connected between an anode of the second regenerative rectification diode and the high-potential-side terminal of the second capacitor on a low-potential side of the neighboring second switch circuits, and the low-potential-side terminal of the first capacitor of the first switch circuit, which is located on a most low-potential side, and the high-potential-side terminal of the second capacitor of the second switch circuit, which is located on a most high-potential side, are directly connected, or are connected via a resistor, or are connected via a resistor and a regenerative rectification diode.

19. A power conversion apparatus comprising:

an inverter cell including an upper-side switching element connected between an AC terminal and a high-potential-side terminal, a lower-side switching element connected between the AC terminal and a low-potential-side terminal, and a floating capacitor connected in parallel to the upper-side switching element and the lower-side switching element between the high-potential-side terminal and the low-potential-side terminal;

an upper arm connected to the high-potential-side terminal of the inverter cell and including one first switch circuit having a first switching element; and a lower arm connected to the low-potential-side terminal of the inverter cell and including one second switch circuit having a second switching element, wherein the one first switch circuit includes a first diode with a cathode connected to a low-potential-side terminal of the first switching element and includes a first capacitor connected between an anode of the first diode and a high-potential-side terminal of the first switching element, the one second switch circuit includes a second diode with an anode connected to a high-potential-side terminal of the second switching element and includes a second capacitor connected between a cathode of the second diode and a low-potential-side terminal of the second switching element, the power conversion apparatus includes a rectification circuit which includes a resistor and a regenerative rectification diode, the low-potential-side terminal of the first capacitor of the first switch circuit and the high-potential-side terminal of the second capacitor of the second switch circuit are connected via the rectification circuit.

* * * * *